United States Patent
Saastamo et al.

(10) Patent No.: US 9,725,248 B2
(45) Date of Patent: Aug. 8, 2017

(54) SYSTEMS, METHODS AND APPARATUSES FOR CHANGING THE DIRECTION/SPEED OF A WORKPIECE

(71) Applicant: USNR, LLC, Woodland, WA (US)

(72) Inventors: Petri Saastamo, Woodland, WA (US); Christopher W. Blomquist, Ridgefield, WA (US); Mike Dockter, Kelso, WA (US)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 15/187,125

(22) Filed: Jun. 20, 2016

(65) Prior Publication Data

US 2016/0304289 A1    Oct. 20, 2016

Related U.S. Application Data

(63) Continuation of application No. 14/680,908, filed on Apr. 7, 2015, now Pat. No. 9,387,988, which is a
(Continued)

(51) Int. Cl.
*B65G 47/26*    (2006.01)
*B65G 39/00*    (2006.01)
(Continued)

(52) U.S. Cl.
CPC ............... *B65G 39/00* (2013.01); *B07C 5/14* (2013.01); *B27B 5/18* (2013.01); *B27B 31/003* (2013.01);
(Continued)

(58) Field of Classification Search
CPC .. B65G 47/82; B65G 47/2445; B65G 47/244; B65G 47/24; B65G 47/22; B65G 47/54;
(Continued)

(56) References Cited

U.S. PATENT DOCUMENTS 653,506 A  *  7/1900  Edwards ................ B65G 57/00
                                                144/242.1
958,164 A     5/1910  Parker
(Continued)

FOREIGN PATENT DOCUMENTS

DE        489627 C    1/1930
FR        963642 A    7/1950
(Continued)

OTHER PUBLICATIONS

Australian Patent Application No. 2013347917; Examination Report; Jan. 19, 2017.
(Continued)

*Primary Examiner* — James R Bidwell
(74) *Attorney, Agent, or Firm* — Schwabe, Williamson & Wyatt, P.C.

(57) ABSTRACT

The present disclosure provides systems, methods and assemblies comprising one or more tapered feed rolls. Tapered feed rolls may be used to change the rate and direction of workpiece travel along a processing line while retaining the workpieces in sequential order. Routing workpiece flow with tapered feed rolls may allow the workpieces to be tracked along one or more processing lines, and may reduce the operational space required for workpiece processing.

20 Claims, 34 Drawing Sheets

Related U.S. Application Data continuation of application No. 14/318,441, filed on Jun. 27, 2014, now Pat. No. 9,016,460, which is a continuation of application No. 14/086,782, filed on Nov. 21, 2013, now Pat. No. 8,794,423.

(60) Provisional application No. 61/729,299, filed on Nov. 21, 2012, provisional application No. 61/802,096, filed on Mar. 15, 2013.

(51) Int. Cl.
| | |
|---|---|
| *B07C 5/14* | (2006.01) |
| *B65G 13/02* | (2006.01) |
| *B65G 47/34* | (2006.01) |
| *B27B 5/18* | (2006.01) |
| *B65G 43/00* | (2006.01) |
| *B65G 59/12* | (2006.01) |
| *B65G 47/76* | (2006.01) |
| *B27B 31/00* | (2006.01) |
| *B27B 31/08* | (2006.01) |

(52) U.S. Cl.
CPC .............. *B27B 31/08* (2013.01); *B65G 13/02* (2013.01); *B65G 43/00* (2013.01); *B65G 47/26* (2013.01); *B65G 47/34* (2013.01); *B65G 47/766* (2013.01); *B65G 59/12* (2013.01); *Y10T 83/0462* (2015.04); *Y10T 83/664* (2015.04)

(58) Field of Classification Search
CPC .......... B65G 13/02; B65G 47/34; B07C 5/00; B07C 5/14
USPC ...... 198/456, 457.02, 457.07, 411, 412, 608, 198/624
See application file for complete search history.

(56) References Cited

U.S. PATENT DOCUMENTS

| | | | | |
|---|---|---|---|---|
| 1,878,315 | A | 9/1932 | Phelps | |
| 3,750,799 | A * | 8/1973 | Hill | B65G 47/32 198/457.07 |
| 4,699,262 | A * | 10/1987 | Nakano | B07C 1/18 198/411 |
| 5,109,975 | A * | 5/1992 | Prettie | B65G 47/244 198/411 |
| 7,299,909 | B1 * | 11/2007 | Houghton | B65G 39/071 193/35 R |
| 7,967,124 | B2 * | 6/2011 | Theriault | B65G 13/12 193/35 TE |
| 8,794,423 | B2 * | 8/2014 | Saastamo | B07C 5/14 198/457.02 |
| 9,016,460 | B2 * | 4/2015 | Saastamo | B07C 5/14 198/415 |
| 9,387,988 | B2 * | 7/2016 | Saastamo | B07C 5/14 |

FOREIGN PATENT DOCUMENTS

| | | | |
|---|---|---|---|
| FR | 1028638 | A | 5/1953 |
| FR | 2696660 | A1 | 4/1994 |

OTHER PUBLICATIONS

Canadian Patent Application No. 2,911,733; Examiner's Report; Dec. 8, 2015.
Canadian Patent Application No. 2,911,733; Examiner's Report; Mar. 11, 2016.
Canadian Patent Application No. 2,950,236; Examiner's Report; Feb. 9, 2017.
European Patent Application 13857458.7; Extended European Search Report; Jul. 6, 2016.
New Zealand Patent Application No. 708296; Examiner's Report; Sep. 12, 2016.

* cited by examiner

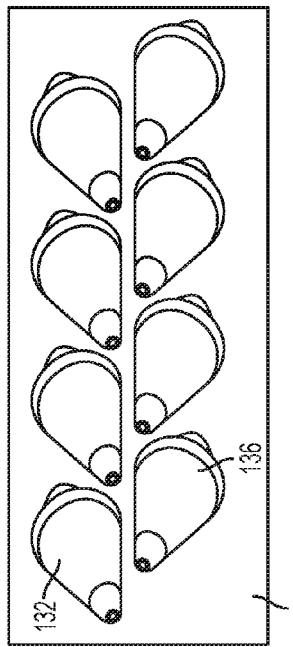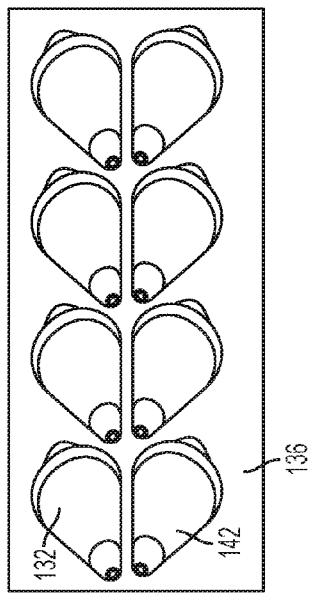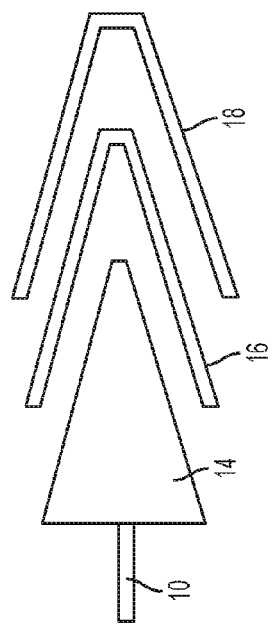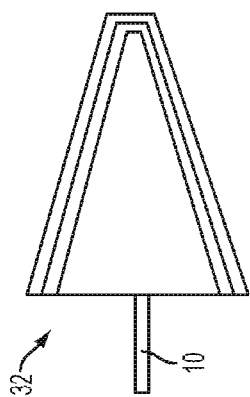

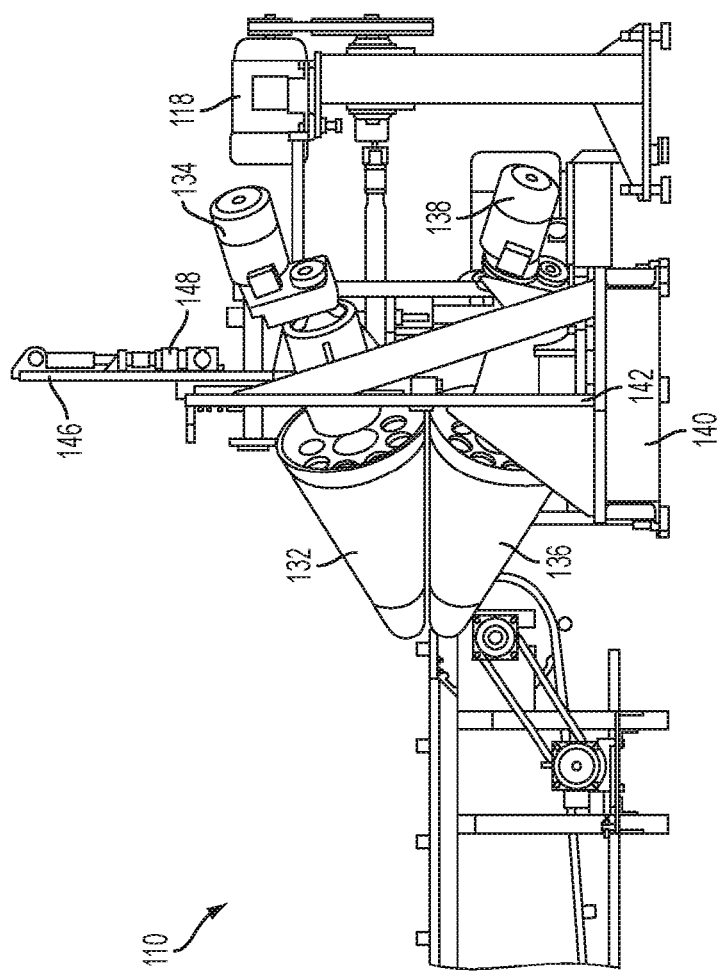
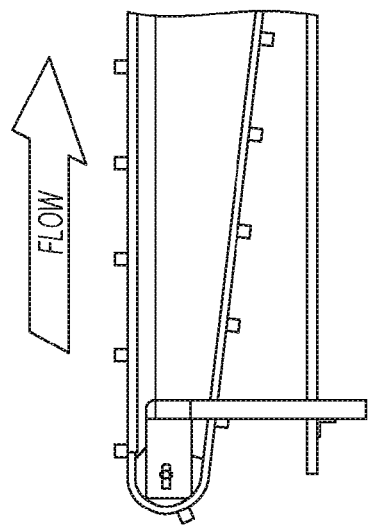
FIG. 4

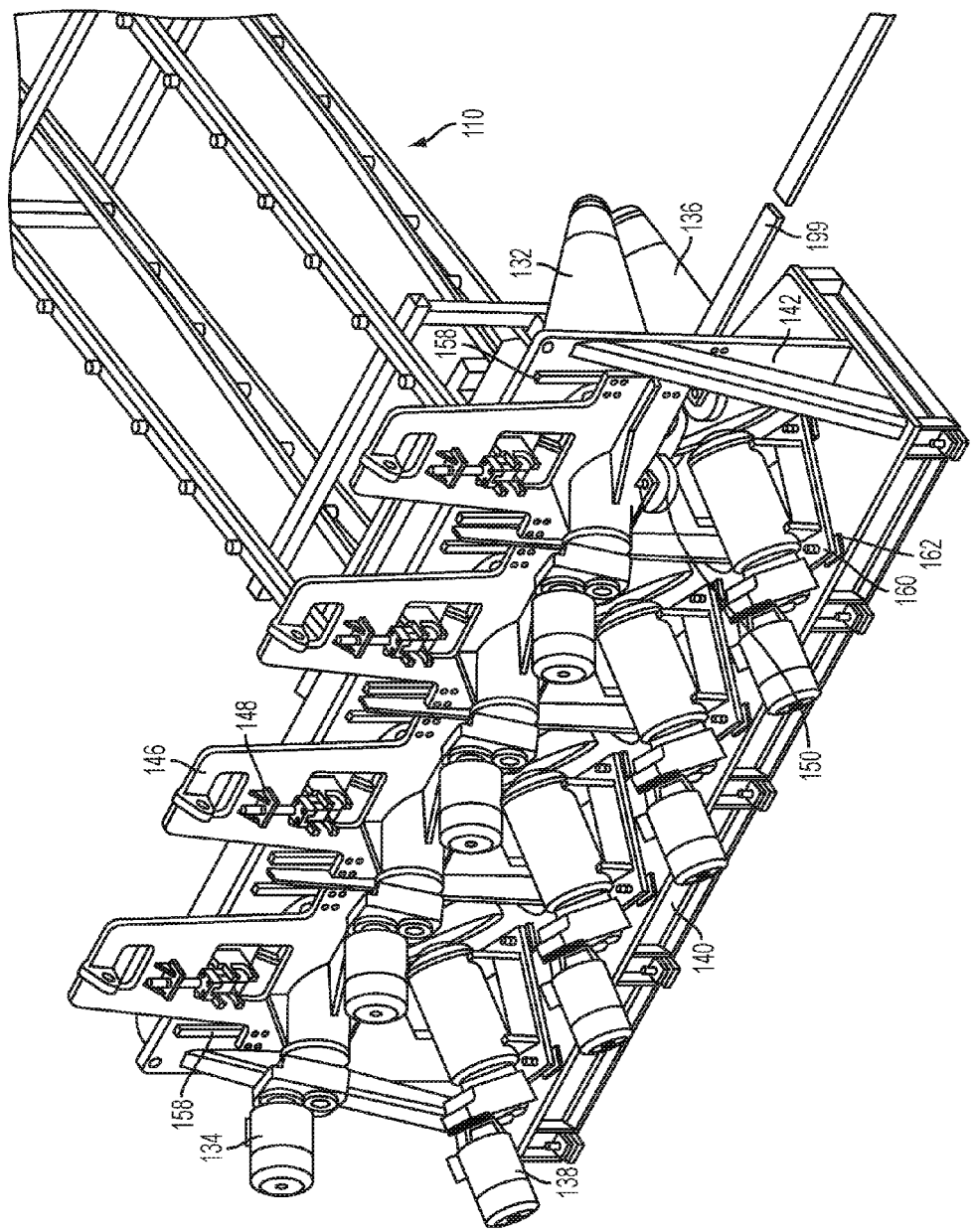

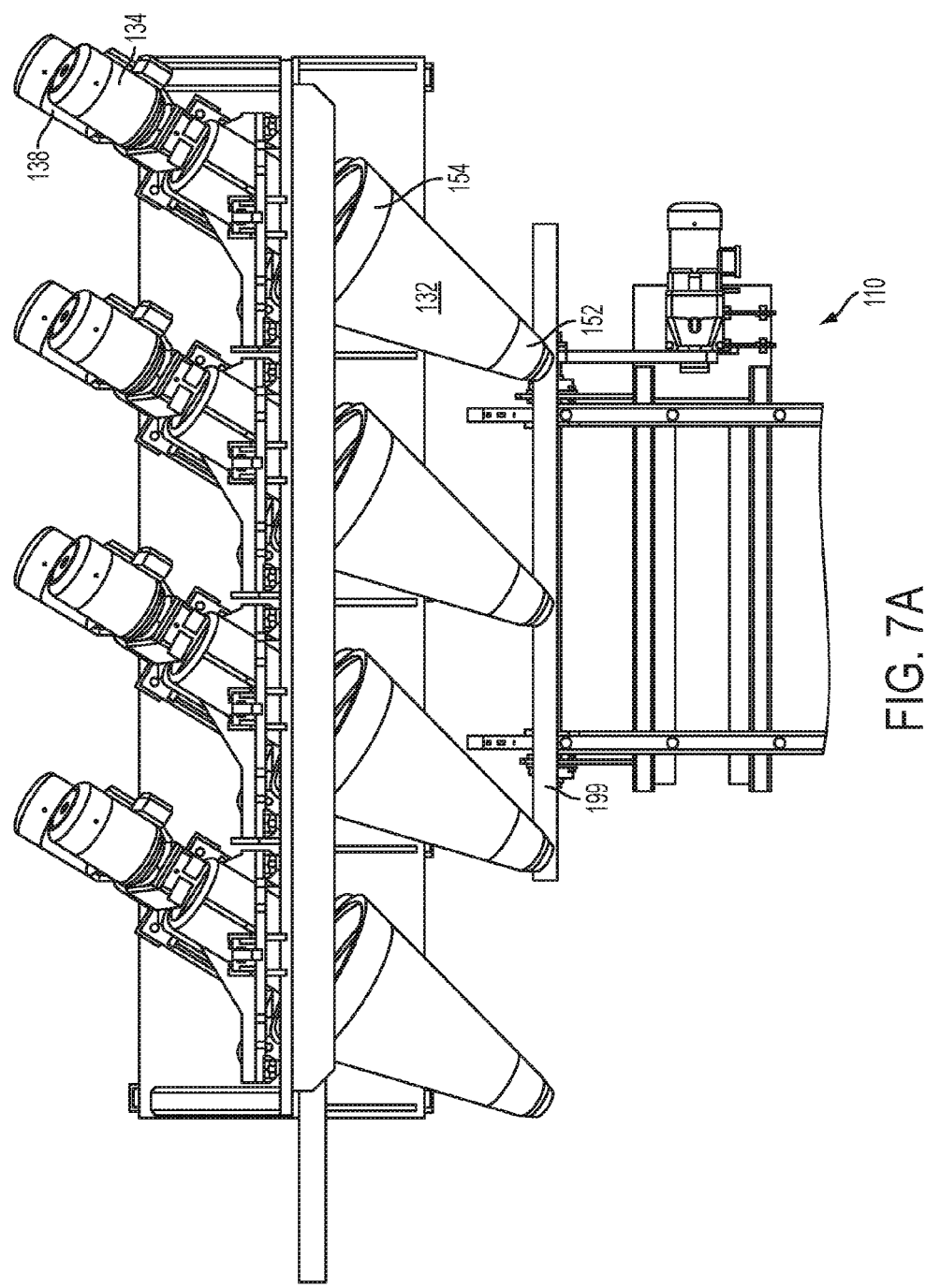

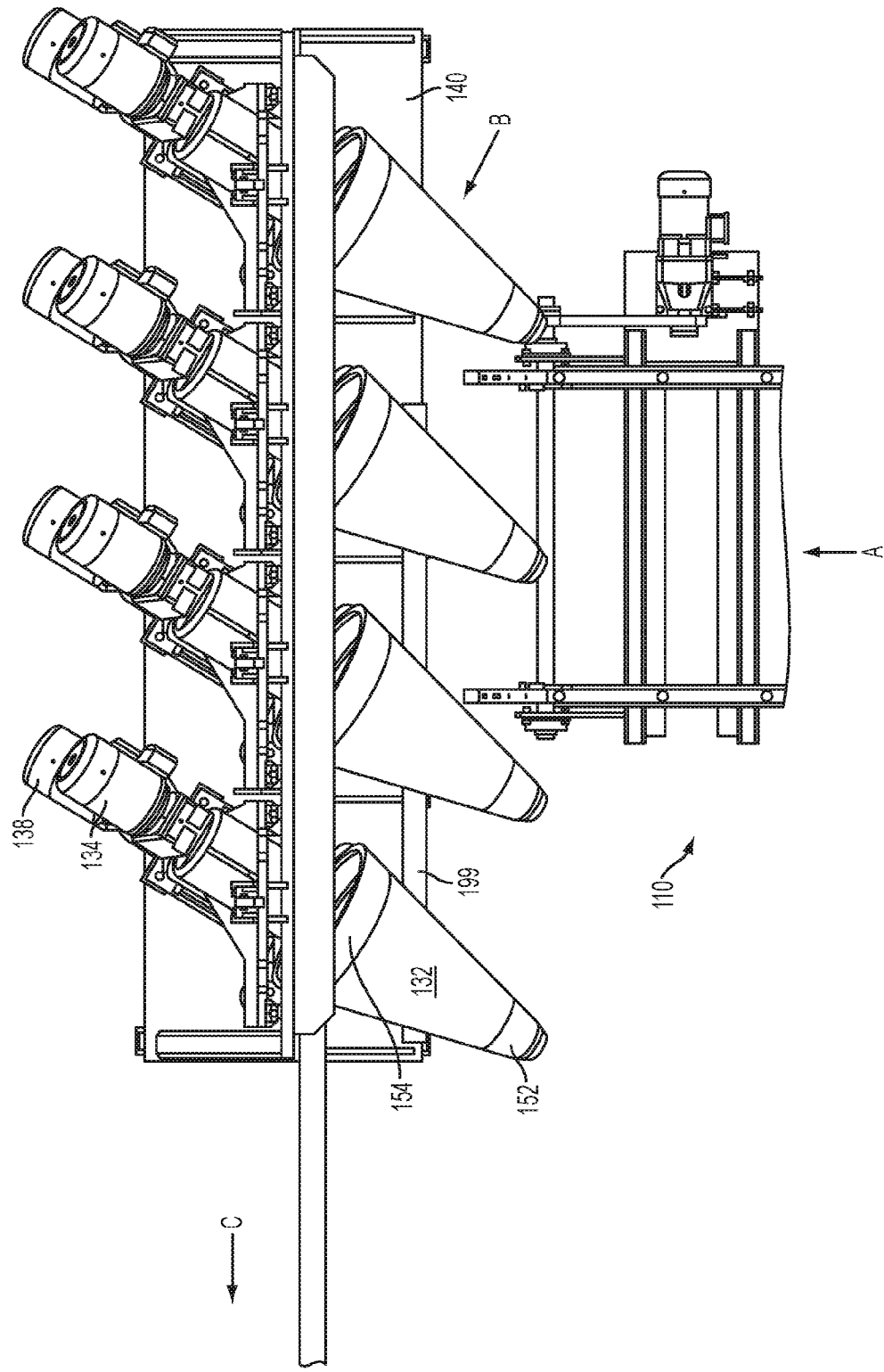

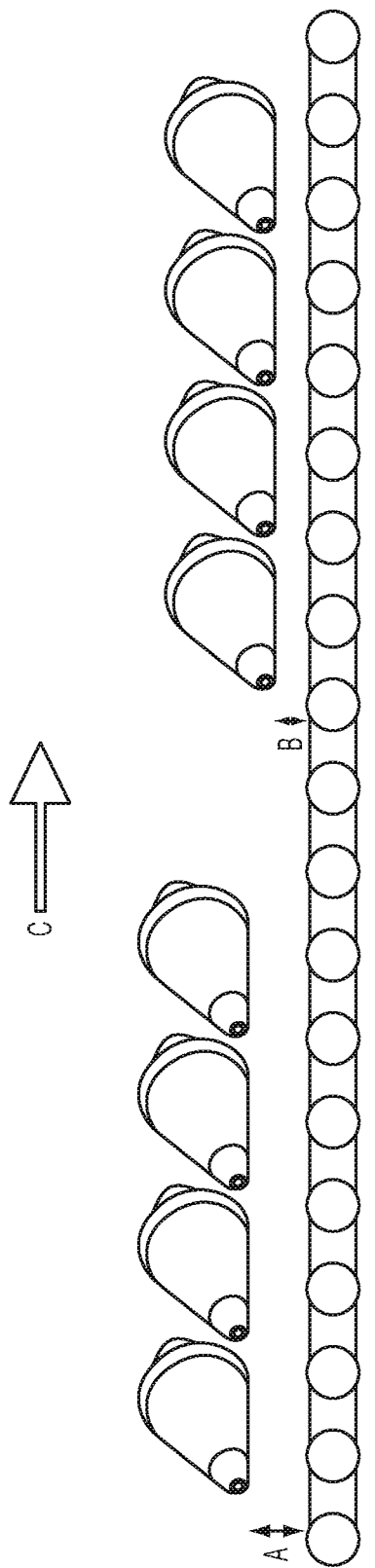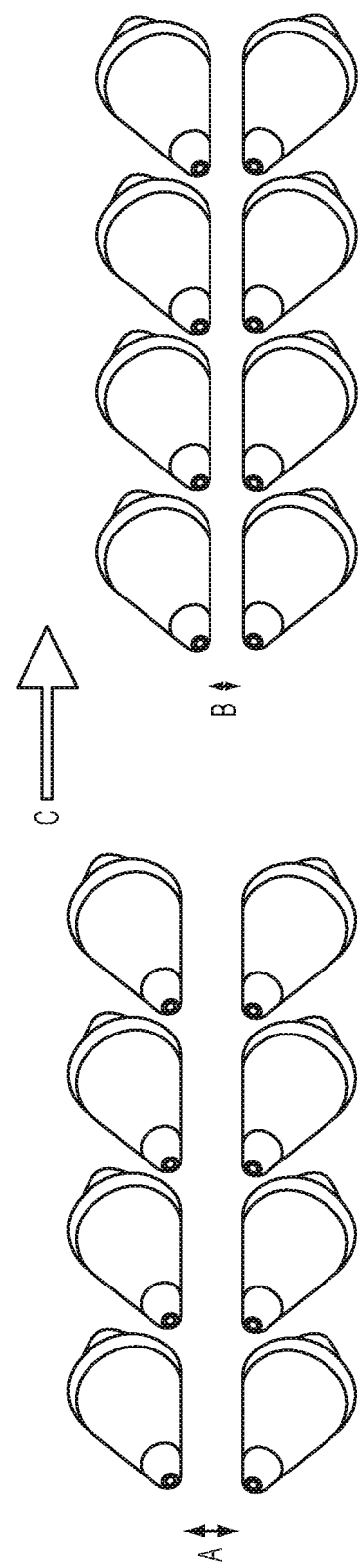
FIG. 12B
FIG. 12C

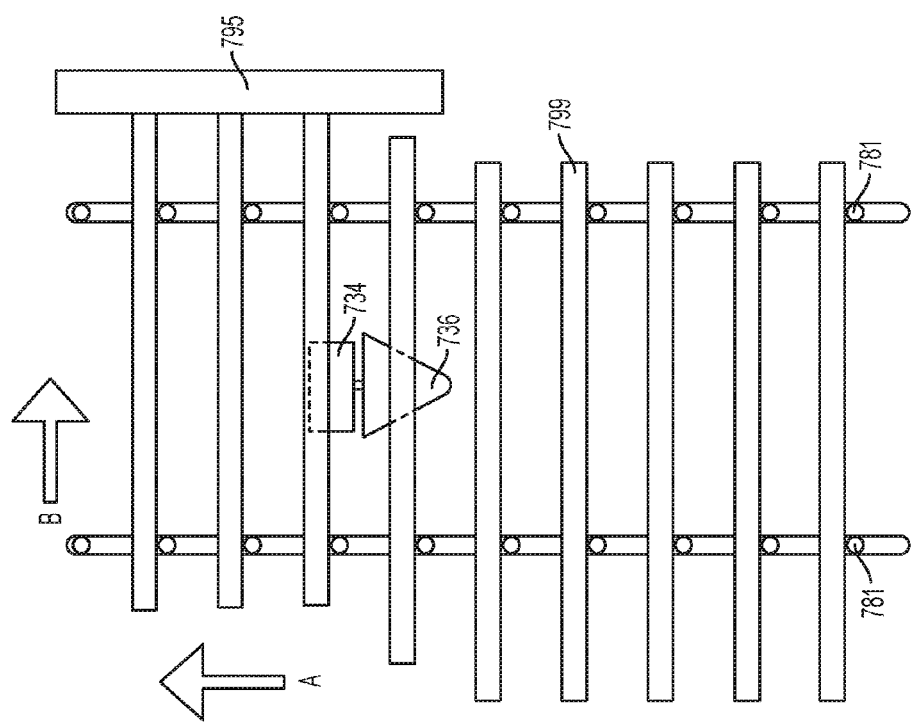
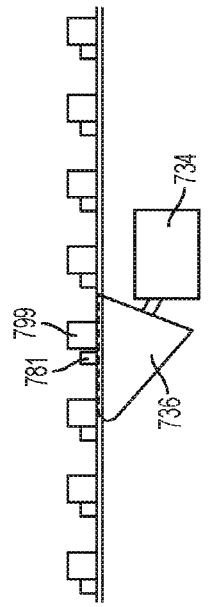
FIG. 14A
FIG. 14B

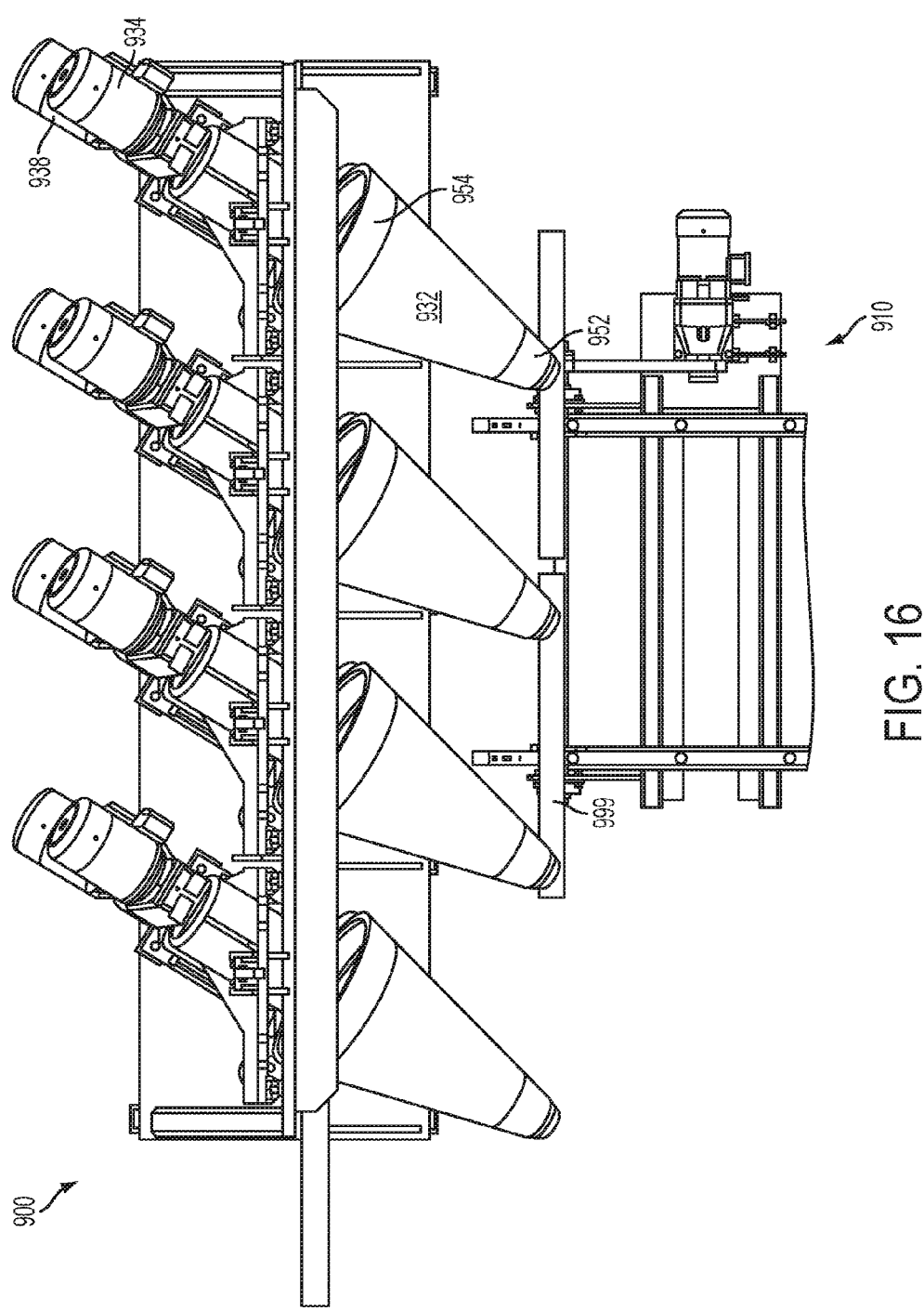

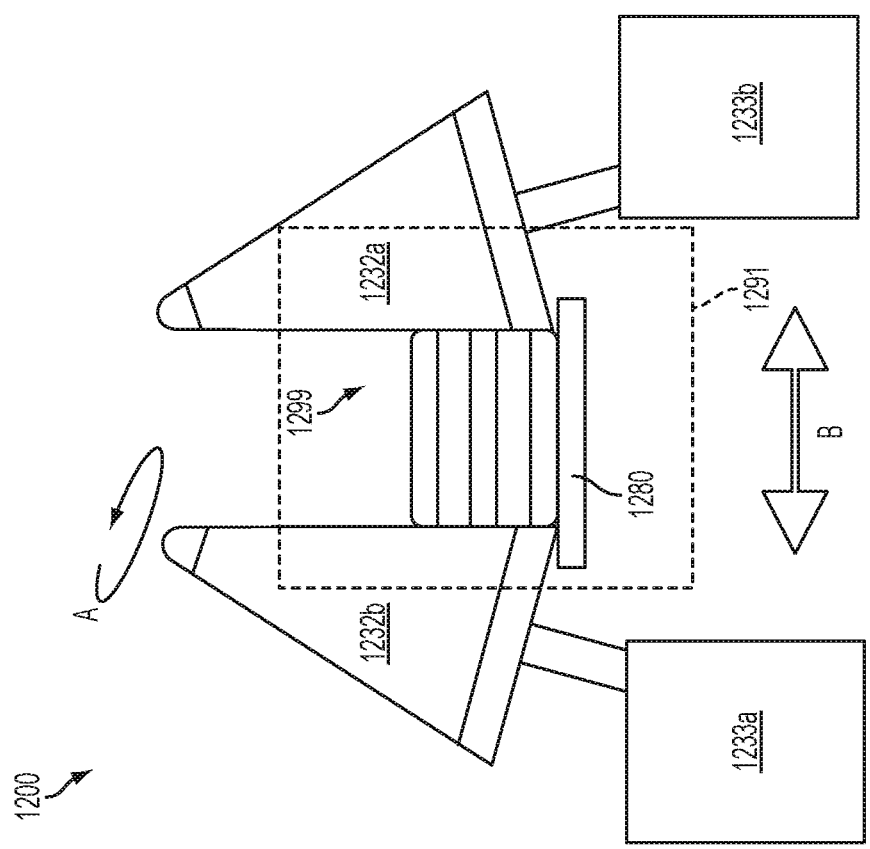

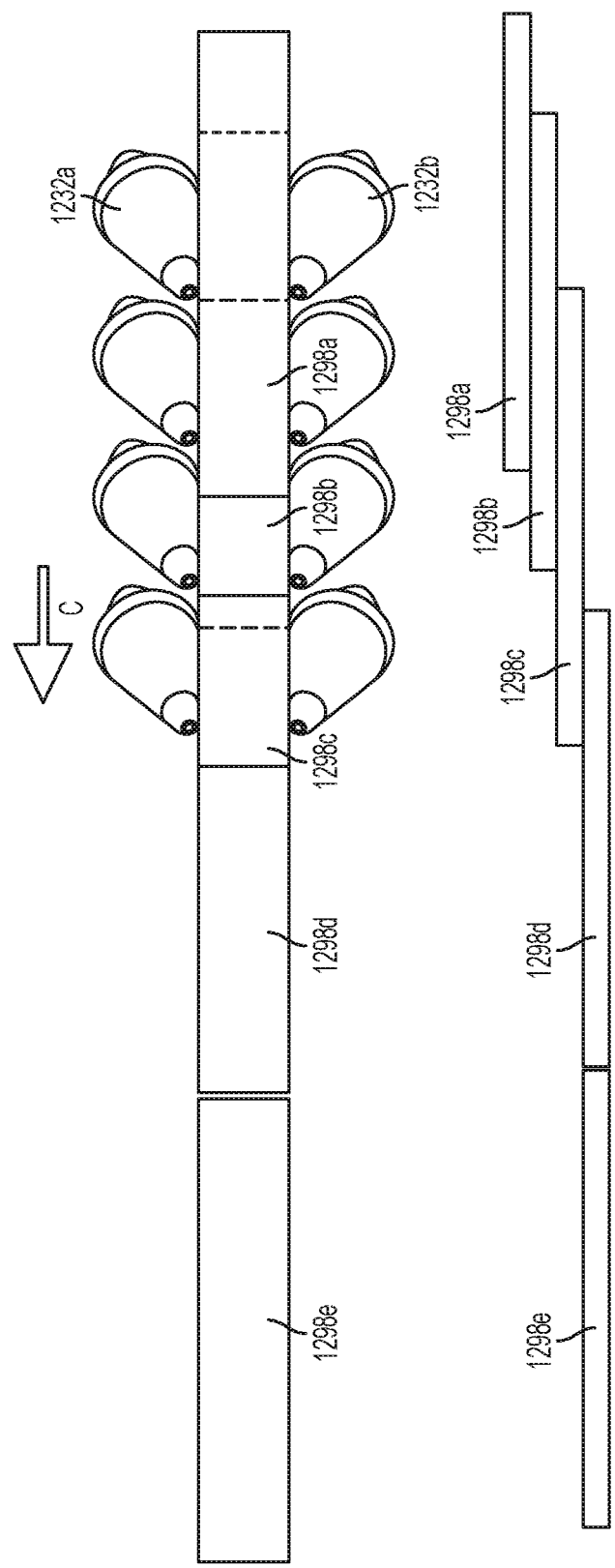

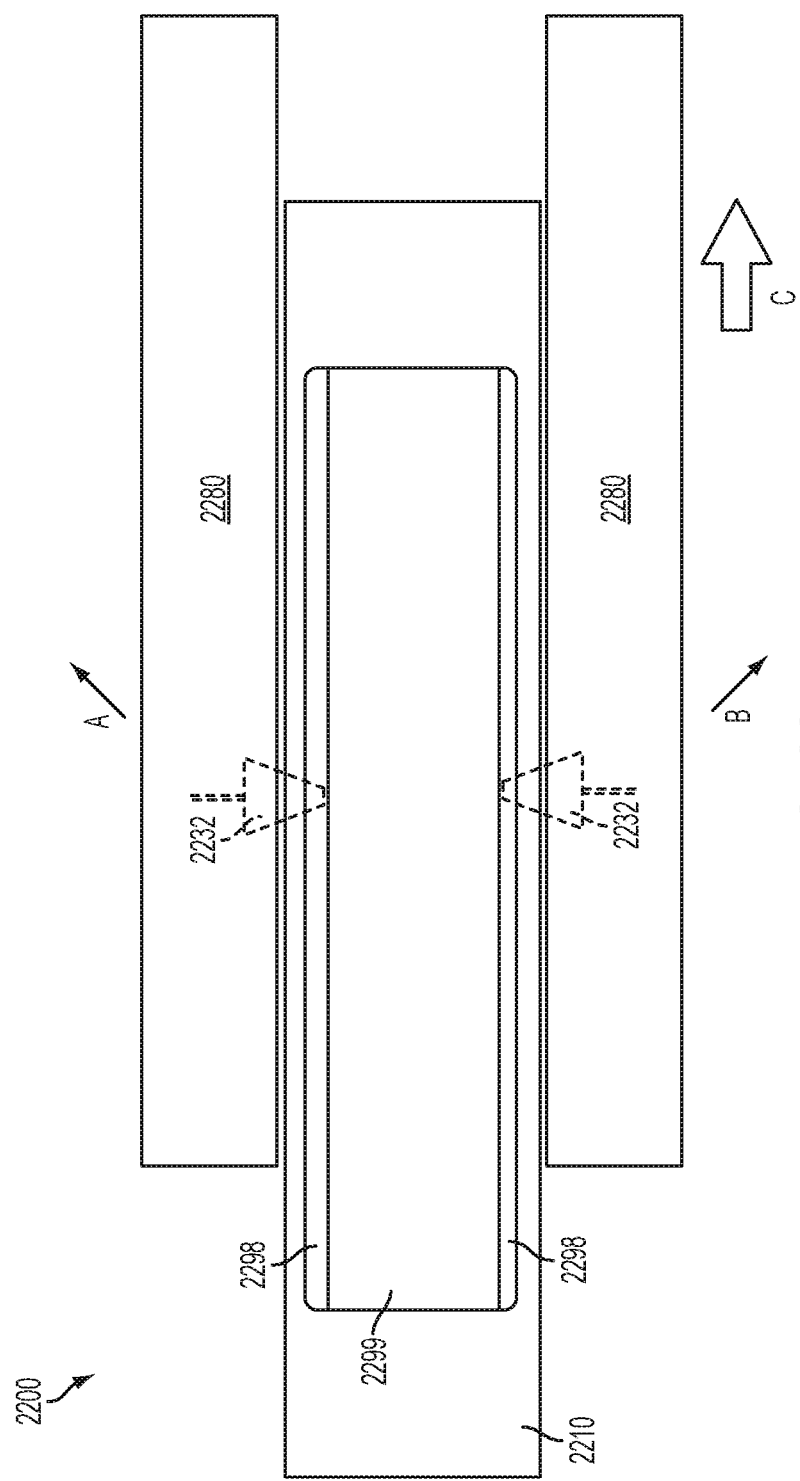

SYSTEMS, METHODS AND APPARATUSES FOR CHANGING THE DIRECTION/SPEED OF A WORKPIECE

CROSS REFERENCE TO RELATED APPLICATIONS

The present application is a continuation of U.S. patent application Ser. No. 14/318,441, filed Jun. 27, 2014, now U.S. Pat. No. 9,387,998, which is a continuation of U.S. patent application Ser. No. 14/086,782, filed Nov. 21, 2013, which claims priority to U.S. Patent Application No. 61/729,299, filed Nov. 21, 2012, and U.S. Patent Application No. 61/802,096, filed Mar. 15, 2013, all entitled "SYSTEMS, METHODS, AND APPARATUSES FOR CHANGING THE DIRECTION/SPEED OF A WORKPIECE," the entire disclosures of which are hereby incorporated by reference in their entirety.

TECHNICAL FIELD

Embodiments herein relate to the field of wood processing, and, more specifically, to systems, methods, and apparatuses with one or more tapered feed rolls for changing the speed and/or direction of a workpiece.

BACKGROUND

In current lumber processing systems, pieces of lumber are typically fed into a processing machine (e.g. a planer) in three stages. In the first stage, the pieces are conveyed on smooth chains along a conveyor toward a transfer. The pieces are crowded together to form a continuous edge to edge mat of lumber on the conveyor, with each piece oriented perpendicular to the direction of travel.

In the second stage, the transfer accepts the pieces from the conveyor. The transfer may include a plurality of rollers (e.g. pineapple rollers) rotating around an axis parallel to the first stage conveyor. As the leading piece of lumber in the mat reaches the transfer, the rollers contact the piece of lumber, abruptly changing the direction of travel by ninety degrees and accelerating the piece lineally along the transfer at a high rate of speed toward a downstream processing machine. The directional change and sudden acceleration produces large gaps between the pieces.

In the third stage, the lumber pieces are fed individually into a processing machine, such as an edger. The large gaps between successive lumber pieces reduce efficiency at the processing machine. Further, deceleration of the lead piece over a short distance can cause the following piece to collide with the lead piece. Because the following piece is traveling at a high rate of speed, such collisions can damage the pieces, cause work flow stoppages, and necessitate costly clean-ups and repairs.

For this reason, current systems require a relatively long (e.g. 40 ft.) intermediate conveyor, or "bridge," between the transfer and the processing machine. This allows sufficient distances for deceleration of the lead piece relative to the following piece, providing minimization of both gaps and collisions.

BRIEF DESCRIPTION OF THE DRAWINGS

Embodiments will be readily understood by the following detailed description in conjunction with the accompanying drawings. Embodiments are illustrated by way of example and not by way of limitation in the specification and in the accompanying drawings.

FIG. 1B illustrates examples of vertically aligned and vertically offset tapered feed roll arrangements;

FIGS. 1C-E illustrate examples of tapered feed rolls with adjustable dimensions;

FIG. 4 illustrates a front elevational view of the transverse conveyor assembly of FIG. 1;

FIG. 6 illustrates a rear perspective view of the tapered roll assembly and transverse conveyor assembly of FIG. 5;

FIGS. 7A and 7B illustrate plan views of an transverse conveyor assembly and tapered roll assembly;

FIGS. 12A-C illustrate views of a workpiece sorter with one or more tapered feed rolls, and aspects thereof;

FIGS. 14A-B illustrate a top plan view and a side view, respectively, of a workpiece even-ending system with one or more tapered feed rolls;

FIG. 16 illustrates another embodiment of a cut-in-two system with one or more tapered feed rolls;

FIGS. 19A-D illustrate block diagrams of a vertical gang outfeed and board separator system with one or more tapered feed rolls;

FIG. 22 shows a block diagram of a flitch diversion system with one or more tapered feed rolls, all arranged in accordance with various embodiments.

DETAILED DESCRIPTION OF DISCLOSED EMBODIMENTS

Figure 1A:
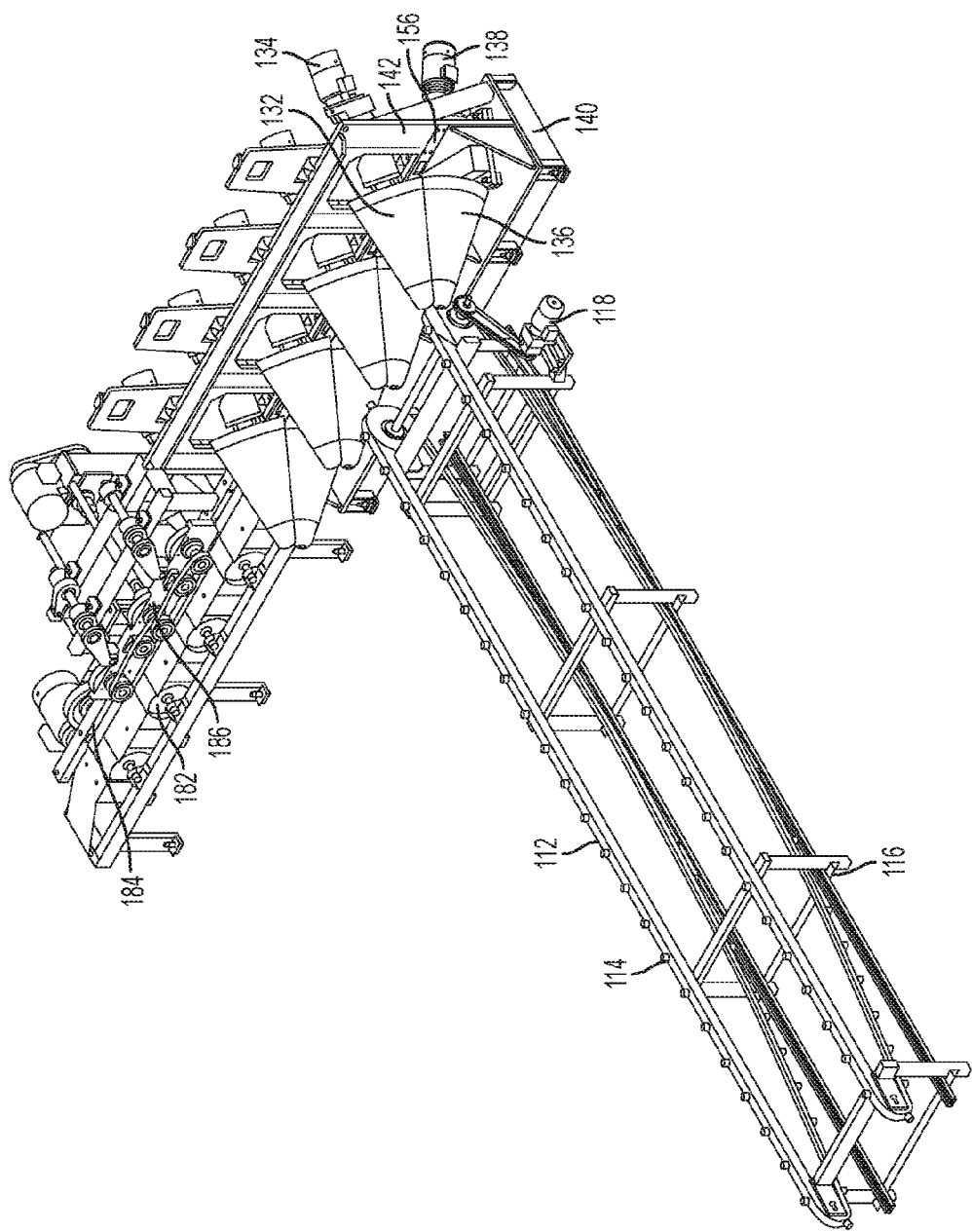
FIG. 1A illustrates a perspective view of a tapered roll feed system in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for transporting a workpiece are provided. In exemplary embodiments, a computing device may be endowed with one or more components of the disclosed apparatuses and/or systems and may be employed to perform one or more methods as disclosed herein.

As used herein, the term "workpiece" may be used to refer to any form of wood, including (but not limited to) a stick/sticker or lathe, a board, a flitch, a cant, a log, a slab, a stem, a panel, a taper, veneer, and/or other material such as plywood, particleboard, fiberboard, etc. In addition, the terms "transfer" and "conveyor" are used interchangeably throughout the description.

Embodiments herein provide a tapered feed roll assembly. Tapered rolls as described herein may be used with infeed and/or outfeed components, such as conveyors/transfers, to efficiently transport workpieces. In some examples, tapered feed rolls may be used with one or more lineal and/or transverse conveyors in various combinations to transport pieces of lumber into and/or from a wood processing device, including (but not limited to) a planer, edger, jointer, molder, chipper, shape saw, and/or any other workpiece cutting or surfacing apparatus. The tapering of the feed rolls as described herein may provide gradual acceleration (or deceleration) and/or directional change to workpieces (e.g. a directional change of approximately 90 degrees) while directing the workpieces toward or away from a guard/fence, as well as providing improved gap control and collision reduction without the use of a long intermediate bridge. Thus, tapered feed rolls may reduce the footprint required for workpiece processing systems. Tapered feed rolls may also increase worker safety in comparison to conventional rollers, which provide sudden acceleration and directional change.

Figure 10:
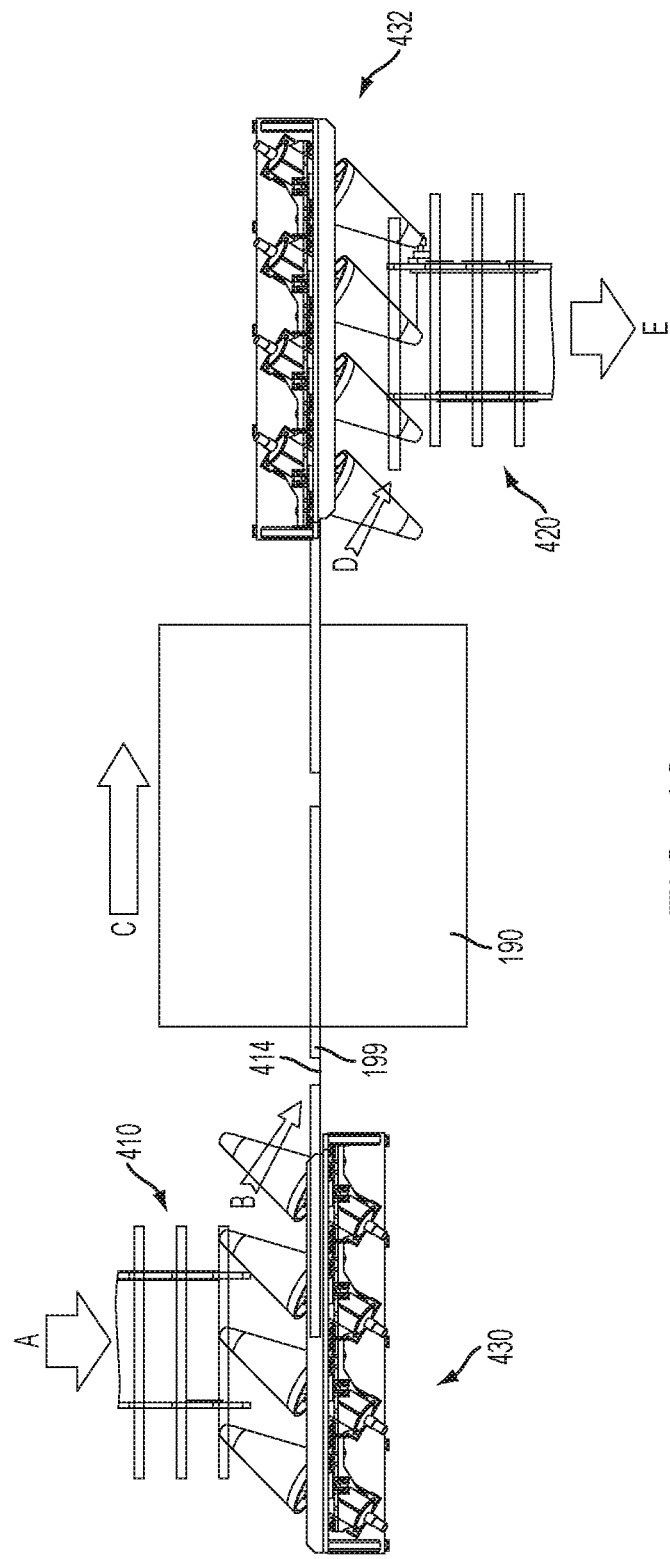
FIG. 10 illustrates a plan view of a tapered roll feed system.
Figure 11:
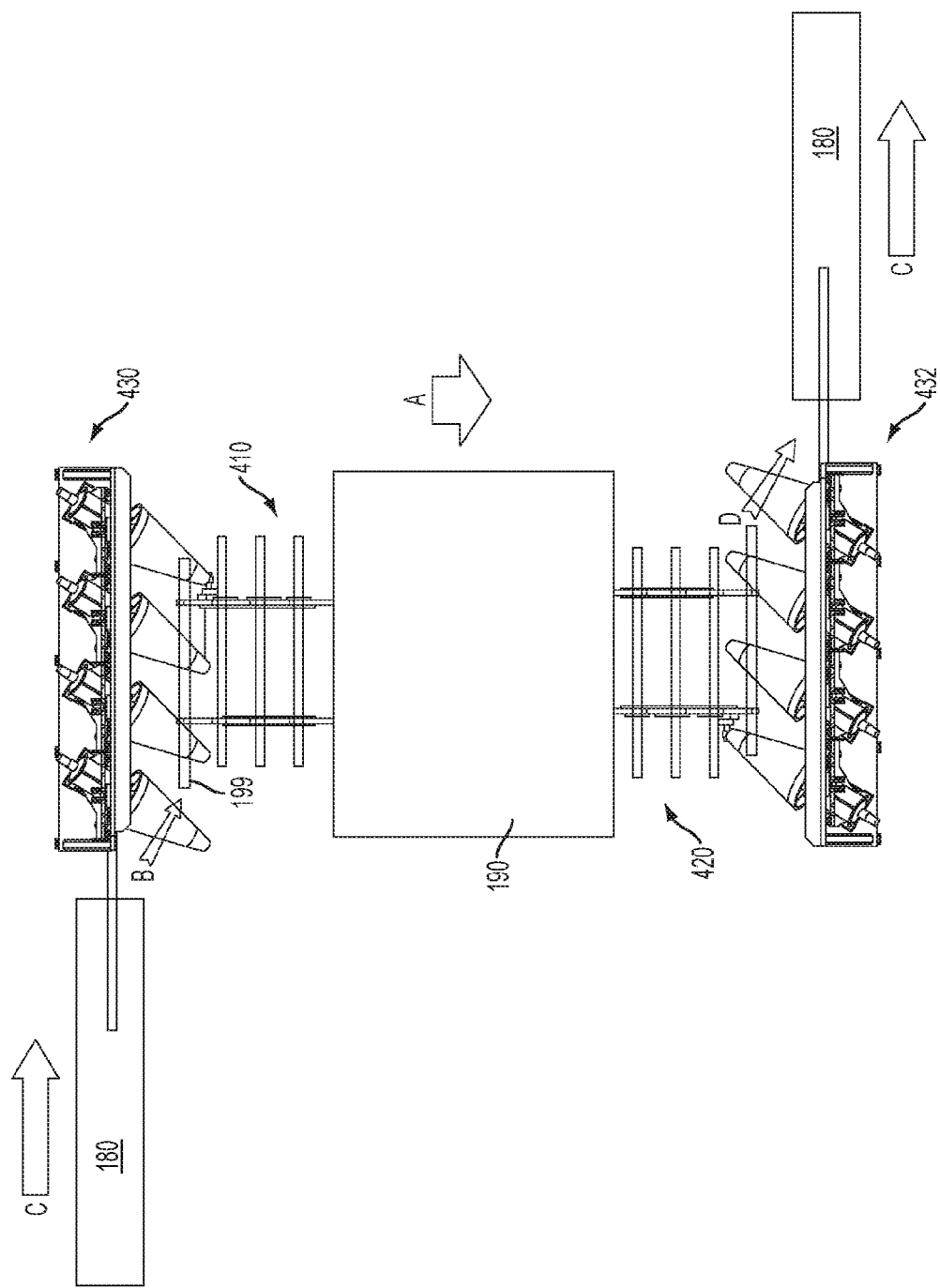
FIG. 11 illustrates a plan view of a tapered roll feed system with an alternative configuration.

One or more tapered feed rolls may be used to translate a series of workpieces along a path of flow with one or more bends or turns (e.g., a path with a right angle bend, a 'zigzag' path as shown in FIGS. 10 and 11, or a U-shaped path), in a manner that maintains some or all of the workpieces in their original sequence. An existing processing line may be modified by adding tapered feed rolls in order to introduce a bend in the existing path of workpiece flow. This may be done, for example, to reduce the length of the processing line or fit a processing line within available space.

Figure 2:
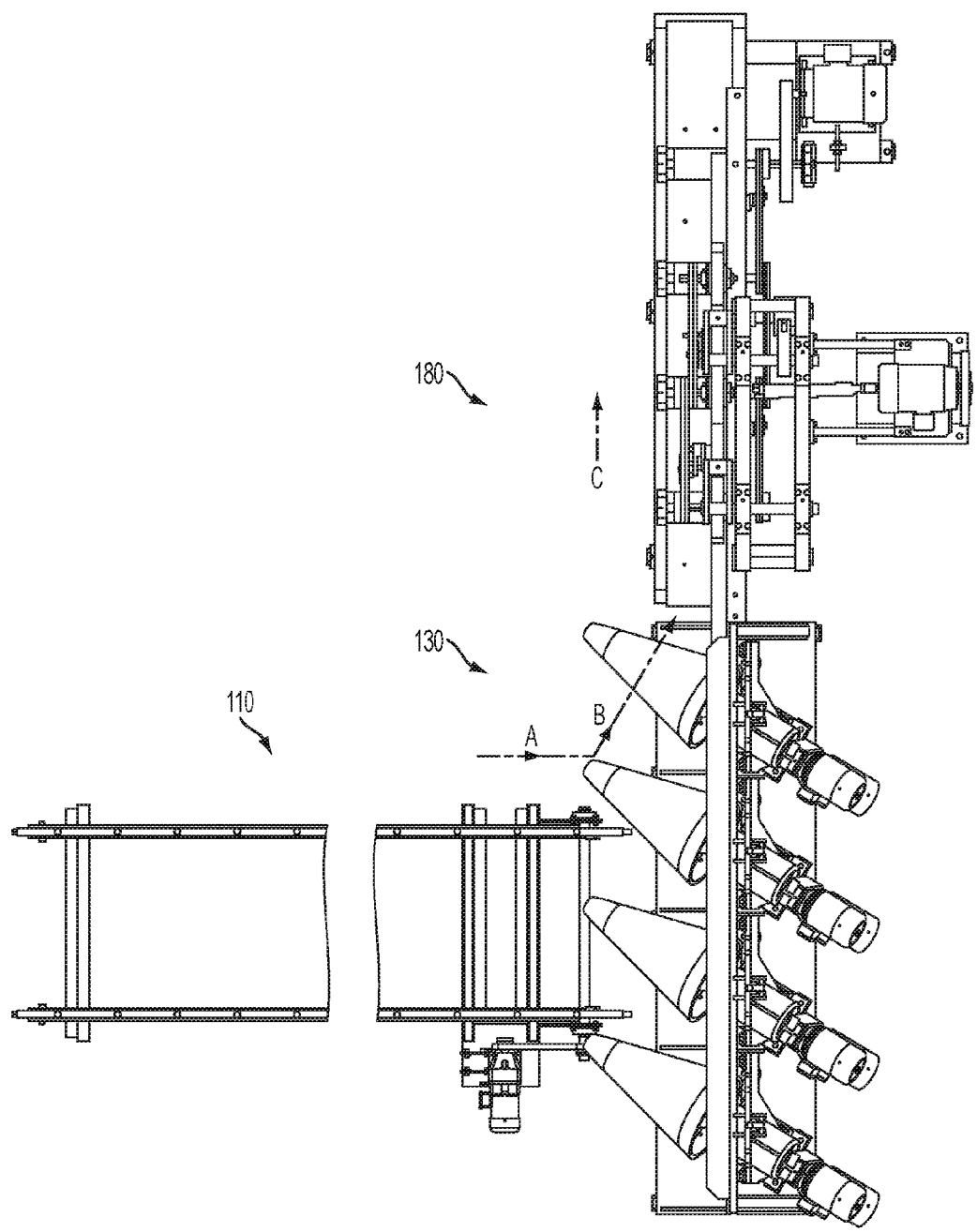
FIG. 2 illustrates a plan view of the tapered roll feed system of FIG. 1.

FIGS. 1A and 2 illustrate perspective and plan views, respectively, of a tapered roll feed system in accordance with various embodiments, where the feed rolls are being used as part of an infeed system. As best shown in FIG. 2, a tapered roll feed system may include a transverse conveyor assembly 110, tapered roll assembly 130, and lineal conveyor 180. Transverse conveyor assembly 110 may include a frame 116, a drive 118, and one or more lugged chain(s) 112 comprising lugs 114. The drive 118 may be coupled to lugged chain(s) 112 and may be configured to drive the lugged chain(s) 112. Some embodiments may include a belt, a smooth chain, or other transfer surface instead of, or in addition to, a lugged chain. The lugged chain(s) 112 may be driven at an adjustable rate of speed, allowing workpieces to be fed individually to the tapered roll assembly 130 at intervals sufficient to help prevent collisions between successive workpieces and help avoid excessive gaps between workpieces. The illustrated transverse conveyor assembly is merely one example, not intended to be limiting, and the present disclosure is intended to encompass any apparatus suitable for mechanically moving workpieces.

Tapered roll assembly 130 may include a base 140 coupled to a vertical support 142, one or more upper tapered feed rolls 132, a guide 156 coupled to vertical support 142 and side rolls 150 (see FIG. 6), and one or more lower tapered feed rolls 136. Generally, and as will be described in detail below, upper and lower tapered feed rolls 132/136 may work in conjunction with each other to change the direction and/or speed of a work piece that is entering the tapered roll assembly. In various embodiments, one or more upper feed rolls 132 may be generally conical in shape and disposed directly above a corresponding lower feed roll 136. In various other embodiments, the upper and lower feed rolls may be offset from each other (see e.g., FIG. 1B). Upper feed rolls 132 may move up, down, and/or along an arcuate path, and/or may be attached to a pivoting frame. For example, base 140 and/or vertical support 142 may be pivotable.

Upper and lower tapered feed rolls 132/136 may be constructed of any suitable material, such as rubber, metal, plastic, a polymer, etc., or any combination thereof. Upper and lower tapered feed rolls 132/136 may have a surface texture or treatment for improved frictional engagement or gripping of workpieces. For example, the narrow distal end 152 and/or the wider proximal end of a tapered feed roll may be coated or textured, coated with an elastomer, etc., in order to help improve transition of the workpieces from one station to the next. A tapered feed roll may have any suitable surface texture, such as smooth, spiked, rubbery, or knurled. Optionally, the outer surface of tapered feed roll 736 or some portion thereof may be provided with a surface coating or texture to increase or decrease friction against the workpieces. For example, the tapered feed roll may be chrome-plated or treated with a polyester such as polytetrafluoroethylene at one end to minimize surface friction, and the other end may be provided with a rubbery or rough texture for greater surface friction. Some tapered feed rolls may have a raised or depressed spiral pattern along some or all of the outer surface (e.g., at the narrower end, at the wider end, or along the entire length of the feed roll). The narrow end of the tapered feed roll may be rounded. Alternatively, the narrow end of the tapered feed roll may be flat or pointed.

Figure 1E:
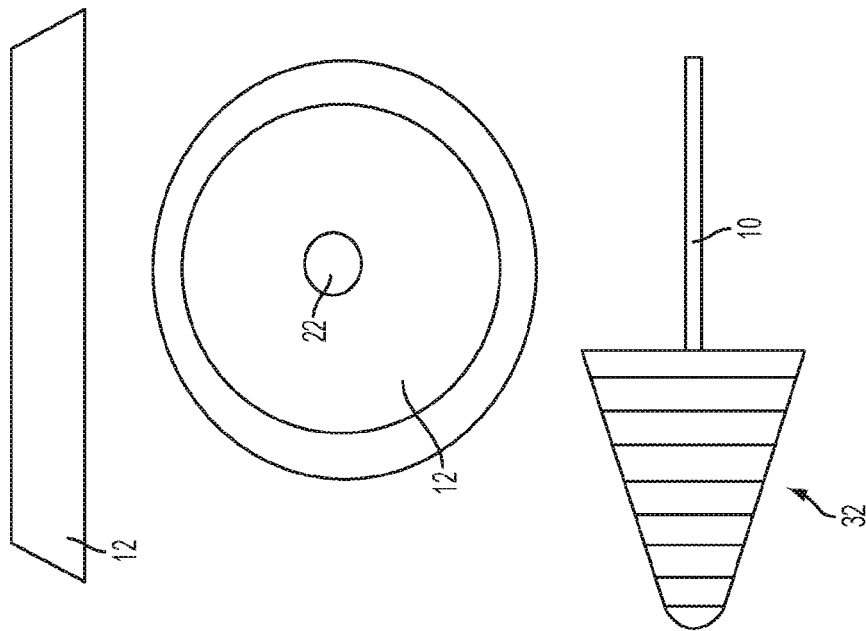
Figure 1D:
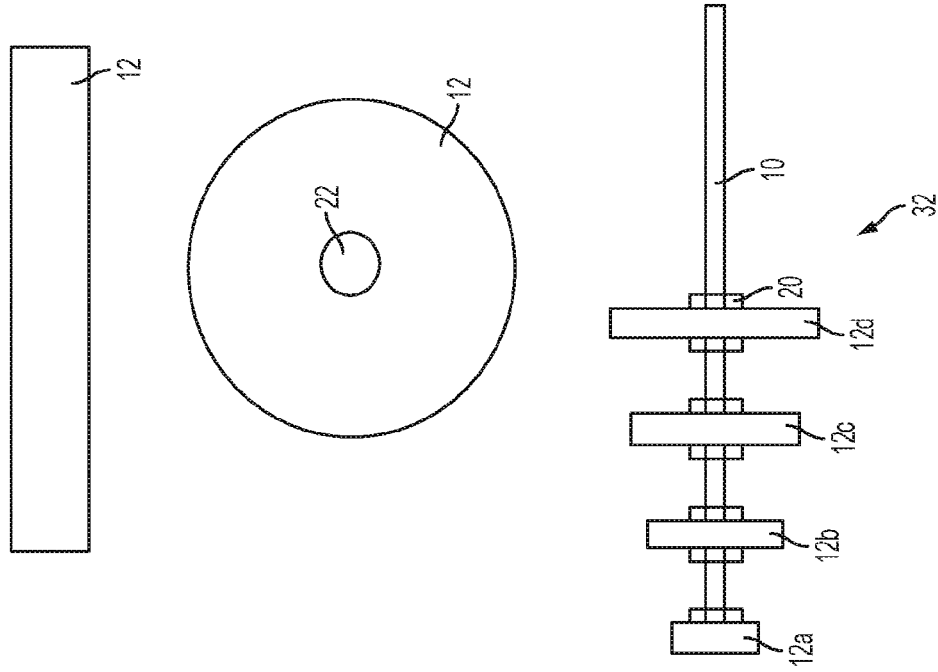

The dimensions of upper tapered feed rolls 132 and lower tapered feed rolls 136 may vary among embodiments. In one embodiment, the proximal end diameter may be four times the diameter of the distal end (i.e. proximal end to distal end ratio of 4:1; see e.g. FIG. 5). In other embodiments, the proximal end diameter may be between about 2 and 5 times the distal end diameter. In accordance with various embodiments, some tapered feed rolls may have an adjustable diameter, which may help modify the speed of the workpiece. Each of FIGS. 1C, 1D, and 1E illustrate block diagrams of tapered feed rolls with adjustable diameters. For example, as shown in FIGS. 1D and 1E, a tapered feed roll may comprise two or more conical/frustum/round plates 12 having one or more apertures 22 and/or fastening elements 20, allowing plates of varying diameters to be coupled together in a stack or spaced array along a shaft 10 to form a tapered feed roll 32. Plates of varying diameters may be added or exchanged with other plates along the shaft to alter the length, diameter, degree of tapering, etc. of the tapered feed roll. Optionally, two or more of the plates arranged along the shaft may be separated by a gap. One or more fasteners 20 may be coupled to a plate and/or shaft to retain the plate in a desired position.

In another example, a tapered feed roll may comprise an expandable ring within an outer end, spokes/rods connecting the expandable ring to the distal end of the tapered feed roll, and overlapping outer surface plates. In this example, the diameter of the proximal (widest) end may be increased by expanding the ring, providing an adjustable distal to proximal end diameter ratio. In a third example, as illustrated in FIG. 1C, one or more hollow outer shells/coverings 16, 18 may be fitted over a feed roll core 14 to change the length, degree of tapering, etc. Optionally, feed roll core 14 may have a cylindrical, conical, or frustoconical profile. Feed roll core 14 may be coupled to a shaft 10, and shells/coverings 16, 18 may be coupled to feed roll core 14 using one or more bolts, screws, pins, or other suitable fasteners known in the art.

As shown in FIG. 1A, each upper tapered feed roll 132 may be coupled to and driven by an upper feed roll driver 134. Similarly, each lower tapered feed roll 136 may be coupled to and driven by a lower feed roll driver 138. Upper/lower feed roll drivers 132/134 may include any type of motor and/or other driver. In some embodiments, each upper and lower tapered feed rolls 132 and 136 may be coupled to and driven by an individual driver/motor. In some embodiments two or more feed rolls may be driven by a single driver. For example, one or more tapered feed rolls may comprise an integrated drum motor. In another example, a plurality of upper tapered feed rolls may be driven by one feed roll driver while the lower tapered feed rolls are driven by a second feed roll driver.

Upper and lower tapered feed rolls 132/136 may be positioned at an angle with respect to transverse conveyor assembly 110, fence 156, and/or vertical support 142. In one example, the feed axis of the transverse conveyor assembly 110 (i.e. vector indicated by Arrow A (in FIGS. 2 and 7B), which is the general direction of workpiece flow in the illustrated example, is approximately perpendicular to the longitudinal axis of vertical support 142 (i.e. vector indicated by Arrow C in FIGS. 2 and 7B), substantially forming a right triangle. In this example, where the direction of workpiece flow along the transverse conveyor assembly 110 (shown by Arrow A) is at 0 degrees and the direction of workpiece flow along the lineal conveyor 180 (shown by Arrow C) is at approximately 90 degrees, an upper/lower tapered feed roll 132/136 may be positioned with the axis of rotation extending at an angle of, for example, approximately 30 degrees relative to direction of workpiece flow along the transverse conveyor assembly. The angle may vary among embodiments. In the above example, the angle may be within a range of 10 to 50 degrees, etc. In some embodiments, the angle may be adjustable between 1 degree to 89 degrees. Similarly, the upper and/or lower tapered feed rolls 132/136 may be set at an angle with respect to the vertical support 142. For example, where the vertical support 142 is substantially perpendicular to base 140, the axis of rotation of an upper tapered feed roll 132 may be oblique to the horizontal longitudinal axis of vertical support 142 and/or oblique to the vertical plane of vertical support 142. As another example, the axis of rotation of an upper tapered feed roll 132 may be oblique to one or both of guide 156 and guide 184.

Lineal conveyor 180 maybe positioned adjacent to the tapered roll assembly 130 and adapted to receive workpieces being transferred by the tapered feed rolls. In various embodiments, lineal conveyor 180 may include lower rolls 182, guide 184, and a press roll assembly 186. Lower rolls 182 may be driven rolls or non-driven rolls. Press roll assembly 186 may be configured to retain workpieces on lineal conveyor 180 as they are conveyed toward the processing apparatus 190. Press roll assembly 186 may include driven or non-driven rolls and a height adjustment mechanism to raise and lower the press rolls and/or the press roll assembly as desired. Other components such as a processing apparatus 190 (e.g. planer, matcher, moulder, edger, etc.), scanner/optimizer 198, computing device 194, conveyor 196, repositioner 202, and/or controller 204 may also be coupled to one or more components of lineal conveyor 180, transverse conveyor assembly 110, and/or tapered roll assembly 130 (see FIG. 8).

In various embodiments, lineal conveyor 180 may be between eight and twenty-five feet in length, or longer or shorter as needed depending on the processing required. In one example, transverse conveyor assembly 110 may be positioned such that its horizontal longitudinal axis and direction of flow are perpendicular to the horizontal longitudinal axes of tapered roll assembly 130 and lineal conveyor 180. Thus, a tapered roll feed assembly as shown in FIG. 1A may have a length of less than forty feet in a first dimension (i.e. the length of transverse conveyor assembly 110 added to the width of the tapered roll assembly 130) and less than thirty feet in a second dimension (i.e. the length of the tapered roll assembly 130 added to the length of the lineal conveyor 180). In particular, the lineal conveyor 180 may be shorter than a conventional bridge/transfer. For example, lineal conveyor 180 may be less than 20 feet in length, less than 15 feet in length, or less than 10 feet in length.

In operation, workpieces may be conveyed by lugged conveyor 112 along transverse conveyor assembly 110 toward the tapered roll assembly 130 in the direction shown by Arrow A. The workpieces may be individually separated by the lugs 114. Thus, each workpiece may be individually presented to paired upper and lower tapered feed rolls 132/136 in a transverse orientation (i.e. lengthwise, perpendicular to the direction of travel shown by Arrow A), and the narrow, distal ends 152 of upper and lower tapered feed rolls 132/136 (see e.g. FIG. 5) may contact one workpiece at a time.

As individual workpieces contact the tapered rolls, they may be driven by the tapered rolls toward the tapered roll assembly 130 and lineal conveyor 180 along an angled path shown by Arrow B. The workpieces may enter the upper and lower tapered feed rolls 132/136 at the distal (i.e. narrowest) end 152, and exit generally at or near at the proximal (i.e. widest) end 154 (see e.g. FIG. 5). The upper and lower tapered feed rolls 132/136 may be arranged at an angle to the guides 156 and/or 184. For example, as shown in FIG. 1A, upper and lower tapered feed rolls 132/136 may be arranged at a 30 degree angle with respect to guide 184. The angle and tapering of the tapered rolls may cause the workpieces to be pulled toward a vertical support or guide 156 of the tapered roll assembly 130 while the workpieces substantially retain their previous orientation (i.e. with the longitudinal axis of the workpieces generally perpendicular to the direction shown by Arrow A).

As the workpieces progress from the narrow, distal ends of the tapered rolls to the wider, proximal ends of the tapered rolls, the workpieces may be gradually accelerated due to the increasing surface velocity at the wider, proximal ends of the tapered rolls. Lineal conveyor 180 may receive the workpieces from the tapered roll assembly 130 and convey the workpieces in the direction shown by Arrow C toward a processing apparatus such as a planer, edger, matcher, moulder, or other cutting/finishing machine.

Figure 3:
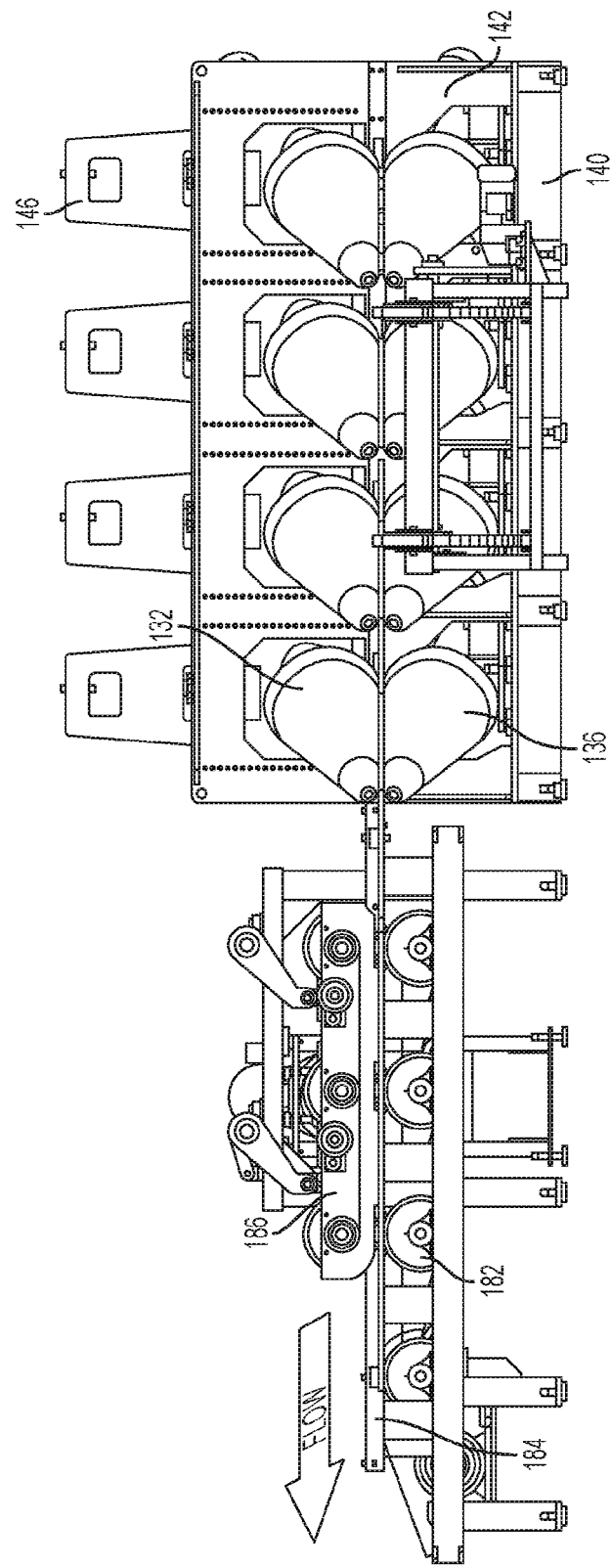
FIG. 3 illustrates a side elevational view of the lineal conveyor assembly of FIG. 1.

As shown in FIG. 3, upper tapered feed rolls 132 may be paired in vertical alignment with lower tapered feed rolls 136. The upper tapered feed rolls 132 and the lower tapered feed rolls 136 may rotate in opposite directions (i.e. clockwise and counterclockwise). The upper/lower tapered feed rolls 132/136 may be positioned such that the lower surface of the upper tapered feed rolls 132 and the upper surface of the lower tapered feed rolls 136 are substantially parallel to the upper surface of the lugged chain, leaving a gap of substantially constant height between each paired upper and lower tapered feed roll. While four pairs of tapered feed rolls are illustrated, other embodiments may include one, two, three, five, six, or more pairs. In an alternate embodiment, upper tapered feed rolls 132 and lower tapered feed rolls 136 may be vertically offset, for example with a lower tapered feed roll 136 positioned below and between two upper tapered feed rolls 132 (see e.g., FIG. 1B).

Figure 5:
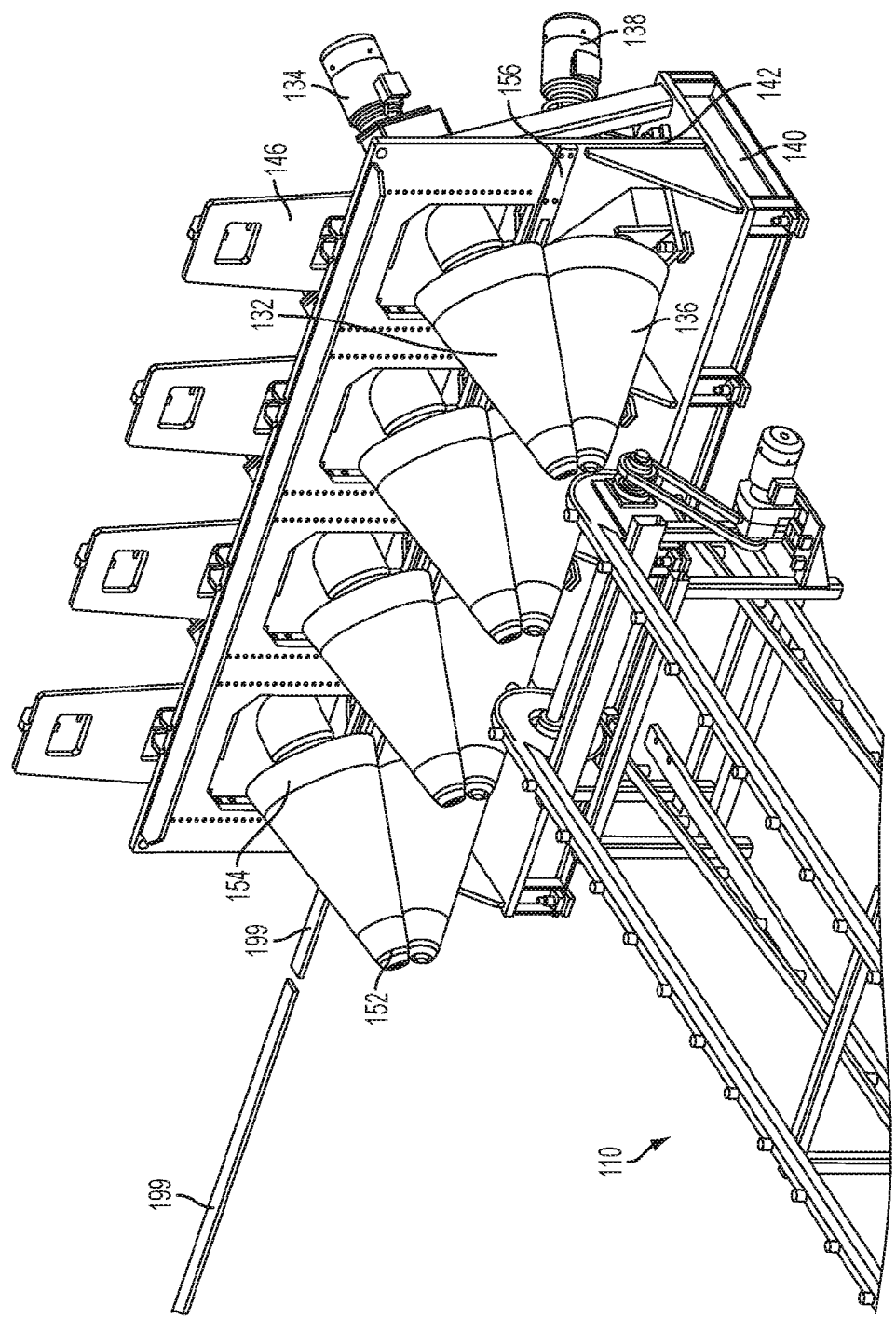
FIG. 5 illustrates a front perspective view of a tapered roll assembly and transverse conveyor assembly in accordance with various embodiment.

Referring now to FIGS. 4, 5 and 6, one or more plates 146 may be coupled to the vertical support 142 of the tapered roll assembly 130 to allow vertical displacement/repositioning of upper tapered feed rolls 132 relative to lower tapered feed rolls 136. In some examples, a plate 146 may be pivotable around a pivot point or along an arcuate path. As shown in the illustrated embodiment, plates 146 may be coupled to one or more upper tapered feed rolls 132 and movably coupled to tracks 158 of the vertical support 142, allowing plates 146 to be raised, lowered, pivoted, and/or moved along an arcuate path relative to vertical support 142. Tracks 158 may comprise ridges, rails, grooves, or other known movable/slideable coupling elements. An adjustment assembly 148 may be coupled to plate 146 and to vertical support 142. Adjustment assembly 148 may comprise a lift mechanism, such as a piston, configured to apply force against vertical support 142 and plates 146 to raise or lower plates 146 with respect to vertical support 142. For example, adjustment assembly 148 may include a tensioning cylinder coupled to a positioning cylinder. The tensioning cylinder may bear part of the weight of the corresponding tapered feed roll, and the positioning cylinder may be actuated to raise and lower the tapered feed roll. Alternatively, adjustment assembly 148 may comprise a passive sliding mechanism that allows plates 146 to be pushed upward to accommodate workpieces as they are pulled between the tapered feed rolls, the weight of plates 146 and upper tapered feed rolls 132 applying sufficient pressure to secure the workpieces. A separate plate 146 may be provided for each upper and lower tapered feed roll pair. In some embodiments, two or more upper tapered feed rolls may be coupled to, and vertically repositionable with, a single plate 146. The upper and lower tapered feed rolls may be vertically repositioned to adjust the size of a gap between two or more tapered feed rolls.

In some embodiments, the adjustment assembly may be (or may include) an electric, pneumatic, hydraulic, or electro hydraulic mechanism (e.g., a linear actuator, rotary actuator, or cylinder) coupled to plate 146 and the support. Other embodiments may lack a plate 146, and may instead have another slideable support structure that functions in a similar manner (e.g., a bar or other rigid structure).

Different mechanisms for raising and lowering the feed rolls may be provided instead of, or in addition to, those described above. For example, the tapered feed rolls may be pivotably mounted to the support. An actuator may be coupled to one or more of the feed rolls, and may be configured to pivot the tapered feed roll(s) to a desired position. A separate actuator may be provided for each tapered feed roll. Alternatively, one actuator may be coupled to, and operable to reposition, two or more tapered feed rolls. In a specific example, a first actuator may be coupled to some or all of the upper feed rolls and a second actuator may be coupled to some or all of the lower feed rolls. The first and second actuators may be separately actuated to reposition the upper and lower tapered feed rolls, respectively. Optionally, a tapered feed roll may be pivotable upwardly or downwardly toward another tapered feed roll or support surface to engage a workpiece. For example, upper and lower tapered feed rolls may be pivoted toward one another to grasp a workpiece in a scissors-like fashion, and/or to pull or lift the workpiece from a conveyor (e.g., a transverse conveyor).

The size of the gap between two tapered feed rolls can also be adjusted in other ways. For example, the diameter, length, and/or taper angle of the tapered feed rolls may be adjusted by adding or removing an outer plate or covering, as described above. This may increase or decrease the size of the gap. In addition, where the tapered feed rolls comprise two or more plates, the diameter, length, and/or taper angle of the tapered feed rolls can be adjusted by adding plates to, or removing plates from, the tapered feed roll or part thereof. As another example, the tapered feed rolls may be mounted on an extendable shaft, allowing them to be extended along their corresponding axes of rotation. Extending or retracting a tapered feed roll may alter the size of the gap between the tapered feed roll and an opposing tapered feed roll.

In various embodiments, the tapered feed rolls may be laterally adjusted relative to the vertical support 142 or guide 156 by a positioner in order to modify the lateral angle of the feed roll axis. In one embodiment, the positioner may include plates 146 that are slideably coupled to one or more generally horizontal grooves or tracks of vertical support 142, which may be adapted to move laterally and adjust the angle of the feed rolls. In another embodiment, as shown in FIG. 6, a lower tapered feed roll 136 and/or lower feed roll driver 138 may be coupled to a positioner, which may include a positioning base 160. Positioning base 160 may further comprise one or more couplers 162. Couplers 162 may couple the positioning base 160 to the base 140 and/or to the vertical support 142. Couplers 162 may be moveably (e.g. slideably/pivotably) coupled to base 140 and/or vertical support 142. In one example, couplers 162 may comprise a cam and cam follower arrangement, or a vertical rod/post in sliding engagement with a corresponding groove or track of base 140. Such a groove or track may be curved to allow repositioning of the positioning base 160 along an arcuate path, such that the axis of rotation of the corresponding tapered feed roll may be adjusted to form any desired angle with respect to the longitudinal axis of the vertical support 140. In other examples, couplers 162 may comprise bearings, tracks/grooves, and/or other movable coupling elements.

Other mechanisms for lateral repositioning of the tapered feed rolls may be used in addition to, or instead of, those described above. For example, the support may be slideably mounted to the floor or other underlying support surface to allow lateral repositioning of the tapered feed rolls relative to a conveyor or transfer. Similarly, the support or part thereof (e.g., vertical support 140) may be slideably mounted to an upright brace or other structure to allow vertical repositioning of the tapered feed rolls as a single unit. Alternatively, as described above, the tapered feed rolls may be pivotably mounted to a support and coupled to one or more actuators configured to pivot the tapered feed rolls to a desired orientation (e.g., an orientation determined by a computing device or system). Optionally, separate actuators may be provided for lateral repositioning (e.g., for laterally skewing a tapered feed roll relative to the support) and for vertical positioning (e.g., for tilting a tapered feed roll upward or downward).

Tapered feed rolls may be laterally repositioned relative to the transfer/conveyor and/or adjacent tapered feed roll(s). The distance between laterally adjacent tapered feed rolls, or between laterally adjacent pairs of tapered feed rolls, may be selectively adjusted. For example, laterally adjacent tapered feed rolls may be moved closer together to handle workpieces of a first length (e.g. 8 feet), and moved further apart to handle workpieces of a greater second length (e.g., 12 feet, 15 feet, or 20 feet). Distances between adjacent tapered feed rolls or pairs may be adjusted by linear positioners or other actuators. Optionally, two adjacent tapered feed rolls may be connected by a linear positioner that can be actuated to increase or decrease the distance between them. Alternatively, a linear positioner may be used to synchronously move a pair of tapered feed rolls (e.g., upper and lower) from side to side.

Optionally, tapered feed rolls may be laterally and/or vertically repositionable relative to a transfer/conveyor in response to a command by a computing device/system. Alternatively, the transfer/conveyor (e.g., transverse conveyor assembly 110, lineal conveyor 180) may be vertically and/or laterally repositioned relative to the tapered feed rolls. Such transfers/conveyors are known in the art and will not be described in further detail herein. In any case, the position (angle, lateral position, vertical position) of the tapered feed rolls may be readjusted for individual workpieces or for a batch of workpieces. The adjustments may be based on workpiece/batch characteristics determined by a scanner or computing system, described further below. The adjustments may also be based on a destination or path of travel selected by the computing system for the workpiece(s), and the angle at which the workpiece(s) must be driven relative to the infeed or outfeed in order to reach the selected path of travel. Alternatively, the adjustments may be determined or set by a human operator based on factors such as an approximate workpiece length or thickness or a desired destination or path of travel.

The tapered feed rolls may also be vertically repositioned to adjust the pressure applied to a workpiece engaged in the gap between them. In some embodiments, an adjustment assembly may include a pressure sensor or tension gauge configured to detect pressure exerted by the workpiece against a tapered feed roll. The vertical position of the tapered feed roll may be adjusted based on the detected pressure or tension.

Figure 8:
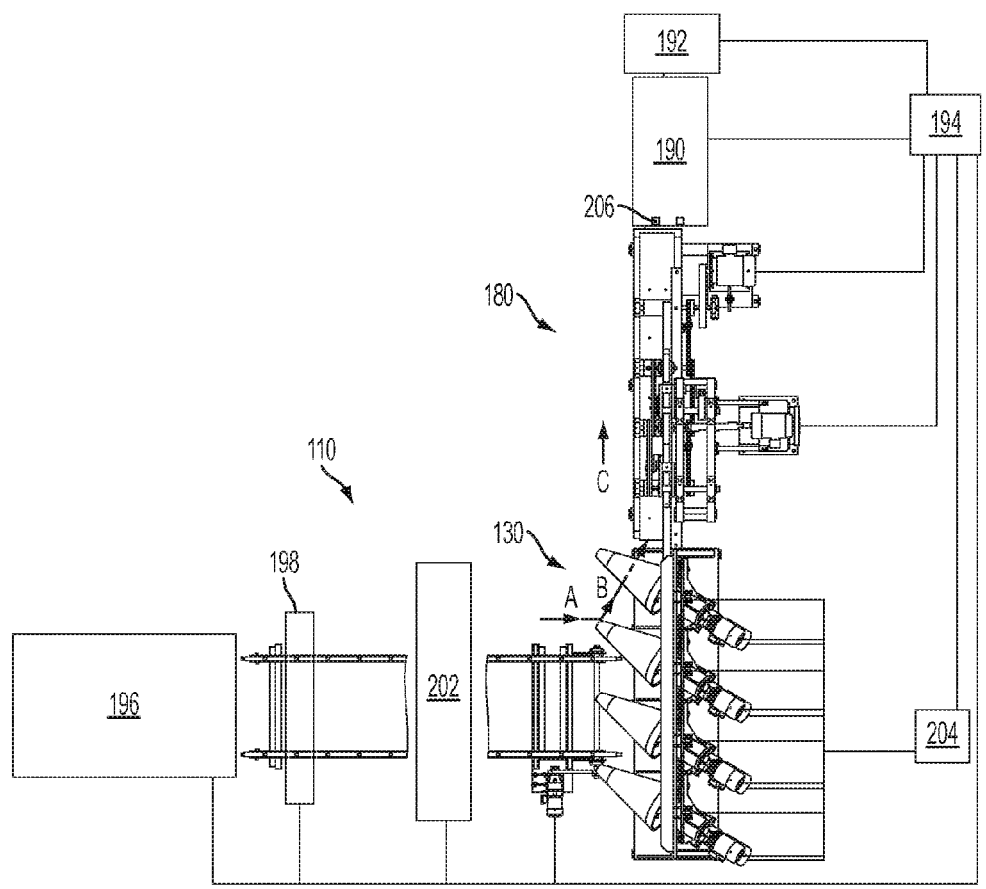
FIG. 8 is a block diagram illustrating an optimizing tapered roll feed system.

The positioners may be coupled to, and operated/controlled by, a controller and/or other device (e.g. controller 204, computing device 194, controller 204, processing apparatus 190, etc., see FIG. 8). In one example, positioner may comprise an actuator configured to adjust the vertical/horizontal position of a positioner (e.g. positioning base 160 or plates 146) in response to a command from the controller and/or other device to adjust the horizontal and/or vertical orientation of the corresponding tapered feed roll. Two or more tapered feed rolls and/or positioning bases 160 may be coupled to allow synchronous adjustment of tapered feed rolls.

FIGS. 7A and 7B illustrate plan views of a transverse conveyor assembly and a tapered roll assembly. As shown in FIG. 7A, a workpiece 199 may be conveyed on transverse conveyor assembly 110 toward the tapered roll assembly 130 and into contact with the distal ends 152 of the tapered feed rolls.

As a workpiece 199 contacts the distal ends 152 of upper and lower tapered feed rolls 132/136, the workpiece 199 may be pulled toward the proximal ends 154 of the upper and lower tapered feed rolls 132/136 (direction shown by Arrow A, FIG. 7B) due to the angle of the tapered feed rolls 132/136. At the same time, the rotation of upper and lower tapered feed rolls 132/136 may also propel the workpiece toward the lineal conveyor 180 (direction shown by Arrow C, FIG. 7B). As a result, the workpiece may move along a path of flow that is perpendicular to the rotational axes of the upper and lower tapered feed rolls 132/136. For example, where the upper and lower tapered feed rolls 132/136 are angled at 30 degrees with respect to the vector indicated by Arrow A, the workpiece may move in the direction indicated by Arrow B. The workpiece may substantially maintain its orientation, with the longitudinal axis approximately parallel to the vector indicated by Arrow A, during this process.

The surface speed of the tapered rollers is greater at proximal ends 154 than at distal ends 152. Thus, the tapered rollers may gradually accelerate the workpiece 199 as it proceeds toward the proximal ends 154 and toward a guide (e.g. guide 184 and/or guide 156, shown in FIG. 1A).

Guide 184 may comprise a fixed straight edge lumber guide that positions each workpiece for feeding into a processing device. For example, guide 184 may align workpieces with one or more positioning or cutting components of a planer. When the workpiece 199 reaches guide 184 and/or 156, the upper and lower tapered feed rolls may continue to crowd the workpiece along guide 184. The workpiece will then be traveling in a lineal fashion, parallel to the vector indicated by Arrow C.

The rotational speeds of the upper/lower tapered feed rolls may be adjustable to accelerate the workpiece 199 to travel along the lineal conveyor 180 at a rate matching that of a processing apparatus (e.g. processing apparatus 190). For example, the rotational speeds of upper/lower tapered feed rolls 132/136 may be adjusted to cause the workpiece 199 to travel along the lineal conveyor 180 at a speed that matches the cutting speed of a planer coupled to lineal conveyor 180. The rotational speeds of upper/lower tapered feed rolls 132/136 may also be adjusted to increase or decrease gaps between successive workpieces on lineal conveyor 180. In some embodiments, adjacent tapered feed rolls or adjacent pairs of tapered feed rolls may be driven at different speeds. Optionally, a series of tapered feed rolls/pairs may be driven at successively greater or lesser speeds according to their relative positions in the series, with the tapered feed roll/pair at one end of the series having the highest speed and the tapered feed roll/pair at the opposite end of the series having the lowest speed. For example, in a row of three tapered feed roll pairs, the first tapered feed roll pair may be driven at a first speed, the next adjacent tapered feed roll pair may be driven at a second speed that is greater than the first speed, and the third tapered feed roll pair may be driven at a third speed that is greater than the first and second speeds.

FIG. 8 is a block diagram illustrating an optimizing workpiece feed system, arranged in accordance with various embodiments. An optimizing workpiece feed system may include transverse conveyor assembly 110, tapered roll assembly 130, and lineal conveyor 180 essentially as described above. The system may further include a conveyor 196, a repositioner 202, and a scanner/optimizer 198 operatively coupled to transverse conveyor assembly 110. A processing apparatus 190 may be operatively coupled to, and positioned to accept workpieces from, lineal conveyor 180. An outfeed 192 may be operatively coupled to, and positioned to accept workpieces from, processing apparatus 190. A computing device 194 may be coupled to one or more of these or other components (see e.g. FIG. 8). A controller 204 may be coupled to one or more components of tapered roll assembly 130, scanner/optimizer 198, and/or computing device 194. One or more of scanner/optimizer 198, computing device 194, and controller 204 may be integrated within a single device.

Conveyor 196 may comprise any workpiece storage/transport device, including but not limited to a belt/chain, rollers, table/platform, etc. Repositioner 202 may comprise any device for removing workpieces from a path of flow by diverting, ejecting, or otherwise dislocating the workpieces from the path of flow (e.g. a ducker, a stopper, a dropout mechanism, etc.). In some examples, repositioner 202 may be any device configured to flip and/or rotate a workpiece to a desired orientation (e.g. from wane down to wane up) based on scan data, a command, and/or manual activation. Repositioner 202 may be positioned in any suitable location, such as within, before, or after the transverse conveyor assembly 110. For example, repositioner 202 may be disposed between the transverse conveyor assembly 110 and the tapered roll assembly 130. As another example, repositioner 202 may be located between the tapered roll assembly 130 and the lineal conveyor 180. In still another example, repositioner 202 may be located along/after the lineal conveyor 180 and before the processing apparatus 190.

Scanner/optimizer 198 may also be disposed within, before, or after the transverse conveyor assembly 110. For example, scanner/optimizer 198 may be positioned along conveyor 196 or between conveyor 196 and transverse conveyor assembly 110. Scanner/optimizer 198 may comprise a lineal scanner, a transverse scanner, and/or one or more cameras or other imaging devices, any or all of which may be arranged above, below, or to the side of a path of workpiece flow. Scanner/optimizer 198 may scan of individual workpieces on the transverse conveyor assembly 110, generate corresponding scan data, and send the scan data to one or more other components. The scan data may be used to determine one or more characteristics of a workpiece (e.g. physical dimensions, contours, color, species, grain angle, density, pith, pitch, rot, shelling, knots, wane, curvature/bow, warp, moisture content, shake, wet pockets, insect damage, and/or other defects) that may be used to generate an optimized processing solution for the workpiece.

Processing apparatus 190 may be a planer, matcher, moulder, edger, shape saw, and/or any other processing device. Processing apparatus 190 may include one or more movable elements 206 that are repositionable to accommodate variations in workpiece size, cutting/processing patterns, etc. Movable elements 206 may be workpiece positioners, cutting/planing/routing elements, chipping heads, or other elements.

Controller 204 may be configured to adjust the angle and/or rotational speed of one or more tapered feed rolls 132/136, individually or in groups of two or more, in response to a command from scanner/optimizer 198 and/or computing device 194. This adjustment may be automatic, and may be based on factors such as size of gaps between successive workpieces, workpiece sizes, processing apparatus speed and/or time required to adjust a processing apparatus for processing a workpiece, etc. In some examples, controller 204 may be configured to facilitate manual adjustment/setting of tapered feed roll rotational speed, angle, and/or vertical position.

Scanner/optimizer 198 and/or computing device 194 may include a processor, a memory storing one or more algorithms, and computer executable instructions operable, upon execution, to implement the stored algorithms. Examples of a stored algorithm may include, but are not limited to, algorithms for: generating one or more optimized processing (e.g. cutting, planing, edging, or finishing) solutions for a scanned workpiece based on scan data; predicting/determining a gap size between successive workpieces on transport 180; adjusting a gap between successive workpieces (e.g. by assessing the rotational speed of a tapered feed roll and the length of the gap, determining a corrective adjustment to the rotational speed, and sending a command to the corresponding feed roll drive to make the corrective adjustment); controlling/adjusting/coordinating the operation of system components to reduce gaps between workpieces based on one or more of scan data, optimized processing solutions, workpiece processing speed of the processing apparatus, etc.; sending a command to reposition or drop out a workpiece based on scan data; monitoring and adjusting the rotational speed, angle, and/or position of a tapered feed roll; and/or adjusting operation of the processing apparatus 190 based on an optimized processing solution (e.g. by sending a command to the processing apparatus 190 to reposition one or more movable elements of the processing device based on a processing solution for a workpiece on lineal conveyor 180).

In some embodiments, processing apparatus 190 may be an optimizing processing device such as an optimizing planer, optimizing edger, or optimizing matcher/moulder and may comprise some or all of the functions of computing device 194. Processing apparatus 190 may accept workpieces from lineal conveyor 180 and process each workpiece according to an optimized processing solution/pattern received from the scanner/optimizer 198. Processing apparatus 190 may be configured to adjust or regulate the operation of other components of the system, as described above with respect to computing device 194.

In an example operation, workpieces may be conveyed to the transverse conveyor assembly 110 on conveyor 196. The workpieces may be individually scanned by scanner/optimizer 198 before, during, or after the transfer of workpiece to the transverse conveyor assembly 110. Scan data may be sent to the computing device 194, the controller 204, and/or repositioner 202. For example, scanner/optimizer 198 may send scan data for a workpiece to computing device 194, and computing device 194 may determine that the scan indicates a defect that renders the workpiece unsuitable for further processing. Computing device 194 may then send a command signal to repositioner 202. In response to the command signal, repositioner 202 may remove the defective workpiece from the lugged chain 112. Scanner/optimizer 198 may determine an optimized processing solution (e.g. optimized planing/cutting/edging solution) and/or optimized processing pattern for each workpiece scanned. The optimized processing solution/pattern may be sent to the computing device 194, repositioner 202, and/or controller 204.

Workpieces may be conveyed along transverse conveyor assembly 110 and into contact with one or more upper and lower tapered feed rolls of tapered roll assembly 130 as described above. The upper tapered feed rolls 132 may be raised or lowered based on the scan data (e.g. based on workpiece thickness, etc.). Adjustment assemblies 148 may be coupled to controller 204, scanner/optimizer 198, and/or computing device 194, and may be configured to raise or lower the upper tapered feed rolls 132 in response to a command from one or more of those components.

The workpieces may be accelerated by the upper and lower tapered feed rolls and conveyed along lineal conveyor 180 toward the processing apparatus 190. Press roll assembly 186 may apply downward force to retain the workpieces on the transfer surface as they move along the guide 184. Press roll assembly 186 may include one or more driven rollers operable to adjust the speed of individual workpieces. In one example, press roll assembly 186 may reduce or increase the speed of a workpiece in response to a command and/or to accommodate the processing speed of the processing apparatus 190.

Computing device 194 may adjust the gaps between successive workpieces and/or adjust workpiece infeed into processing apparatus 190 by sending commands to control the operation of one or more of conveyor 196, scanner/optimizer 198, drive 118, upper/lower feed roll driver 134/138, adjustment assembly 148, press roll assembly 186, lineal conveyor 180, and/or processing apparatus 190. In one example, computing device 194 may issue a command to adjust the rotational speed of upper/lower tapered feed rolls 132/136 based at least in part on one or more optimized processing solutions/patterns. Computing device 194 may also issue a command to adjust the rotational speed of upper/lower tapered feed rolls 132/136 to leave gaps between workpieces sufficient to allow repositioning of movable elements 206 according to the optimized cut solution/pattern for a workpiece on lineal conveyor 180. Computing device 194 may transmit one or more commands to processing apparatus 190, such as a command to reposition movable elements 206 according to the optimized cut solution/pattern for a workpiece on lineal conveyor 180.

The processing apparatus 190 may process one or more workpieces as they enter. As workpieces exit processing apparatus 190, the workpieces may be transferred to an outfeed 192. In some embodiments, outfeed 192 may comprise one or more upper/lower tapered feed rolls arranged/controlled substantially as described above for tapered roll assembly 130. In one example, outfeed 192 may comprise a combination of a conveyor and a tapered roll assembly. The upper/lower tapered feed rolls of outfeed 192 may be configured to reduce, increase, change, or otherwise control the speed and/or direction of the workpieces exiting the processing apparatus 190. An outfeed with tapered feed rolls may be disposed in any suitable location along a path of workpiece flow, such as between conventional conveyors and/or before a second processing apparatus.

Figure 9:
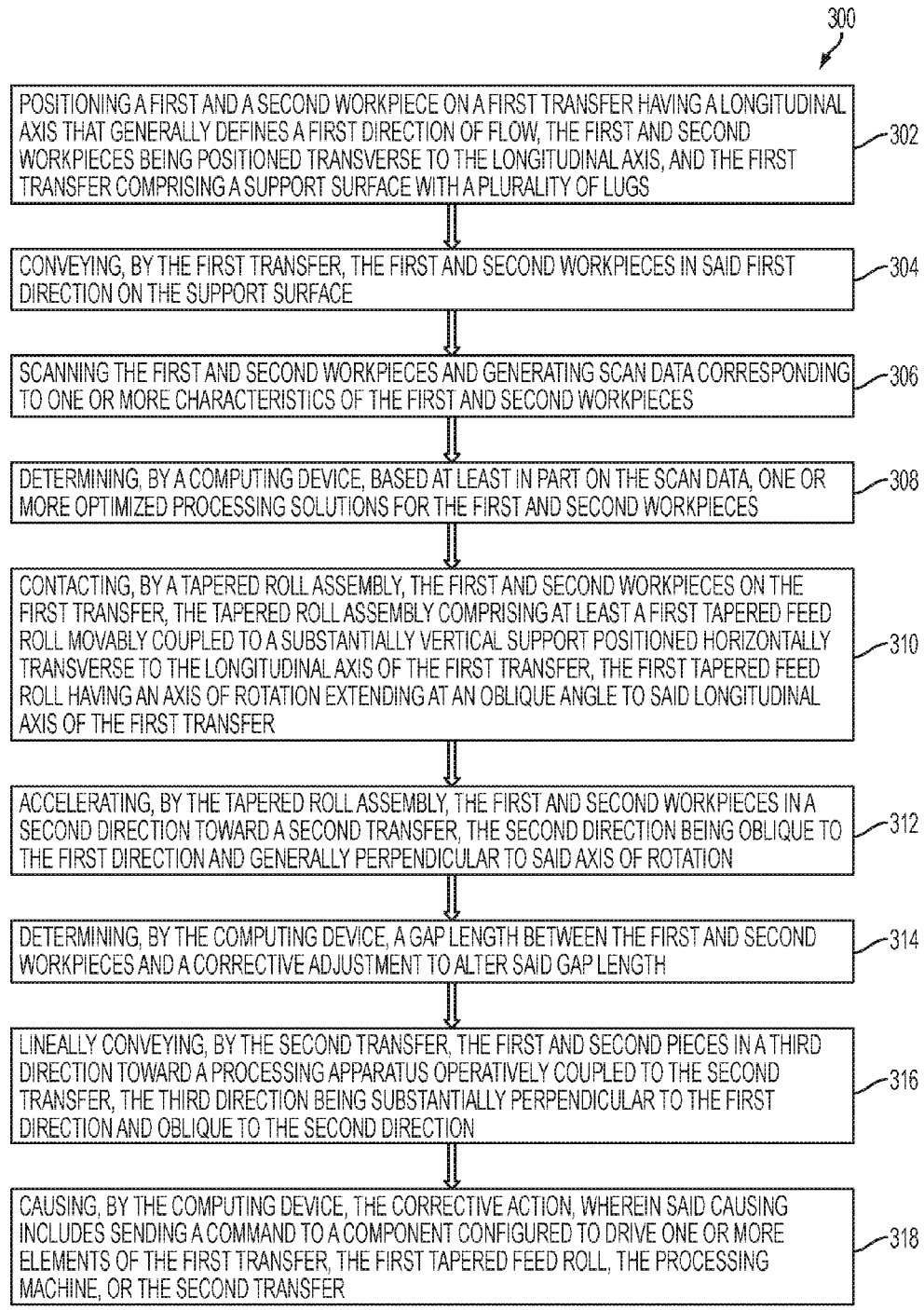
FIG. 9 is a flow chart illustrating a method of manipulating workpieces, such as controlling gaps and/or changing workpiece flow from transverse to lineal and vice versa.

FIG. 9 illustrates a method of manipulating workpieces, such as controlling gaps and/or changing workpiece flow from transverse to lineal and vice versa, arranged in accordance with various embodiments. Method 300 may begin at block 302, "Positioning a first and a second workpiece on a first transfer having a longitudinal axis that generally defines a first direction of flow, the first and second workpieces being positioned transverse to the longitudinal axis, and the first transfer comprising a support surface with a plurality of lugs." The first transfer may comprise any workpiece transfer/conveyance known in the art. For example, transverse conveyor assembly 110 may be the first transfer, and the support surface may include one or more of lugged chains 112. Workpieces may be placed onto the first transfer by any suitable method. The first and second workpieces may be spatially separated on the support surface by one or more lugs or other spacing element(s), with the longitudinal axis of each workpiece extending transverse/perpendicular to the longitudinal axis of the first transfer. Some embodiments may omit block 302, and may begin with block 304.

From block 302, the method may proceed to block 304, "Conveying, by the first transfer, the first and second workpieces in said first direction on the support surface." The first transfer may be driven (e.g. by drive 118 or other mechanism) to transport the workpieces in the first direction (i.e. the first direction of flow). Thus, the workpieces may travel along the first transfer in a broadside or transverse orientation, with the longitudinal axis of each workpiece substantially perpendicular/transverse to the direction of travel.

From block 304, the method may proceed to block 306, "Scanning the first and second workpieces and generating scan data corresponding to one or more characteristics of the first and second workpieces." A scanner (e.g. scanner/optimizer 198) may be positioned before, after, or along the first transfer as described above with reference to FIG. 8. Workpieces may be individually scanned by the scanner, which may generate scan data corresponding to one or more characteristics of each workpiece as described above. Generating scan data may include sending the scan data to another device (e.g. computing device 194, controller 204, processing apparatus 190, etc.).

From block 306, the method may proceed to block 308, "Determining, by a computing device, based at least in part on the scan data, one or more optimized processing solutions for the first and second workpieces." The computing device may be a standalone computing device (e.g. computing device 194). Alternatively, the computing device may be processing apparatus 190, scanner/optimizer 198, controller 204, and/or any combination thereof. The computing device may be a combination of two or more system components, and the determining may be performed partially by one of the devices and partially by another. For example, where the computing device comprises scanner/optimizer 198 and computing device 194, the scanner/optimizer 198 may determine a first optimized processing solution based at least in part on the scan data, and the computing device 194 may determine a second optimized processing solution for the same workpiece based at least in part on an operational parameter such as gap size, first transport speed, rotational speed of one or more tapered rollers, time required to reposition a downstream processing apparatus, etc. This may increase efficiency by allowing adjustment of processing solutions to accommodate changing operational parameters. Some embodiments may omit block 306 and/or 308, proceeding from block 304 to block 308 or 310.

From block 308, the method may proceed to block 310, "Contacting, by a tapered roll assembly, the first and second workpieces on the first transfer, the tapered roll assembly comprising at least a first tapered feed roll movably coupled to a substantially vertical support, the support positioned horizontally transverse to the longitudinal axis of the first transfer, the first tapered feed roll having an axis of rotation extending at an oblique angle to said longitudinal axis of the first transfer." The tapered roll assembly may be a tapered roll assembly 130. The first tapered feed roll may be upper tapered feed roll 132, lower tapered feed roll 136, and/or a pair of feed rolls (e.g. paired upper tapered feed roll 132 and lower tapered feed roll 136). The support may be vertical support 142 or any other suitable support element. The support may be oriented generally perpendicular to, or at an oblique angle to, the first direction and/or first transport. The first tapered feed roll may be positioned as described above with reference to FIGS. 4-6. The first tapered feed roll may have a narrower distal end and a proximal wider end, with the distal end extending toward the first transfer. The first tapered end may be positioned to contact a workpiece at or near the end of the first transport, and the rotation and tapered shape of the first tapered feed roller may pull the workpiece from the first transfer.

From block 310, the method may proceed to block 312, "Accelerating, by the tapered roll assembly, the first and second workpieces in a second direction toward a second transfer, the second direction being oblique to the first direction and generally perpendicular to said axis of rotation." The rotation of the first tapered feed roll may apply force to the workpiece in a direction perpendicular to the axis of rotation, which may cause the workpiece to move in the second direction. The workpiece may remain substantially oriented in a transverse position with respect to the first transfer as it is engaged by the tapered roll assembly and is driven in the second direction by the tapered roll assembly. As the workpiece is pulled toward the proximal end of the first tapered feed roll, the surface speed gradually increases due to the increasing feed roll diameter.

From block 312, the method may proceed to block 314, "Determining, by the computing device, a gap length between the first and second workpieces and a corrective adjustment to alter said gap length." As described above, a computing device (e.g. computing device 194, a scanner, an optimizer, a controller, etc.) may be endowed with one or more algorithms and executable instructions operable, when executed, to determine/predict gap sizes and determine corrective adjustments. Corrective adjustments may include adjustments to one or more components of the system (e.g. a driver, a controller, movable element of a processing apparatus, etc.) to increase or decrease conveyor speed, feed roll rotational speed, feed roll angle, press roll/lower roll rotational speed, vertical height of upper feed rolls, etc., and/or to reposition a movable element of a processing machine.

From block 314, the method may proceed to block 316, "Lineally conveying, by the second transfer, the first and second workpieces in a third direction toward a processing apparatus operatively coupled to the second transfer, the third direction being substantially perpendicular to the first direction and oblique to the second direction." The second transfer may be any suitable workpiece transfer/conveyor, such as lineal conveyor 180. The first and second workpieces may be sequentially conveyed by the second transfer into a processing apparatus, such as processing apparatus 190. The second transfer may include one or more powered or non-powered rollers, such as hold-down rollers, and one or more guides or fences to align the workpieces during conveyance.

From block 316, the method may proceed to block 318, "Causing, by the computing device, the corrective action, wherein said causing includes sending a command to a component configured to drive one or more elements of the first transfer, the first tapered feed roll, the processing machine, or the second transfer." As described above with reference to FIG. 8, the computing device may determine a corrective action to adjust or set a gap length between workpieces and/or accommodate an optimized processing solution. In some examples, the corrective action may include generating a new optimized processing solution, sending a command to a drive or other system component to make an operational adjustment (e.g. to adjust speed, remove or reposition a workpiece, reposition a movable element of a processing apparatus, etc.).

Alternatively, the first transfer may be a lineal conveyor and the second transfer may be a transverse conveyor. Thus, the workpieces may travel lineally in the first direction along the lineal conveyor toward a tapered roll assembly. The workpieces may be engaged by the tapered feed rolls and pushed away from a guide/fence toward a transverse conveyor. For example, referring to FIG. 2, the direction of flow may be essentially reversed. The workpieces may begin traveling along lineal conveyor 180 (in the opposite direction of Arrow C) toward tapered roll assembly 130. The workpieces may individually engage the proximal end of a tapered feed roll, which may drive/push each workpiece along the path of flow (but in the opposite direction) indicated by Arrow B. As the workpieces move toward the distal ends of the tapered feed rolls, the workpieces may be transferred onto a transverse conveyor, such as transverse conveyor assembly 110, or other conveyance. In some examples, two or more tapered feed roll assemblies may be provided as described below with respect to FIG. 10.

FIG. 10 illustrates a plan view of a tapered roll feed system with a first transverse conveyor 410, a first tapered fee roll assembly 430, a guide 414, a processing apparatus 190, a second tapered feed roll assembly 432, and a second transverse conveyor 420. First and second tapered feed roll assemblies 430/432 may be configured essentially as described above with respect to tapered feed roll assembly 130. First and second transverse conveyors 410/420 may be configured essentially as described above with respect to transverse conveyor assembly 110. Guide 414 may extend from first tapered feed roll assembly 430 toward and/or at least partially through processing machine 190 to guide the positioning of workpieces for processing.

In operation, a workpiece 199 may be transported by transverse conveyor 410 in the direction indicated by Arrow A toward first tapered feed roll assembly 430. First tapered feed roll assembly 430 may drive and/or accelerate the workpiece 199 in the direction indicated by Arrow B and against guide 414 in the manner described above. Workpiece 199 may be transported lineally in the direction indicated by Arrow C through processing machine 190, where it may be processed (e.g. planed, edged, cut, etc.). As workpiece 199 exits processing machine 190, workpiece 199 may be engaged by second tapered feed roll assembly 432 and driven and/or decelerated in the direction indicated by Arrow D. Workpiece 199 may be deposited by second tapered feed roll assembly 432 onto second transverse conveyor 420, which may transport workpiece 199 in the direction indicated by Arrow E.

Thus, one or more tapered feed roll assemblies may be arranged with one or more conveyors, guides, and/or processing machines in various configurations to provide a system to control workpiece flow, speed, orientation, and/or direction of flow. In some examples, a tapered feed roll assembly may be provided upstream of a processing machine or other system component and may be used to control the direction and/or speed of workpieces as they approach a processing machine. A tapered feed roll assembly may also/instead be provided downstream of a processing machine or other system component and may be used to control the direction and/or speed of workpieces as they exit the processing machine.

Tapered feed rolls may be added to existing processing lines to introduce one or more bends or turns in the paths of flow along the processing lines, and to reroute paths of workpiece flow while maintaining some or all of the workpieces in sequential order. A computing system operatively coupled to the tapered feed roll assemblies (and other components) of different processing lines may be programmed with operating instructions for tracking some or all of the workpieces along multiple processing lines, and to adjust the rotational speed and position of the tapered feed rolls (and other components of the processing lines) based on factors such as workpiece identification/tracking, upstream/downstream operating conditions, scan data, workpiece characteristics, conveyor/transfer speeds, and other factors described throughout the present disclosure.

Additional embodiments of systems, methods, and apparatuses that involve the use of tapered feed rolls to control the direction and speed of a workpiece are described in further detail below. Again, processing machine 190 may be any machine known in the art for processing (e.g., cutting, planing, trimming, chipping, edging, sawing, etc.) a workpiece. Several examples of such processing machines and their use with tapered feed roll assemblies are described below with reference to FIGS. 8 and 10. These examples are provided by way of illustration and are not intended to be limiting.

Hand Pull Sorting

In some sawmills, human operators pull boards manually from a conveyor and stack or pile them in groups according to workpiece dimension.

An embodiment of a hand pull sorting apparatus may include a tapered feed roll assembly (e.g., tapered feed roll assembly 130) positioned to receive workpieces pulled from a conveyor by a human operator. A workpiece receiving surface (e.g., another conveyor, a transfer, a bin, or a pallet) may be positioned to receive workpieces from the tapered feed roll assembly.

In operation, the human operator may remove a workpiece from a conveyor. Based on the dimensions or other characteristics of the workpiece, the human operator may determine that the workpiece should be directed to the workpiece receiving surface. The human operator my insert the workpiece into the gap between the upper and lower tapered feed rolls, which may engage and drive the workpiece onto the workpiece receiving surface as described in further detail above. In some embodiments, the workpiece receiving surface may be proximal to the wider ends of the tapered feed rolls, and the human operator may feed the workpiece into the gap between the narrower ends of the feed rolls in a generally transverse orientation. Alternatively, the workpiece receiving surface may be proximal to the narrower ends of the tapered feed rolls, and the human operator may feed one end of the workpiece into the gap between the wider ends of the tapered feed rolls.

Processing Machine Infeeds/Outfeeds

In existing mills, some processing machines are configured to process workpieces that are fed lineally into the processing machine. Some examples of such processing machines include drop saws, rip saws, chemical (e.g., fungicide) spraying machines, edgers, and gangs. However, workpieces such as boards are often conveyed toward the processing machine in a transverse orientation (e.g., on a transverse conveyor). Therefore, the orientation and/or direction of travel of the board must be changed upstream of the processing machine.

The conventional method for reorienting the boards is to place a lineal transfer at the end of the transverse conveyor. The boards are crowded together into a mat at the end of the transverse conveyor, and the leading board is pushed onto the lineal transfer. The lineal transfer has a set of cylindrical or pineapple rollers that are oriented with their axes of rotation extending outwardly toward, and generally parallel to, the longitudinal axis of the transverse conveyor. As the leading board is pushed onto the lineal transfer/conveyor, the board engages the set of pineapple rolls. The rotation of the pineapple rolls propels the board along the lineal transfer toward the processing machine. This abrupt change in the board's speed and direction of travel can result in collisions downstream, damage to the workpieces, and/or undesirable gaps between workpieces. In addition, such systems may require a long (e.g., 40-80 ft) intermediate conveyor to accelerate and decelerate the workpieces upstream or downstream of the processing machine.

In one embodiment, an infeed for a processing machine may include a tapered feed roll assembly upstream of the processing machine. Similarly, an outfeed for a processing machine may include a tapered feed roll assembly downstream of the processing machine. Infeeds and/or outfeeds of this type may reduce or eliminate damage to the workpieces and provide improved gap control over a shorter distance than is currently required for accelerating and decelerating the workpieces.

Referring to FIGS. 8 and 10, a processing machine infeed may include a transverse conveyor 410, a feed roll assembly 430, and a processing machine 190 (e.g., one or more drop saws, rip saws, chemical spraying machines, edgers, and/or gangs) arranged along a lineal transfer/conveyor 180. The output end of the transverse conveyor may be positioned proximal to the narrower ends of the feed rolls. Transverse conveyor 410 may include a belt, endless chains, or other workpiece support surface coupled to a frame. Optionally, transverse conveyor 410 may be a lugged conveyor. One or more portions of the output end of transverse conveyor 410 may be positioned between or next to a feed roll such that the workpiece support surface terminates between the narrower ends of the feed roll(s).

Lineal conveyor 180 may be positioned at an angle to the transverse conveyor (e.g., an angle of 90 degrees, 80-100 degrees, or 50-130 degrees). An input end of lineal conveyor 180 may be positioned proximal to the wider ends of one or more of the feed rolls. The feed roll(s) may be laterally skewed with respect to the transverse conveyor, such that the axes of rotation are transverse to the longitudinal axes of both transverse conveyor 410 and lineal conveyor 180. In some examples, the longitudinal axes of conveyors 410 and 180 may be substantially perpendicular and form adjacent angles with the axis of rotation of a feed roll as the common vertex.

A processing machine outfeed may include a feed roll assembly 432 and a transverse conveyor 420 (see e.g., FIG. 10). In some examples, processing machine 190 may be positioned along linear conveyor 180, and the processing machine outfeed may include an output end of linear conveyor 180. In other examples, the processing machine outfeed may include a second linear conveyor 180 or other linear transfer positioned to accept workpieces from linear conveyor 180.

A scanner 198 may be provided upstream of the feed roll assembly 430 to scan the boards. In contrast to the above-described conventional feed systems in which boards are conveyed on a slick chain to form a mat upstream of a lineal transfer, feed systems with a feed roll assembly as described herein can be used in combination with a conveyor on which the workpieces remain singulated during transport (e.g., a lugged conveyor). Maintaining the workpieces in a known order allows each workpiece to be scanned upstream of the processing machine and processed downstream in accordance with the scan data. For example, if one side of a workpiece has a defect, the processing machine can be adjusted to process the workpiece in order to remove or minimize the defect, such as by shifting a guide member or cutting member to cut the defective portion from the workpiece. As another example, a workpiece can be dropped out and/or flipped over upstream of the processing machine by repositioner 202 based on the scan data.

Lug Loader

Tapered feed rolls may be provided upstream, downstream, or both upstream and downstream of a processing machine. In some embodiments, a tapered feed roll assembly may be used downstream of a processing machine to load workpieces into the lug spaces of a lugged conveyor. In a specific example, a lug loader may be provided between a planer and a trimmer along a path of workpiece flow.

In a conventional planer outfeed system, workpieces exit the planer onto a transfer (usually a lineal transfer) and into to an unscrambler. Next, the workpieces are even ended and conveyed to a lug loader, scanned, and put onto another conveyor toward a downstream trimmer that cuts the workpieces to length. This configuration has a relatively large footprint, and does not provide an opportunity to track the workpieces from the planer to the trimmer. As a result, the conventional configuration requires the workpieces to be scanned downstream of the unscrambler and upstream of the trimmer. Although lineal scanners are commercially available, many sawmill operations are limited to using transverse scanners due to the space required for the lug loader and for slowing down workpieces after the planer (e.g., on a 40-foot bridge).

Figure 17:
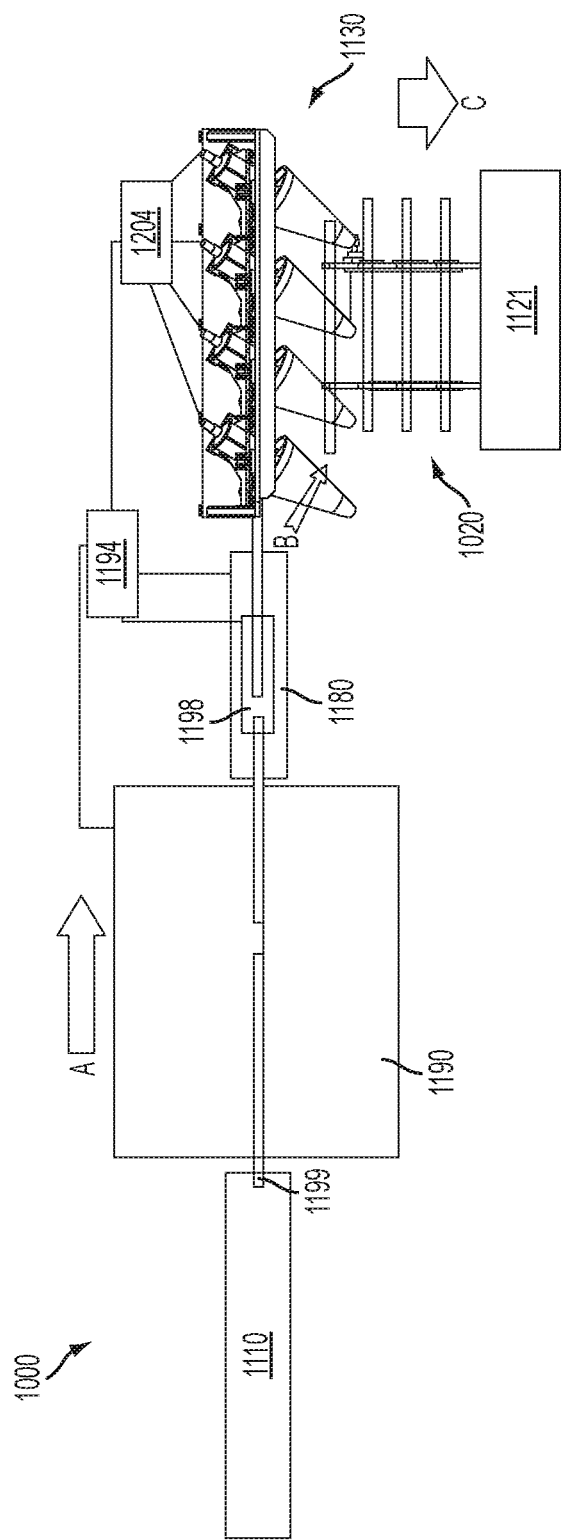
FIG. 17 illustrates an example of a lug loader with one or more tapered feed rolls.

FIG. 17 illustrates an example of a lug loader, in accordance with embodiments of the present disclosure. For purposes of illustration, the lug loader is described in the context of a planer outfeed system 1000. However, the lug loader may be provided in other locations and/or integrated into other workpiece processing lines for use in loading a lugged transverse conveyor.

System 1000 may include an infeed 1110 configured to feed workpieces 1199 into a planer 1190. Optionally, planer 1190 may include an outfeed transfer 1180. The outfeed transfer 1180 may be a lineal transfer as described above with regard to FIG. 1 (conveyor/transfer 180). A lineal scanner 1198 may be positioned along outfeed transfer 1180. Outfeed transfer 1180 may be positioned upstream or downstream of lineal scanner 1198. Optionally, outfeed transfer 1180 may extend below/through lineal scanner 1198. Alternatively, outfeed transfer 1180 may include first and second transfers, with the first transfer positioned between planer 1190 and the second transfer positioned between planer 1190 and tapered feed roll assembly 1130. Some embodiments may lack lineal scanner 1198. Other embodiments may lack outfeed transfer 1180.

A tapered feed roll assembly 1130 as described in greater detail above may be operatively coupled to the downstream end of planer 1190 and/or outfeed transfer 1180. Optionally, as successive workpieces 1199 exit planer 1190 in direction A, the workpieces may be conveyed through a lineal scanner 1198 upstream of tapered feed roll assembly 1130.

The workpieces may continue in direction A in their original lineal orientation until the leading end of the foremost workpiece enters the horizontal gap between the upper and lower feed rolls of tapered feed roll assembly 1130. Rotation of the feed rolls may drive workpiece 1199 in direction B toward a lugged conveyor 1120. Because the workpieces are maintained in their original orientation as they move in direction B, the next successive workpiece may be engaged by the tapered feed rolls and begin to travel in direction B before the previous workpiece has disengaged from the tapered feed rolls. Thus, at any given moment there may be several workpieces 1199 engaged by the tapered feed rollers and traveling in direction B.

Lugged conveyor 1120 may be positioned generally perpendicular to outfeed transfer 1180, forming an angle of approximately 90 degrees (e.g., 80-100 degrees), at an acute angle to outfeed transfer 1180 (e.g., 20-80 degrees), or at an obtuse angle to outfeed transfer 1180 (e.g., 100-140 degrees). As described above with reference to other embodiments, the feed rolls may be laterally skewed relative to outfeed transfer 1180 and/or transverse conveyor 1121. The degree of lateral skew may vary according to the angle of outfeed transfer 1180 relative to transverse conveyor 1121. For example, where outfeed transfer 1180 and transverse conveyor 1121 form an angle of approximately 90 degrees, the rotational axis of one or more of the feed rolls may form the common vertex of complementary angles of approximately 30 degrees (angle of transverse conveyor to rotational axis) and approximately 60 degrees (angle of lineal conveyor to rotational axis).

Each successive workpiece 1199 may be driven through the horizontal gap between the tapered feed rolls in direction B toward the narrow ends of the tapered feed rolls and transverse conveyor 1020. Workpiece 1199 may be deposited onto transverse conveyor 1020 between two lugs. In this manner, successive workpieces may be loaded onto transverse conveyor 1020 in corresponding successive lug spaces.

A computing device/system 1194 may be operatively coupled to, and in communication with, any one or more of tapered feed roll assembly 1130, a controller 1204, lineal scanner 1194, planer 1190, trimmer 1121, infeed 1110, and outfeed transfer 1180. Examples of such components and their functionalities are described herein with reference to FIGS. 1-16.

Optionally, lineal scanner 1198 may be an optimizing scanner. Lineal scanner 1198 may be configured to scan workpieces 1199 with one or more of x-rays (e.g., for density evaluation), lasers (e.g., for geometric profile measurements), and vision (e.g., 4-sided multi-channel vision to detect visual characteristics). Lineal scanner 1198 may be configured to classify and/or verify lumber defects such as knots, stain, splits and shake, wane, rot, and pith location along the length of workpiece 1199.

Likewise, planer 1190 may be an optimizing planer, and system 1000 may include a scanner or sensor upstream of planer 1190 along the path of workpiece flow (see e.g., FIG. 8).

As indicated above, computing device/system 1194 may perform one or more of the functions described herein for lineal scanner 1198, controller 1204, and/or another component of system 1000. In addition, computing device/system 1194 may be operatively coupled to one or more other processing machines, transfers/conveyors, scanners, sensors, and/or other components of processing lines upstream or downstream of the planer system 1000. Examples of other processing lines include, but are not limited to, processing lines for primary breakdown (e.g., headrigs, carriages, log conveyors/transfers, bucking systems, debarkers, step feeders, chippers), secondary breakdown (e.g., edgers, gang saws, curve saws, resaws), sorter/stacker systems (e.g., lumber sorters, lumber stackers, grade stations, lumber packaging systems, board feeders, transfer tables), drying systems (e.g., kilns), and veneer/plywood systems. Computing device/system 1194 may receive data from any one or more such components, determine an action or adjustment based on the received data, and generate and send a command to the appropriate component or controller/driver thereof in order to implement the action or adjustment.

Again, computing device/system 1194 may include a processor, a memory storing one or more algorithms, and computer executable instructions operable, upon execution, to implement the stored algorithms. In addition to the examples of stored algorithms discusses above with regard to computing device 194, computing device/system 1194 may include one or more algorithms for: predicting/determining a gap size between successive workpieces on outfeed transfer 1180; receiving data from one or more components of system 1000 regarding workpiece characteristics, workpiece processing solutions and/or cut patterns, feed roll rotational speed, feed roll height/angle, planer 1190 processing speed, position of a movable element of planer 1190 (e.g., guide member or cutting element), conveyor/transfer speed, lug rate, lug space size; receiving data from an upstream or downstream processing line (e.g., a cut-in-two decision); determining an adjustment to one or more components of system 1000 based on the received data; and generating and sending a command to a component of system 1000 or a driver/controller thereof in order to implement the adjustment.

For example, computing device/system 1194 may include an algorithm for determining and implementing a target feed roll rotational speed for loading successive workpieces into corresponding successive lug spaces of lugged conveyor 1020, based on one or more factors such as the current rotational speed(s) of the tapered feed roll(s), workpiece characteristics (e.g., dimensions), lugged conveyor speed, and the size of a gap between two successive workpieces. The rotational speed of the feed rolls may be increased, decreased, or maintained as needed to coordinate feed roll assembly 1130 and lugged conveyor 1020 such that a workpiece 1199 exits feed roll assembly 1130 at the corresponding empty lug space on lugged conveyor 1020. The algorithm may also be used to determine, based on a processing or grade decision made downstream of tapered feed roll assembly 1130, that a workpiece is to be cut in two, and to slow or halt the tapered feed rolls accordingly in order to leave a corresponding number of empty lug spaces. In addition, computing device/system 1194 may include an algorithm for adjusting operation of the planer 1190 and/or trimmer 1121 based on data received from lineal scanner 1198 (e.g. to increase or decrease speed, and/or to reposition one or more movable elements of the planer/trimmer).

Computing device 1194 may include one or more algorithms for adjusting gaps between successive workpieces on outfeed transfer 180, infeed 1110, within planer 1190, and/or in tapered feed roll assembly 1130. For example, computing device 1194 may be programmed to adjust one or more conveyor/transfer drives to adjust a gap.

Other processing machines may be configured to process workpieces in a transverse orientation. FIG. 11 shows an example of an alternate configuration in which workpieces are conveyed lineally toward the processing machine, fed through the processing machine in a transverse configuration, and reoriented again into a lineal arrangement downstream of the processing machine. Workpieces 199 may be transported in a lineal arrangement toward processing machine 190 on a lineal conveyor 180 in a direction shown by Arrow C. Feed roll assembly 430 may accept each successive workpiece from lineal conveyor 180 and drive the workpieces in order onto transverse conveyor 410 in the directions shown by Arrow B. Transverse conveyor 410 may transport the workpieces to and/or through processing machine 190. In some examples, transverse conveyor 420 may transport the workpieces from processing machine 190. Transverse conveyors 410 and 420 may be opposite ends of a single conveyor or two separate conveyors. Feed roll assembly 432 may accept workpieces from transverse conveyor 420 and drive the workpieces in the direction shown by Arrow D onto a lineal conveyor 180, which may transport the workpieces lineally in the direction shown by Arrow C.

Stick Handling

Green lumber is typically dried in a kiln. To prepare the stacks of green lumber for drying, the green boards are arranged in a mat in one orientation and sticks are placed onto the mat in a perpendicular orientation. Additional mats and stick layers are deposited until the stack has the desired height or number of mats. Although sticks can be placed by human operators, automatic stick placers are frequently used to perform this task. Automatic stick placers generally require an infeed of singulated sticks arranged in a transverse orientation.

In one embodiment, tapered feed rolls may be used to load sticks onto a conveyor in a transverse orientation. In another embodiment, tapered feed rolls may be used to place sticks onto a mat of green lumber.

Board Sorting by Thickness

Figure 12A:
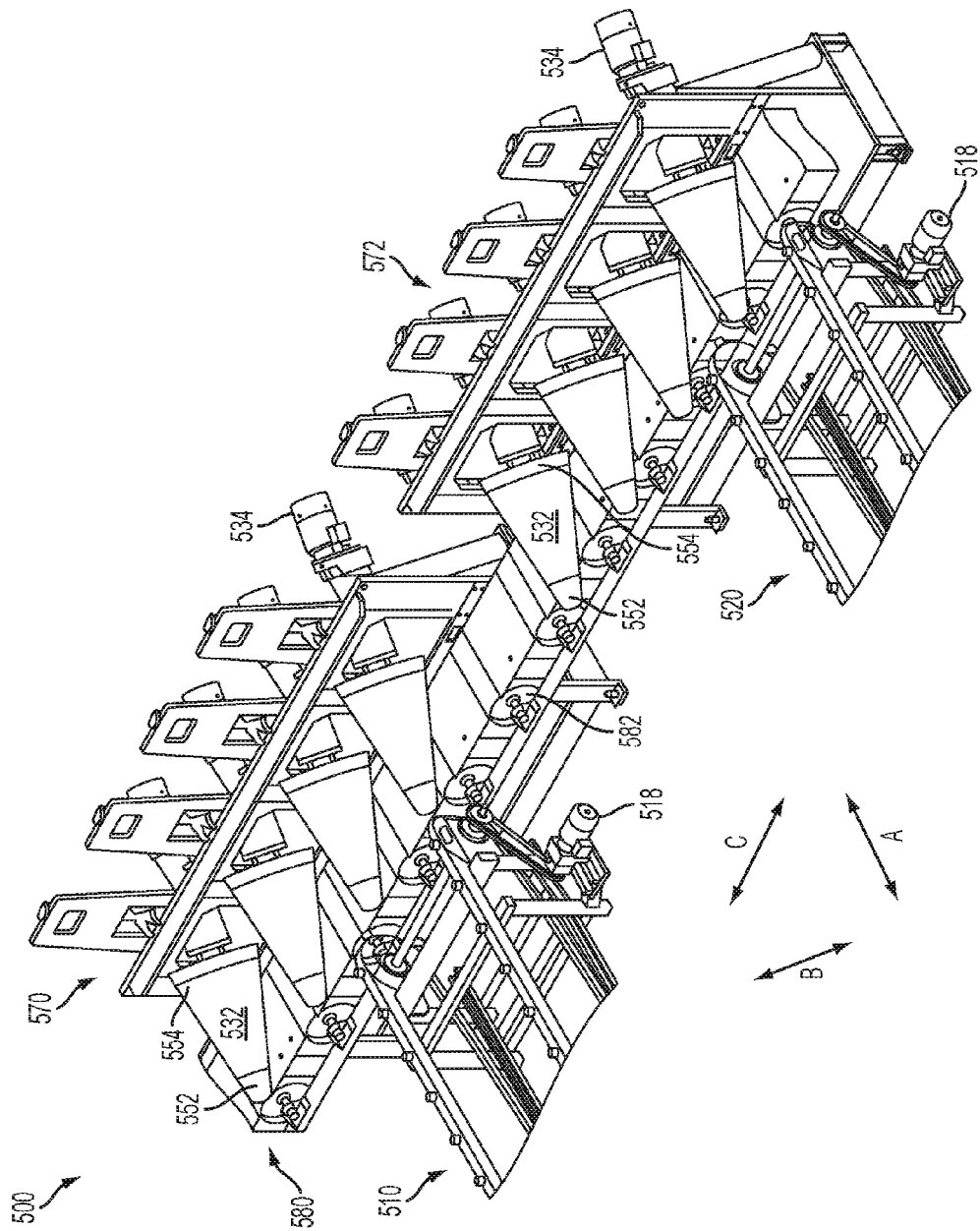

FIGS. 12A-C illustrate views of a workpiece sorter and aspects thereof, in accordance with various embodiments. As shown in FIG. 12A, a workpiece sorter 500 may include a first tapered feed roll assembly 570 and a second tapered feed roll assembly 572, each with one or more upper feed rolls 532 positioned above a transport surface 580. Transport surface 580 may be a support surface of a conveyor, such as a lineal transport, a transverse conveyor, a lugged conveyor, a smooth chain conveyor, a belt conveyor, or any other type of conveyor/transport. Transport surface 580 may include one or more cylindrical rolls 582, which may be driven or passively rotatable (FIGS. 12A-B). Alternatively, transport surface 580 may include a series of lower tapered feed rolls 536 as described above (FIG. 12C).

One or more conveyors 510, 520 may be positioned at an angle to transport surface 580. Conveyors 510 and 520 may be configured to transport workpieces in a transverse orientation and transport surface 580 may be configured to transport workpieces in a lineal orientation, or vice versa. Optionally, one or more of the conveyors may be lugged conveyors. Alternatively, conveyors 510 and/or 520 may be bins, stacks, platforms, piles, or any other assembly or device configured to receive workpieces diverted from transport surface 580.

One or more tapered feed rolls 532 may be positioned along transport surface 580 at varying heights. The feed rolls of the first tapered feed roll assembly 570 may be positioned at a first vertical distance A above transport surface 580, and the tapered feed rolls of the second tapered feed roll assembly 572 may be positioned at a second vertical distance B above transport surface 580. Vertical distance A may be greater or less than vertical distance B. For example, first feed roll assembly 570 may be upstream of second feed roll assembly 572 along a first direction of travel (arrow C) on transport surface 580, and vertical distance B may be less than vertical distance A. Successive workpieces of varying thicknesses may be transported in a lineal arrangement (e.g., end-to-end) along transport surface 580. As the leading end of a workpiece on transport surface 580 reaches the first upper feed roll 532 of first feed roll assembly 570, the workpiece may be engaged by the upper feed rolls and diverted onto first conveyor 510 if the thickness of the workpiece is equal to, or greater than, vertical distance A. If the thickness of the workpiece is less than vertical distance A, the workpiece may continue along transport surface 580 toward second feed roll assembly 572. As the leading end of the workpiece reaches the first upper feed roll 532 of second feed roll assembly 572, the workpiece may be engaged by those upper feed rolls and diverted onto second conveyor 520 if the thickness of the workpiece is less than vertical distance A but equal to, or greater than, vertical distance B. If the thickness of the workpiece is less than vertical distance B, the workpiece may continue along transport surface 580. Optionally, one or more additional feed roll assemblies may be provided downstream of second feed roll assembly 572, and may have one or more upper feed rolls set at other vertical distances to divert workpieces of corresponding thicknesses.

In this manner, workpieces may be sorted or diverted into different flow paths based on workpiece thickness. The reverse is also true—workpieces of varying thicknesses can be transported on multiple conveyors (e.g., 510 and 520) toward a common transport (e.g., transport surface 580) and combined into a single path of flow.

In either case, conveyors 510 and 520 may convey the workpieces in a direction A that is transverse (e.g., horizontally perpendicular) to direction C. Feed roll assemblies 570/572 may convey the workpieces between transport surface 580 and conveyors 510/520 in a direction B that is transverse to both direction A and direction C, as discussed in detail above. Optionally, conveyor 510/520 may be an infeed or an outfeed of a processing machine. Alternatively, conveyor 510/520 may be a bin, stack, or platform configured to receive workpieces from, or feed workpieces to, feed roll assembly 570/572. For example, conveyor 510/520 can include a vertically adjustable platform onto which successive workpieces are crowded to form a single layer or mat. As the layer/mat is completed, the vertically adjustable platform may be lowered by a given vertical distance (e.g., an average or maximum thickness of workpieces received on the platform, or a predetermined vertical distance).

In other embodiments, one or more upper feed rolls 532 may be slideably mounted to an overhead support and selectively repositioned along transport 580 and/or vertically to divert workpieces onto different flow paths.

Board Sorting by Lug

Figure 13A:
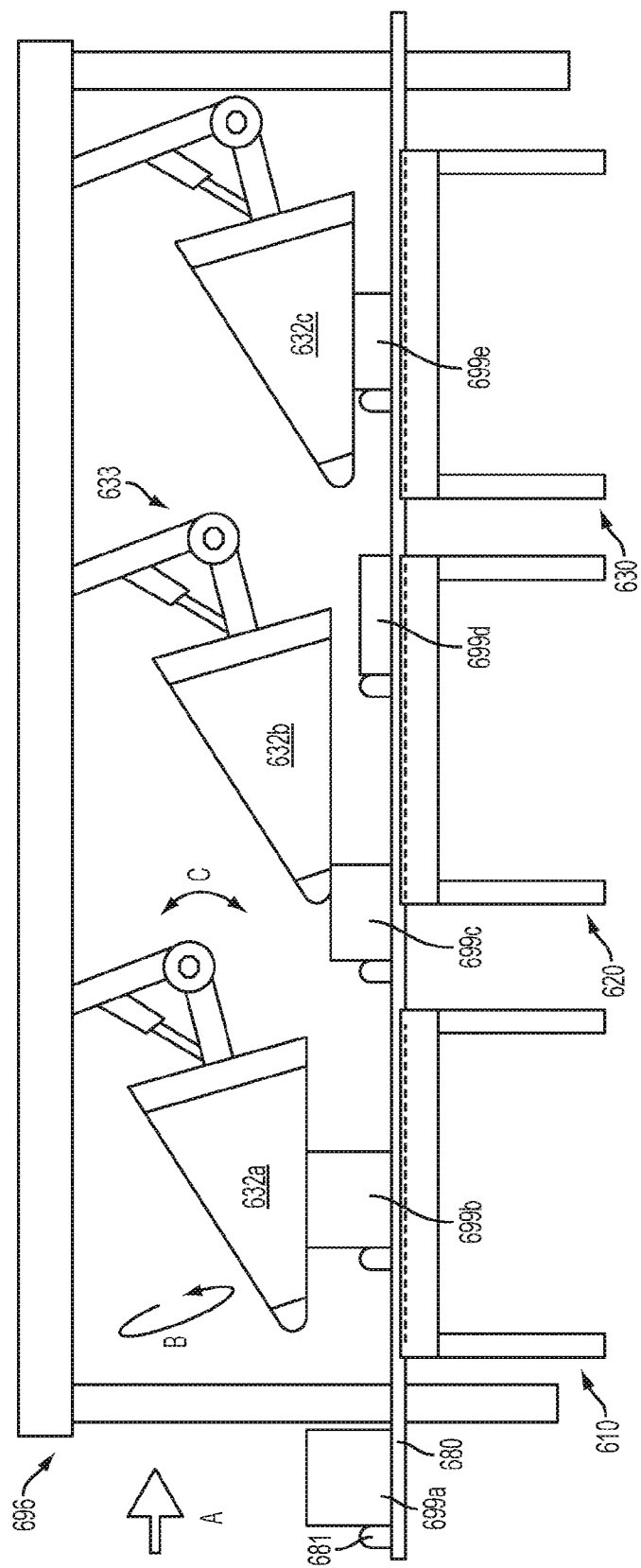
FIGS. 13A-B illustrate side view block diagrams of workpiece sorting systems with one or more tapered feed rolls.

Similarly, the transport surface may be a lugged conveyor surface and one or more lineal conveyors may extend outwardly from the transport surface. One or more tapered feed rolls may be arranged above the transport surface to divert workpieces based on the particular lug space and/or board thickness. FIG. 13A illustrates a side view block diagram of such a configuration. Transport surface 680 may include a plurality of lugs 681 spaced at regular intervals. Upper feed rolls 632a, 632b, and 632c may be supported by mounts 633, which are coupled to overhead support 696. The upper feed rolls may be positioned at various heights above transport surface 680 and rotatable in at least one rotary direction (e.g., direction B). A corresponding transport 610, 620, or 630 may extend outwardly from transport surface 680 near each of the upper feed rolls 632a, 632b, and 632c, respectively. The transports may be arranged on the same side or on different sides of transport surface 680.

As transport surface 680 conveys workpieces 699a-e in direction A, each workpiece continues along direction A until contacted by an upper feed roll. In this example, the upper feed rolls are positioned at progressively smaller vertical distances above transport surface 680. As a result, the thickest workpieces (699a, 699b) will be diverted onto transport 610 by upper feed roll 632a. Workpieces that are thinner (699c, 699e) will be diverted onto transport 620 or 630, respectively. Some workpieces (699d) may have a thickness that is less than the vertical height of any of the upper feed rolls. These workpieces may be permitted to continue moving forward in direction A to the end of transport surface A and onto another transport/stack/bin, diverted by an additional upper feed roll, or selectively diverted onto one of the transports by lowering one of the upper feed rolls into contact with the workpiece.

The upper feed rolls may be mounted at a fixed height/angle. Alternatively, the height/angle may be adjustable, such as by adjusting mount 633 to raise or lower the feed roll relative to support 696 (arrow C). Thus, the upper feed rolls may be selectively lowered to "pinch" a workpiece in a lug space and divert that workpiece onto another conveyor/transfer, bin, platform, or other workpiece receiving surface.

In some examples, a computing device (e.g., an optimizing scanner) may select a conveyor for some or all of the workpieces. The computing device may send a command to the appropriate upper feed roll and/or corresponding mount 633 to cause the diversion of the workpieces onto different conveyors based on the selection. As the workpiece approaches the feed roll positioned near the selected conveyor, the feed roll may be vertically adjusted to contact and divert the workpiece onto the conveyor. This may be timed by the computing device based on the lug space occupied by the workpiece and the speed of transport surface 180 and/or lug rate per unit of time. As such, workpieces may be diverted into different flow paths on the basis of one or more factors such as grade, length, value, subsequent destination within the sawmill, subsequent processing required, or a command by a human operator.

Sorting System (Binless)

A typical modern sawmill produces a wide variety of workpieces that vary in grade, dimension, and/or destination within the sawmill. Therefore, workpieces are sorted by grade/dimension into separate bins or piles at a number of different points within the sawmill. The workpieces are dropped into the bins or piles, often by a drop sorter. These workpieces must then be unscrambled, stacked, loaded onto a transport/conveyor, or otherwise organized for further processing (e.g., additional cuts, scans, spraying, or stacked for drying or packaging). The bins or piles decrease the amount of space available for use. In addition, workpieces can be damaged during the scrambling and subsequent reorganization.

Figure 13B:
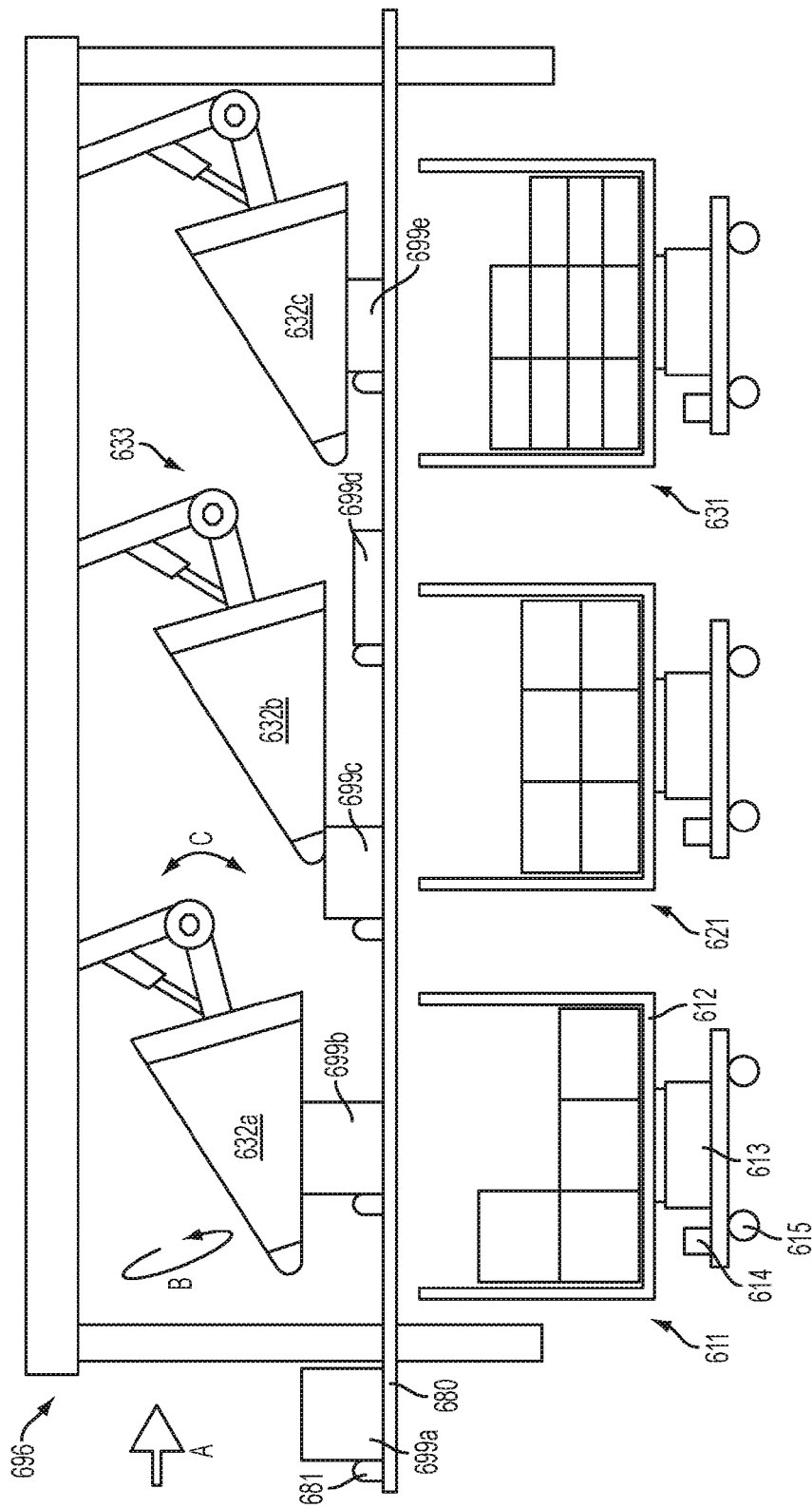

FIG. 13B shows a block diagram of a binless sorting system in accordance with embodiments of the present disclosure. As described above with regard to FIG. 13A, one or more tapered rolls (e.g., 632a, 632b, 632c) may be provided above, below, or above and below a path of workpiece flow (e.g., a conveyor or support surface) to divert workpieces onto a support surface. In the illustrated example the workpieces (699a-e) are translating along a path of flow on a conveyor 680 with a plurality of lugs 681. In other embodiments the conveyor or support surface may include a smooth chain or belt. A receiving support surface (611, 621, 631) may be positioned along conveyor 680 near a tapered feed roll. Again, the tapered feed rolls may be selectively brought into contact with a workpiece and rotated to drive the workpiece from the path of workpiece flow onto the receiving support surface.

In some embodiments, the receiving support surface 611/621/631 or some portion thereof may be selectively raised, lowered, and/or laterally repositioned. The vertical height and/or horizontal position of the receiving support surface may be selectively adjusted by a controller to receive a series of workpieces in a predetermined pattern. For example, receiving support surface 611, 621, and 631 may include a platform 612 coupled to a lift mechanism 613 and/or a controller 614. Controller 614 may be operatively coupled to a computing system (e.g., an optimizing scanner system), and may control the position of the receiving support surface in response to a command from the computing system or from an operator.

Optionally, platform 612 may be coupled to a lateral transport member 615 (e.g., a rail, track, belt, chain, or wheels/treads) that provides lateral movement of the platform relative to conveyor 680. For example, the receiving support surface may be movable laterally along conveyor 680 and/or toward and away from conveyor 680. Alternatively, the receiving support surface(s) may remain stationary, and/or the tapered feed roll(s) may be moved relative to conveyor 680. For example, support 696 and/or feed roll(s) 632a, 632b, and 632c may be selectively repositioned along the path of workpiece flow. As described above, the tapered feed roll(s) may be selectively raised, lowered, and/or angled to contact an individual workpiece without contacting a preceding or subsequent workpiece.

As the tapered feed roll contacts the workpiece, the workpiece may be diverted from conveyor 680 onto the corresponding receiving support surface. The rotational speed of the tapered feed roll may be adjusted to increase, decrease, or maintain the speed of the workpiece as the workpiece moves from conveyor 680 toward the support surface. As additional workpieces are diverted onto the support surface, the tapered feed roll and/or the receiving support surface may be moved/adjusted to cause the received workpieces to form an orderly layer or mat on the platform 612. As one layer or mat is completed, platform 612 may be lowered to allow additional incoming workpieces to form a second layer or mat on the first layer or mat. Optionally, sticks may be placed onto the first mat before the second layer or mat is deposited onto the sticks.

Even Ending a Workpiece

One or more tapered feed rolls may be used to even end a series of workpieces against a stop member as shown for example in FIGS. 14A (top plan view) and 14B (side view). FIG. 14A shows an even ending system that includes a conveyor surface with a plurality of lugs 781 defining lug spaces for workpieces 799. As the workpieces 799 are transported on the conveyor in direction A, a tapered feed roll 736 below the conveyor surface is rotated in direction B. As each successive workpiece reaches tapered feed roll 736, the rotation of the tapered feed roll urges the workpiece in direction B toward a stop member 795 (e.g., a board stop or paddle member). Tapered feed roll 736 may be driven by drive 734, such as a motor or engine. As the workpiece continues in direction A from the narrower end of the tapered feed roll to the wider end of the tapered feed roll, the workpiece is displaced toward stop member 795 at an increasing rate. This may provide a more gradual acceleration than conventional conical even ending rolls. While FIG. 14A shows tapered feed roll 736 extending generally perpendicular to workpieces 799, in other embodiments tapered feed roll 736 may be laterally skewed to adjust the rate of acceleration of workpiece 799 in direction B.

In other embodiments, tapered feed roll 736 may be positioned over the conveyor surface. Alternatively, a pair of tapered feed rolls (upper and lower, two upper, or two lower) may be provided. In still other embodiments, the conveyor may be a lineal conveyor and the tapered feed roll(s) may be positioned at an angle to the conveyor.

Cut-in-Two Separator

Workpieces such as boards are typically scanned and graded at one or more points along a processing line. For some workpieces, a grade decision or optimized processing solution includes a decision that the workpiece should be cut into two or more pieces (a "cut-in-two" decision). The resulting pieces may be reinserted into the processing line by various methods. One method, used where workpieces are conveyed on a lugged conveyor and a cut-in-two decision is made downstream of the lug loader, is to generate an empty lug space upstream of the trimmer. When the board is cut into two pieces by the trimmer, one of the pieces remains in the original lug space and the other is placed into the empty lug space. Another method, used where the cut-in-two decision is made upstream of the lug loader, is to disable the lug loader for one lug space in order to leave an empty lug space immediately behind the cut-in-two board. Again, after the trimmer one of the cut pieces remains in its original lug space and the other piece is placed into the empty lug space. Other processing lines may use a recirculation transfer located downstream of the trimmer. This allows one of the pieces from the trimmed workpiece to be redirected while an empty lug is created at the lug loader. When the empty lug space reaches the recirculation transfer, the piece is diverted into the empty lug space to proceed along the processing line. Finally, some processing lines drop one of the pieces into a bin, or drop both pieces into separate bins. However, all of these conventional methods require an empty lug space or bin space, which can reduce productivity and/or increase the minimum floor space required for processing the workpieces.

In one embodiment of a cut-in-two system, one or more tapered feed rolls can be positioned over/under a lugged conveyor downstream of the trimmer that cuts the workpiece into two or more pieces.

In some embodiments, tapered feed rolls may be used to divert one of the cut pieces in one direction and onto a separate conveyor/bin (see e.g., FIGS. 13A-B and accompanying description), and/or to urge the other piece in the opposite direction against a stop member or even-ending surface (see e.g., FIGS. 14A-B and accompanying description).

Figure 14C:
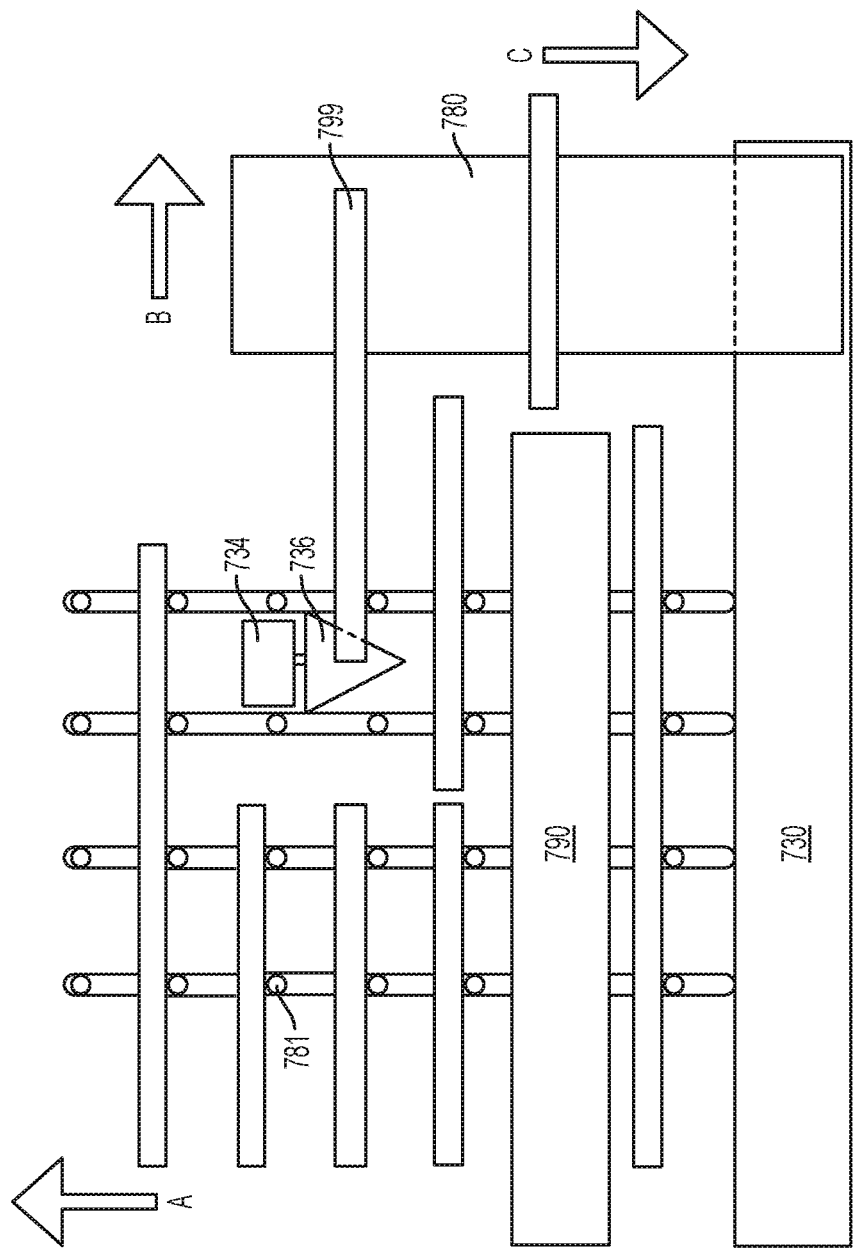
FIG. 14C illustrates a top plan view of a cut-in-two system with one or more tapered feed rolls.

In a specific embodiment, tapered feed rolls can be selectively rotated to move cut pieces apart and reroute one or more of the pieces to an upstream portion of a processing line. FIG. 14C shows an example of a cut-in-two system in which a tapered feed roll is used to divert a cut piece toward an upstream lug loader. In the illustrated example, a lug loader 730 is positioned upstream of a lugged conveyor. Workpieces are loaded onto the lugged conveyor and conveyed in direction A toward a trimmer 790. Trimmer 790 may make one or more cuts in a workpiece, resulting in two or more cut pieces 799 within a single lug space. A tapered feed roll 736 positioned above or below the upper surface of the lugged conveyor may be selectively rotated to divert one of the cut pieces 799 in direction B onto recirculation conveyor 780. Recirculation conveyor 780 may convey cut pieces 799 back to lug loader 730. Lug loader 730 may then load cut pieces 799 into a next empty lug space.

In another embodiment, a cut-in-two system may be configured as shown in FIG. 11, and processing machine 190 may be a trimmer or other apparatus that cuts the workpieces into two or more pieces. The pieces may be loaded into separate lug spaces on conveyor 420 using known methods such as those described above.

Alternatively, the pieces may remain in the same lug space and diverted onto lineal conveyor 180 in their original sequence. As shown in FIG. 16, tapered feed rolls 932 can be used downstream of the trimmer to transfer the cut pieces 999 from a transverse conveyor 910 onto a lineal transfer as described above (see e.g., FIG. 1A and accompanying description). A cut-in-two system 900 may include a transverse conveyor 910 (e.g., a lugged conveyor) that conveys the cut pieces away from the trimmer. Tapered feed rolls 932 may be positioned at the end of the transverse conveyor. As the cut pieces 999 are conveyed into the gap between the narrow ends 952 of the feed rolls, the feed rolls may be rotated to drive the cut pieces along a diagonal path of travel toward a lineal guide member or lineal transfer as described above. Drives 934/938 may be coupled to one or more of the feed rolls and selectively driven to control gaps between the cut pieces. The tapered feed rolls may be used to change the direction and/or speed of the cut pieces while maintaining their original sequence, which may reduce or eliminate the need to rescan the cut pieces upstream of a subsequent processing machine (e.g., a planer, edger, sorter, etc.).

Log Feeder

Conventional log feeders use a pusher or kicker mechanism to shift logs from a lineal conveyor onto a second conveyor. When the log is traveling along the first conveyor at a high rate of speed, pushing or kicking the log onto the next conveyor can result in dropped or incorrectly positioned logs. As a result, conveyor speed may be compromised in favor of maintaining a constant flow of logs and avoiding line stoppages due to dropped logs.

Figure 15A:
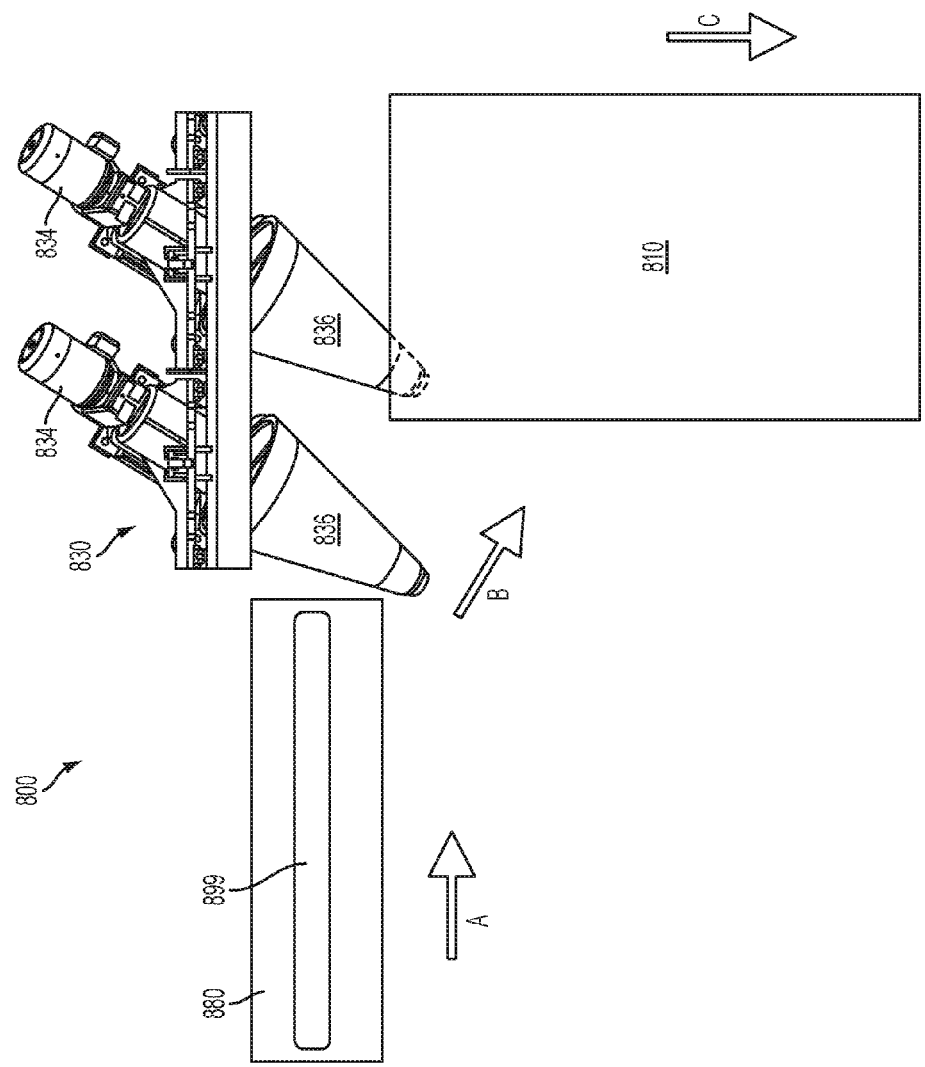
FIGS. 15A-B illustrate block diagrams of a log feeder with one or more tapered feed rolls.
Figure 15B:
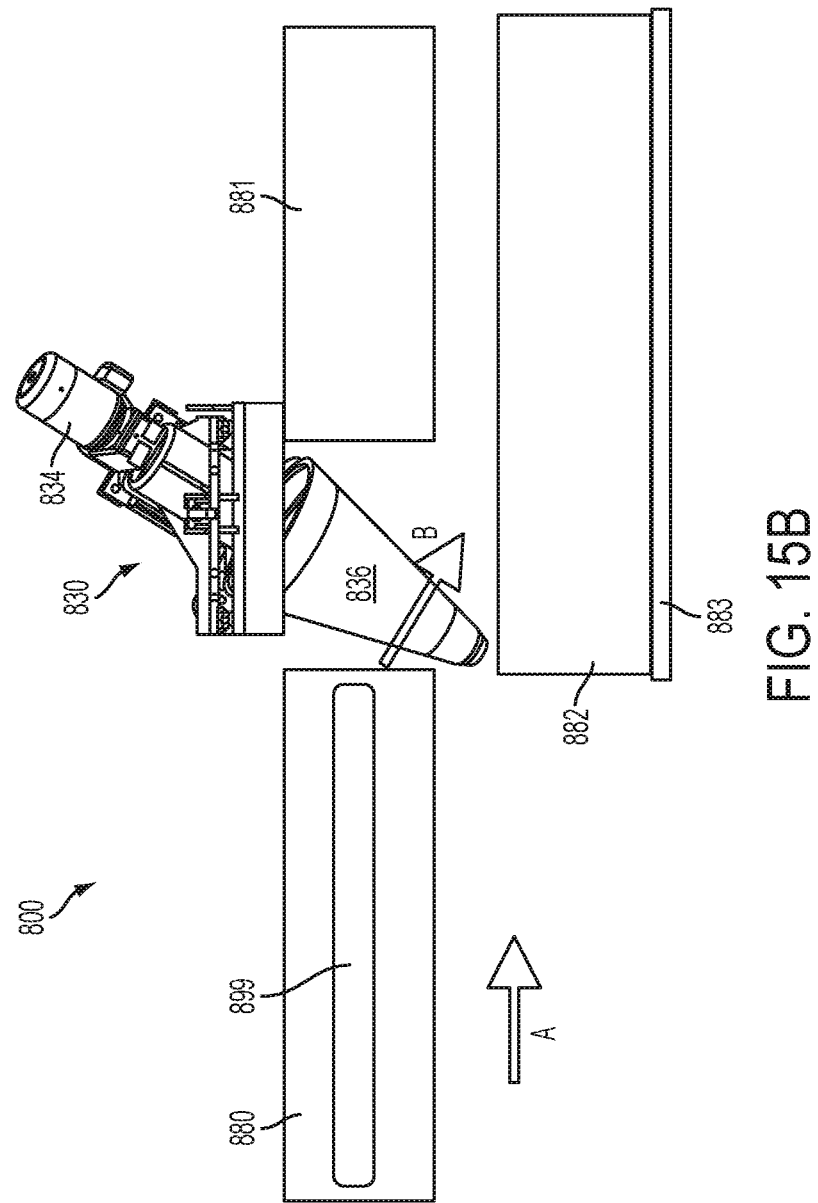

Tapered feed rolls as described herein can be used above, below, or above and below a path of travel to both divert and decelerate logs between two conveyors or paths of log flow. FIGS. 15A and 15B illustrate block diagrams of a log feeder in accordance with embodiments described herein. As shown in FIG. 15A, a log feeder may include a first conveyor 880, a feed roll assembly 830 with one or more tapered feed rolls 836, and a second conveyor 810. Second conveyor 810 may be a transverse conveyor or support surface (FIG. 15A) or a lineal conveyor or support surface (FIG. 15B). Tapered feed rolls 836 may be driven individually by drives 834. Alternatively, two or more tapered feed rolls 836 may be driven by a single drive member. Optionally, one or more of the conveyors may have a stop member 883 to prevent log movement beyond a side or edge of the conveyor.

In operation, a log 899 may be transported lineally along first conveyor 880 in direction A. When the leading end of log 899 contacts the first tapered feed roll 836, the shape and rotation of tapered feed roll 836 begins to shift the log (still in its lineal orientation) in direction B. Because the surface speed of tapered feed roll 836 is greater at the wide/proximal end than at the narrow/distal end, log 899 is decelerated as it continues in direction B toward second conveyor 810/883. This deceleration may allow more reliable log transfers among conveyors without compromising conveyor speed.

In some embodiments, the tapered feed roll(s) 836 may be raised or lowered away from contact with an oncoming log 899, allowing log 899 to continue in direction A onto a third conveyor 881. For example, log 899 may be scanned upstream of tapered feed roll(s) 836 by an optimizing scanner system. The optimizing scanner system may determine a processing solution for log 899. Based at least on the processing solution, the optimizing scanner may select a destination for the log from among two or more possible destinations (e.g., conveyor 881 or conveyor 883). The optimizing scanner system may then send a command to a positioner on feed roll assembly 830 to reposition feed roll(s) 836, as described elsewhere in the present disclosure, in accordance with the selected destination. This may cause log 899 to be directed to the selected destination for further processing.

Positioning Fence

Conventional positioning fences include cylindrical even-ending rolls positioned between and parallel to the chains of a lugged conveyor. The rolls are driven in the direction of a stationary or moving stop member (e.g., a rigid planar surface, a board stop or paddle, etc.). However, driving a workpiece against the stop member at a high rate of speed can cause damage to the workpiece. In addition, the workpiece may strike the stop member hard enough to rebound some distance, resulting in incorrect positioning at a downstream processing machine such as a trimmer.

In one embodiment of a positioning fence, cylindrical or tapered feed rolls may be positioned both over and under the surface of the conveyor. As a workpiece enters the horizontal gap between the feed rolls, the feed rolls may engage the upper and lower surfaces of the workpiece. Instead of driving the workpiece from below and ending the workpiece against a stop member, the vertically paired feed rolls may be rotated to drive the workpiece into a desired lateral position, stopped, and disengaged. Thus, the workpieces can be laterally repositioned at a desired rate of speed and without using a stop member. Alternatively, a stop member may be provided and the vertically paired rolls can be used to control the speed at which the workpiece is moved laterally toward the stop member. This may prevent damage to the workpiece. In either case, the rotational speed of the feed rolls may be decreased as the workpiece approaches the desired position and/or stop member.

In another embodiment, tapered or angled non-tapered feed rolls may be positioned above or below the conveyor surface. If tapered, the feed rolls may be oriented such that an approaching workpiece engages the wider end of the roller and progresses toward the narrower end, resulting in a gradual reduction of lateral speed as the workpiece approaches the desired position and/or stop member.

Horizontal Gang Outfeed and Board Separator

A horizontal gang can be used to make a number of parallel longitudinal cuts along the length of a cant. In one embodiment, one or more tapered feed rolls can be positioned downstream of the horizontal gang and used to separate the boards.

Figure 18A:
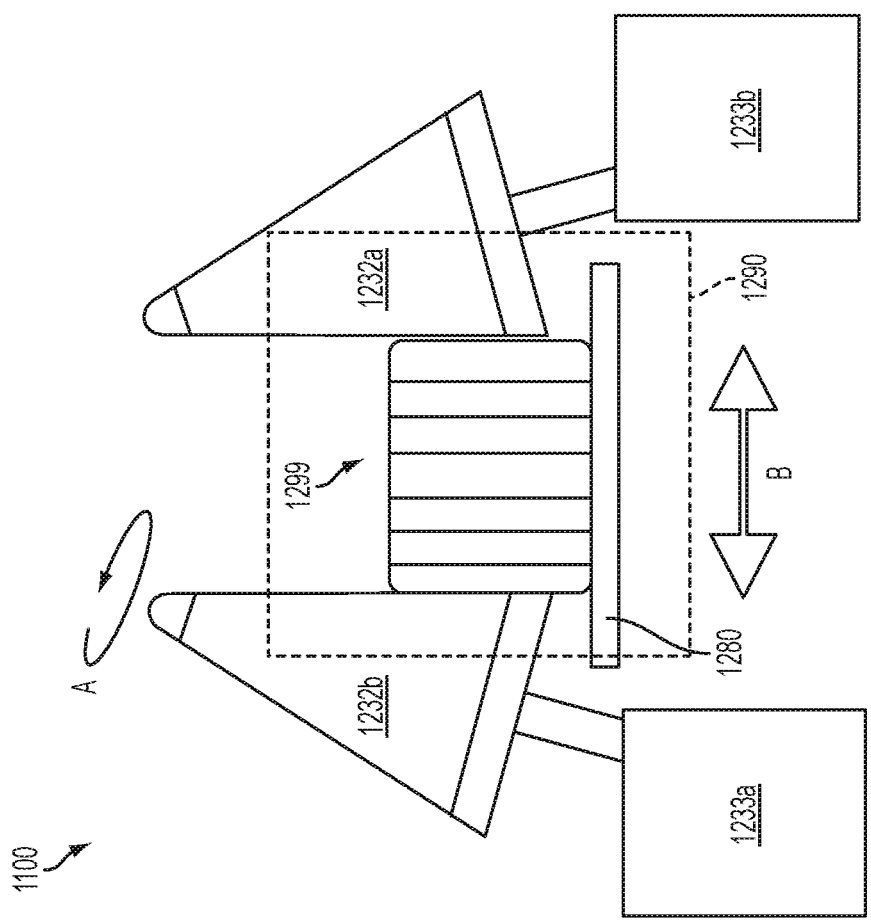
FIGS. 18A-D illustrate block diagrams of a horizontal gang outfeed and board separator system with one or more tapered feed rolls.

FIGS. 18A-D illustrate block diagrams of a horizontal gang outfeed and board separator system 1100, in accordance with embodiments of the present disclosure. FIG. 18A shows an end view of system 1100. System 1100 may include one or more tapered feed rolls 1232 coupled to drive/positioner(s) 1233. Tapered feed rolls 1232 may be positioned to each side of a conveyor surface 1280, downstream of a horizontal gang 1290 (shown in dotted outline, FIG. 18A). Conveyor surface 1280 may be either stationary or movable in a direction of flow (arrow C, FIG. 18D). While FIG. 18A shows a single pair of feed rolls 1232, some embodiments may include two, three, four, or more than four pairs of feed rolls 1232 (see e.g., FIGS. 18B-D).

Feed rolls 1232 may be independently rotatable in direction A and/or in an opposite rotary direction. Drive/positioner(s) 1233 may include one or more motors or other drive members configured to selectively rotate feed rolls 1232. In some embodiments, drive/positioners 1233 may include a motor and/or a variable speed drive. In addition, drive/positioner(s) 1233 may be configured to shift feed rolls 1232 toward and away from a longitudinal centerline of conveyor surface 1280, either independently or in pairs (e.g., a pair such as 1232a and 1232b).

Figure 18B:
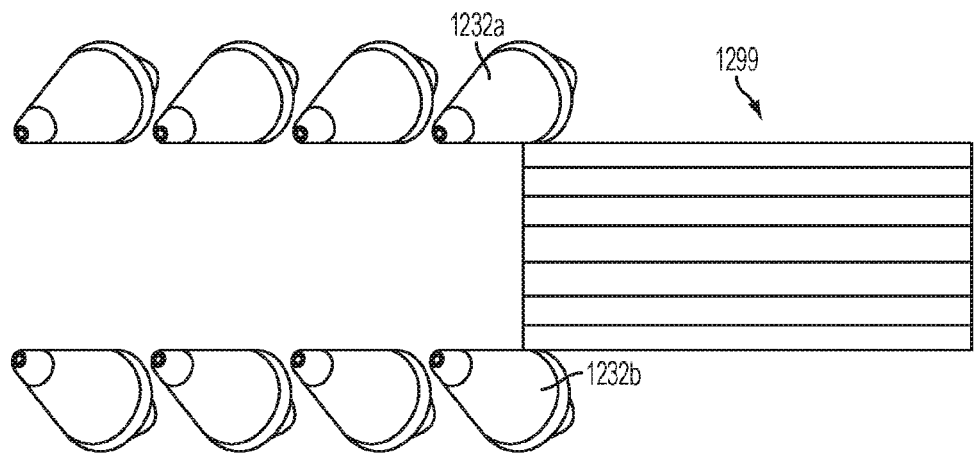
Figure 18C:
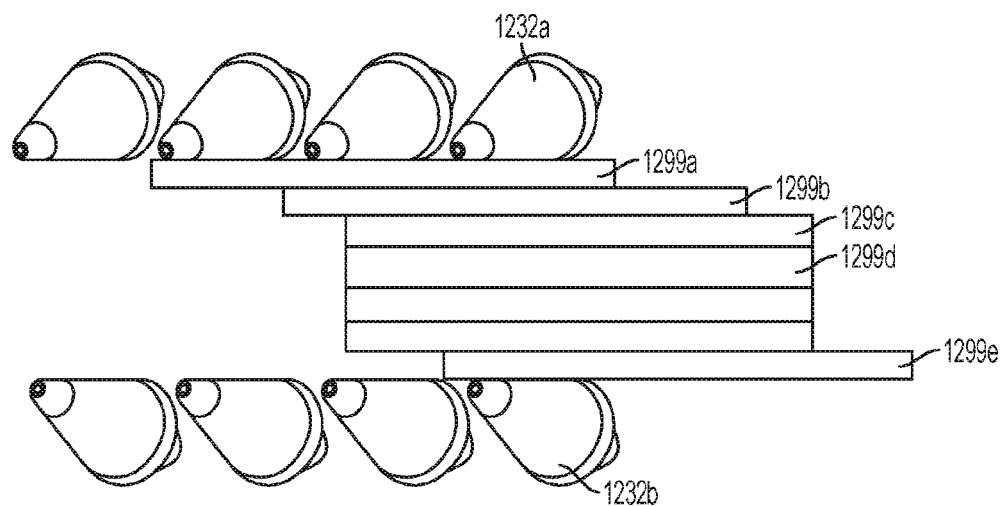
Figure 18D:
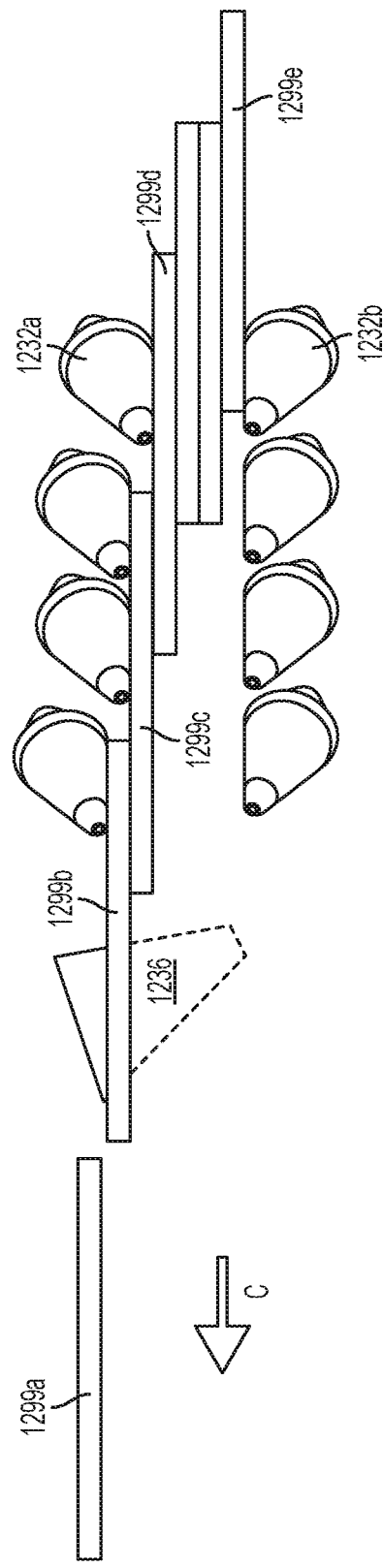

FIGS. 18B-D illustrate system 1100 in operation. First, as shown in FIG. 18B, the leading end of a cant 1299 that has been cut into two or more pieces is engaged by tapered feed rolls 1232a and 1232b. Feed rolls 1232a and/or 1232b may be moved toward or away from the longitudinal center of conveyor surface 1280 to grip cant 1299 in the vertical gap between the feed rolls.

As shown in FIG. 18C, feed rolls 1232a and 1232b may be rotated at the same speed/direction or at different speeds/directions to separate individual pieces of cant 1299 (e.g., 1299a, 1299b, 1299c, 1299d, 1299e). In the illustrated example, feed roll 1232a is being rotated in a first direction at a first speed, and feed roll 1232b is being rotated in the opposite direction at a second speed. This may cause acceleration of the workpiece in contact with feed roll 1232a (workpiece 1299a) and deceleration or backward movement of the workpiece in contact with feed roll 1232b (workpiece 1299e). The workpieces between 1299a and 1299e may advance in the direction of flow at different rates or remain relatively stationary until they contact one of the feed rolls.

As shown in FIG. 18D, as the outermost workpiece passes beyond a feed roll, the feed roll may be moved inward toward the longitudinal center of conveyor surface 1280 to contact the next workpiece. Some embodiments may have multiple pairs of feed rolls, and each feed roll or pair may be repositioned independently of the others. This may allow more efficient separation of the workpieces. In addition, each feed roll or pair of feed rolls may be driven at different speeds to increase separation of the workpieces. For example, the feed roll that is furthest upstream may be rotated at a higher speed than a feed roll downstream, or vice versa. In addition, feed roll rotation speeds may be controlled and/or adjusted (e.g., by a computing device and/or optimizing scanner communicatively coupled to the tapered feed rolls) based on data received from feed roll assembly 1230, a controller (e.g., controller 1204, FIG. 17), and/or other components of a processing line. Examples of such data include, but are not limited to, an external signal from one or more sensors positioned along the path of flow (e.g., a sensor that detects a leading edge of a board), workpiece characteristic data received from an upstream or downstream scanner, data corresponding to a position of a movable member of a processing machine, and conveyor/transfer speed data received from a driver or a controller of the conveyor/transfer/drive.

In some embodiments, one more tapered feed rolls may be provided along only one side of conveyor surface 1280, and the sawn cant 1199 may be pressed or squeezed between the feed roll(s) and a stop member on the opposite side. Optionally, one or more hold-down rolls may be provided overhead to stabilize the sawn cant upstream of, or during engagement with, feed rolls 1232.

In other embodiments, one or more tapered feed rolls 1236 (FIG. 18D) may be positioned above and/or below the path of workpiece flow downstream of horizontal gang 1190. Feed roll(s) 1236 may be provided instead of, or in addition to, feed rolls 1232. Feed roll(s) 1236 may be angled to extend across the path of workpiece flow and rotatable in the direction of flow to further separate the workpieces and/or to urge the separated workpieces toward one side of conveyor surface 1280. This may cause the workpieces to align end-to-end on conveyor surface 1280.

Vertical Gang Outfeed and Board Separator

Similarly, a vertical gang can be used to make a number of parallel longitudinal cuts horizontally along the length of a cant. One or more tapered feed rolls may be positioned downstream of the vertical gang and used to separate the boards.

Figure 19B:
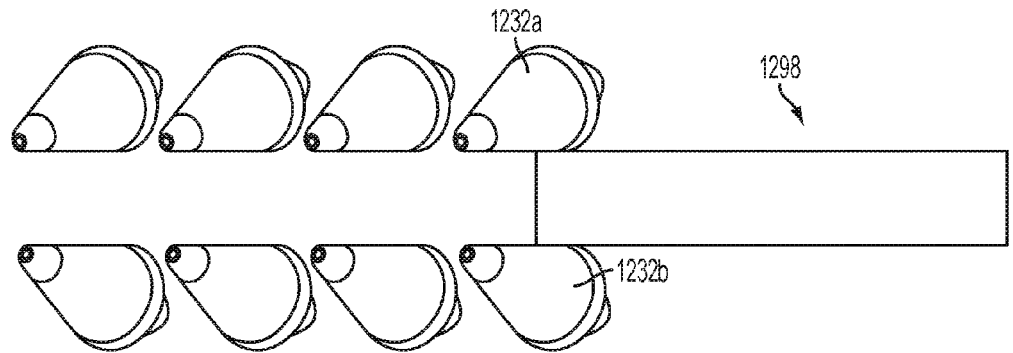

FIGS. 19A-D illustrate block diagrams of a vertical gang outfeed and board separator system 1200, in accordance with embodiments of the present disclosure. FIG. 19A shows an end view of system 1200. System 1200 may include one or more tapered feed rolls 1232 coupled to drive/positioner(s) 1233. Tapered feed rolls 1232 may be positioned to each side of a conveyor surface 1280, downstream of a vertical gang 1291 (shown in dotted outline, FIG. 19A). Feed rolls 1232, drive/positioner(s) 1233, and conveyor surface 1280 may be as described above with regard to FIGS. 18A-D.

Figure 19C:
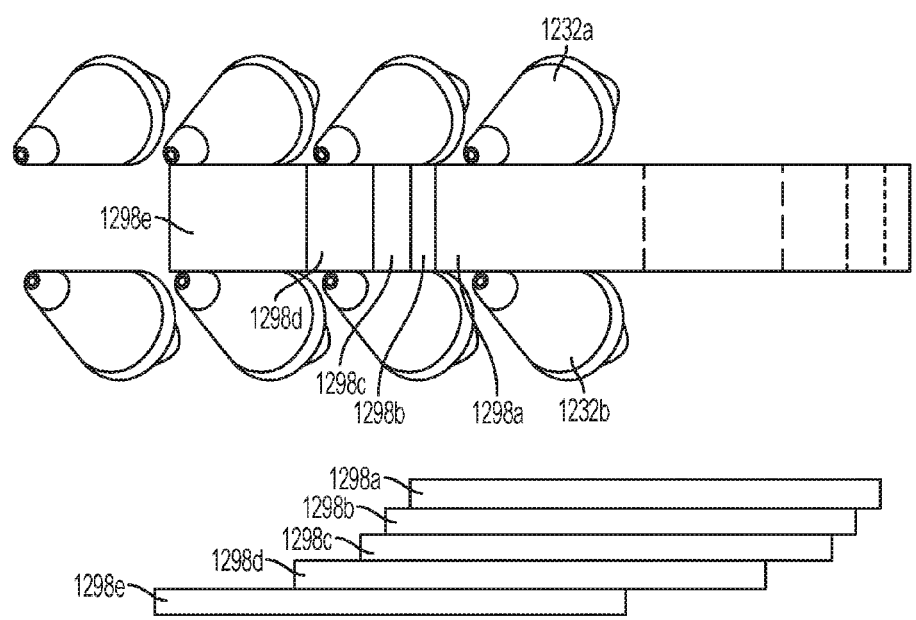

FIGS. 19B-D illustrate system 1100 in operation. First, as shown in FIG. 18B, the leading end of a cant 1298 that has been cut into two or more pieces is engaged by tapered feed rolls 1232a and 1232b. Feed rolls 1232a and/or 1232b may be moved toward or away from the longitudinal center of conveyor surface 1280 to grip cant 1299 in the vertical gap between the feed rolls.

Feed rolls 1232a and 1232b may be rotated in opposite directions at the same speed to separate the workpieces 1298a-e. In some embodiments, two or more pairs of feed rolls 1232 may be rotated at different speeds/directions to further separate the workpieces. In the illustrated example, feed roll 1232a is being rotated in a first direction at a first speed, and feed roll 1232b is being rotated in the opposite direction at the first speed (FIG. 19B). The next pair of feed rolls 1232 downstream of 1232a and 1232b may be rotated at the same speed or at a higher rate of speed. Because the surface speed of each feed roll 1232 is highest at the bottom (wider) end and lowest at the top (narrower) end, the workpieces are accelerated at different rates, with the greatest acceleration applied to the bottom-most workpiece 1298e and the least acceleration applied to the top-most workpiece 1298a. This differential acceleration of the workpieces may begin to separate the workpieces 1298a-e from a vertically stacked arrangement to a lineal end-to-end arrangement.

As shown in FIG. 19D, once the bottom-most workpiece 1298e has moved past the last feed roll, there may be a gap between that workpiece and the next workpiece. As the second bottom-most workpiece 1298d is still engaged by the last pair of feed rolls, that workpiece may be traveling at a greater rate of speed than the bottom-most workpiece. This may reduce or close the gap between these two workpieces before the second workpiece has disengaged from the last feed rolls. Optionally, as described with regard to horizontal gang outfeeds, rotational speeds of some or all of the feed rolls may be selected and/or adjusted by a computing system or scanner to provide a desired gap length between two or more of the workpieces.

In some embodiments, one more tapered feed rolls may be provided along only one side of conveyor surface 1280, and the sawn cant 1298 may be pressed or squeezed between the feed roll(s) and a stop member on the opposite side. Optionally, one or more hold-down rolls may be provided overhead to stabilize the sawn cant upstream of, or during engagement with, feed rolls 1232. This may prevent tilting and upward acceleration of workpieces.

As discussed above and illustrated in FIG. 18D, one or more tapered feed rolls 1236 may be positioned above and/or below the path of workpiece flow downstream of vertical gang 1290 to further separate the workpieces and/or to urge the separated workpieces toward one side of conveyor surface 1280. Feed rolls 1236 may be provided instead of, or in addition to, feed rolls 1232 to urge the workpieces 1298*a-e* into a lineal, end-to-end arrangement on conveyor surface 1280.

Separator/Combiner

Workpieces translating along a path of flow may be diverted onto a different path by various mechanisms such as drop-out gates, recirculation beds, and the like, and later redirected into the path of flow using other devices. However, this typically requires depositing the workpieces into bins and unscrambling the workpieces, which reduces efficiency and does not allow the workpieces to be continuously tracked.

FIGS. 21A-D illustrate an example of a separator/combiner assembly 1400 in accordance with embodiments of the present disclosure. When used as a separator, workpieces fed into the assembly in a single stream may be sent in one of two opposite directions, exiting the assembly at the wider ends of the tapered feed rolls. When used as a combiner, workpieces fed into the assembly from opposite directions may be integrated into single stream, exiting the assembly at the narrower ends of the tapered feed rolls.

In the illustrated system, a first tapered feed roll 1432*a* is positioned above a second tapered feed roll 1432*b* to define a first gap, and a third tapered feed roll 1432*c* is positioned below the second tapered feed roll 1432*b* to define a second gap. The tapered feed rolls may be aligned within a substantially vertical plane near a terminal end of a transfer/conveyor 1480. When the second tapered feed roll 1432*b* is rotated in a first direction and the first tapered feed roll 1432*a* is rotated in the opposite direction, a workpiece fed into the first gap will be driven in a first direction that is transverse to the direction of flow along the conveyor. When the second tapered feed roll 1432*b* is rotated in the first direction and the third tapered feed roll 1432*c* is rotated in the opposite direction, a workpiece fed into the second gap will be driven in a second direction transverse to the direction of flow. The first and second directions may be opposite directions along a single lineal axis of movement.

In some embodiments, the tapered feed rolls may be arranged at an oblique angle to the infeed as described further above. In other embodiments, the tapered feed rolls may be arranged such that their axes of rotation extend substantially parallel to a longitudinal axis of the transfer/conveyor. Optionally, the tapered feed rolls may have a raised or depressed helical or spiral surface feature that aids engagement of the workpieces. Separate bins or conveyor may be positioned at each side of the tapered feed rolls to accept workpieces separated by the tapered feed roll assembly and/or to feed workpieces into the tapered feed roll assembly. Optionally, a bin may be positioned at one side of the tapered feed roll assembly and a transfer/conveyor positioned at the other side.

Figure 21A:
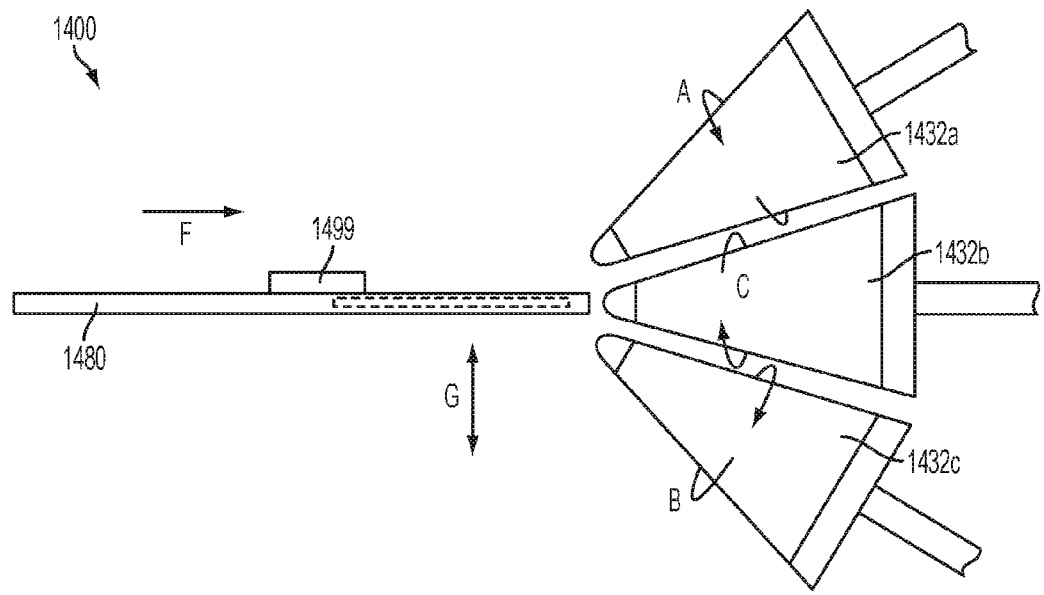
FIGS. 21A-D illustrate an example of a separator/combiner assembly with one or more tapered feed rolls.
Figure 21B:
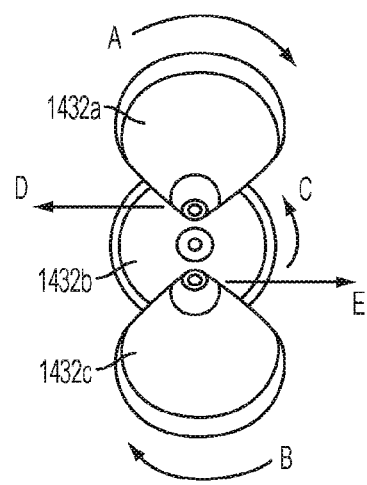

FIGS. 21A and 21B show the system 1400 in use as a separator. In operation, first and third tapered feed rolls 1432*a* and 1432*c* may be rotated in a first rotary direction (e.g., clockwise) while second tapered feed roll 1432*b* is rotated in an opposite rotary direction (e.g., counterclockwise). As workpiece 1499 traveling along transfer/conveyor 1480 in direction F approaches the tapered feed rolls, transfer/conveyor 1480 (or some portion thereof) may be vertically adjusted to feed workpiece 1499 into the first gap or the second gap. Alternatively, the transfer/conveyor may remain vertically stationary while the tapered feed rolls are raised or lowered. As shown in FIG. 21B, if the workpiece 1499 is fed into the first gap (between first tapered feed roll 1432*a* and second tapered feed roll 1432*b*), the workpiece will be driven in a first direction D. However, if the workpiece 1499 is fed into the second gap (between second tapered feed roll 1432*b* and third tapered feed roll 1432*c*), the workpiece will be driven in a second direction E that is opposite to the first direction D.

Figure 21C:
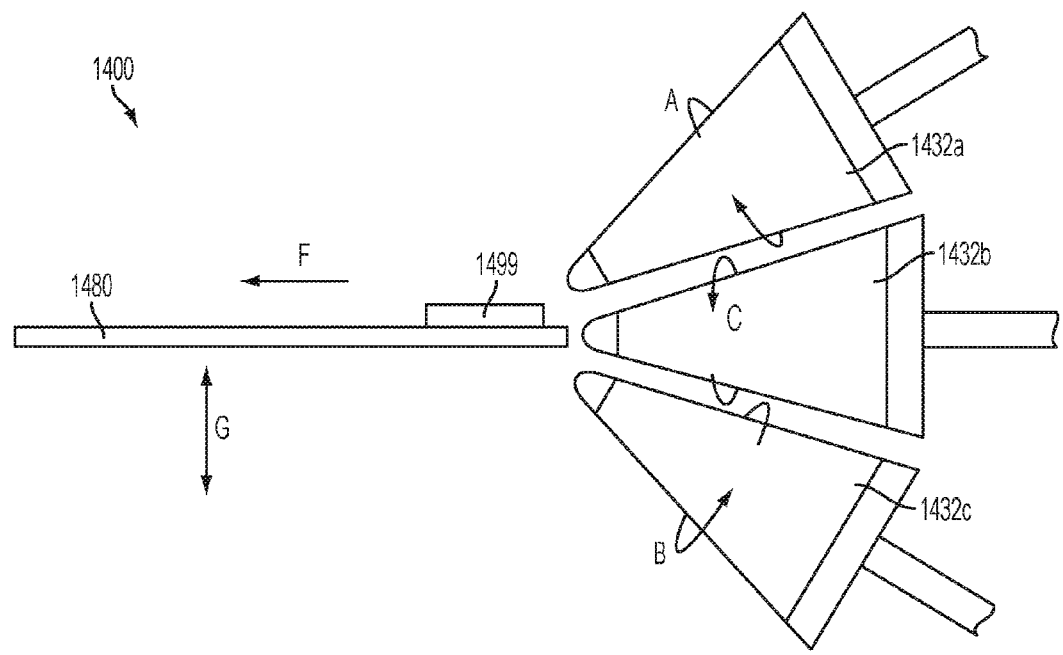
Figure 21D:
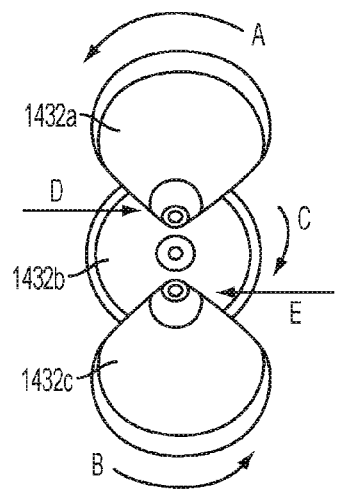

FIGS. 21C and 21D show essentially the reverse, in which system 1400 is used as a combiner. Reversing the rotational direction of the tapered feed rolls allows workpieces fed into the assembly at or near the wide ends of the tapered feed rolls to be combined into a single stream along conveyor 1480. As illustrated, workpieces fed into the first gap (between first tapered feed roll 1432*a* and second tapered feed roll 1432*b*) in direction D and workpieces fed into the second gap (between second tapered feed roll 1432*b* and third tapered feed roll 1432*c*) in the opposite direction E may be combined into a single stream on conveyor 1480.

In other embodiments, the tapered feed rolls may be arranged along a plane that is substantially horizontal or tilted. The tapered feed rolls may be coupled to a support (e.g., as described with regard to tapered feed roll assembly 130).

Flitch Picker

A canter may cut one or more flitches from the vertical sides of a log or cant. Conventional canter lines use butterfly rolls positioned to each side of the saws to divert the flitches onto another processing line.

FIG. 22 shows a block diagram of a flitch diversion system, in accordance with embodiments of the present disclosure. System 2200 may include a primary conveyor 2210 and two secondary conveyors 2280. Some or all of the conveyors 2210/2280 may be configured to convey a workpiece in a direction of workpiece flow, indicated by arrow C.

Tapered feed rolls 2232 may be positioned above and/or below primary conveyor 2210. The axes of rotation of tapered feed rolls 2232 may extend perpendicular to, or at an oblique angle to, the direction of workpiece flow.

One or more flitches 2298 may be cut from the vertical side(s) of cant 2299. As the flitch 2298 on one side contacts the corresponding tapered feed roll(s) 2232, the rotation of the feed roll(s) may urge the flitch in a second direction (arrow A) that is transverse to the direction of workpiece flow. Likewise, as the flitch 2298 on the other side contacts the corresponding tapered feed roll(s) 2232, the rotation of the feed roll(s) may urge the flitch in a third direction (arrow B) that is transverse to the direction of workpiece flow and generally perpendicular to the second direction. Thus, the tapered feed rolls 2232 may urge the flitches away from primary conveyor 2210 onto secondary conveyors 2280, leaving cant 2299 on primary conveyor 2210.

Step Feeder

A conventional log processing line begins with piled logs being singulated and lifted from a pile of logs to an elevated lineal conveyor. This is usually accomplished with a step feeder or a log ladder.

Figure 20:
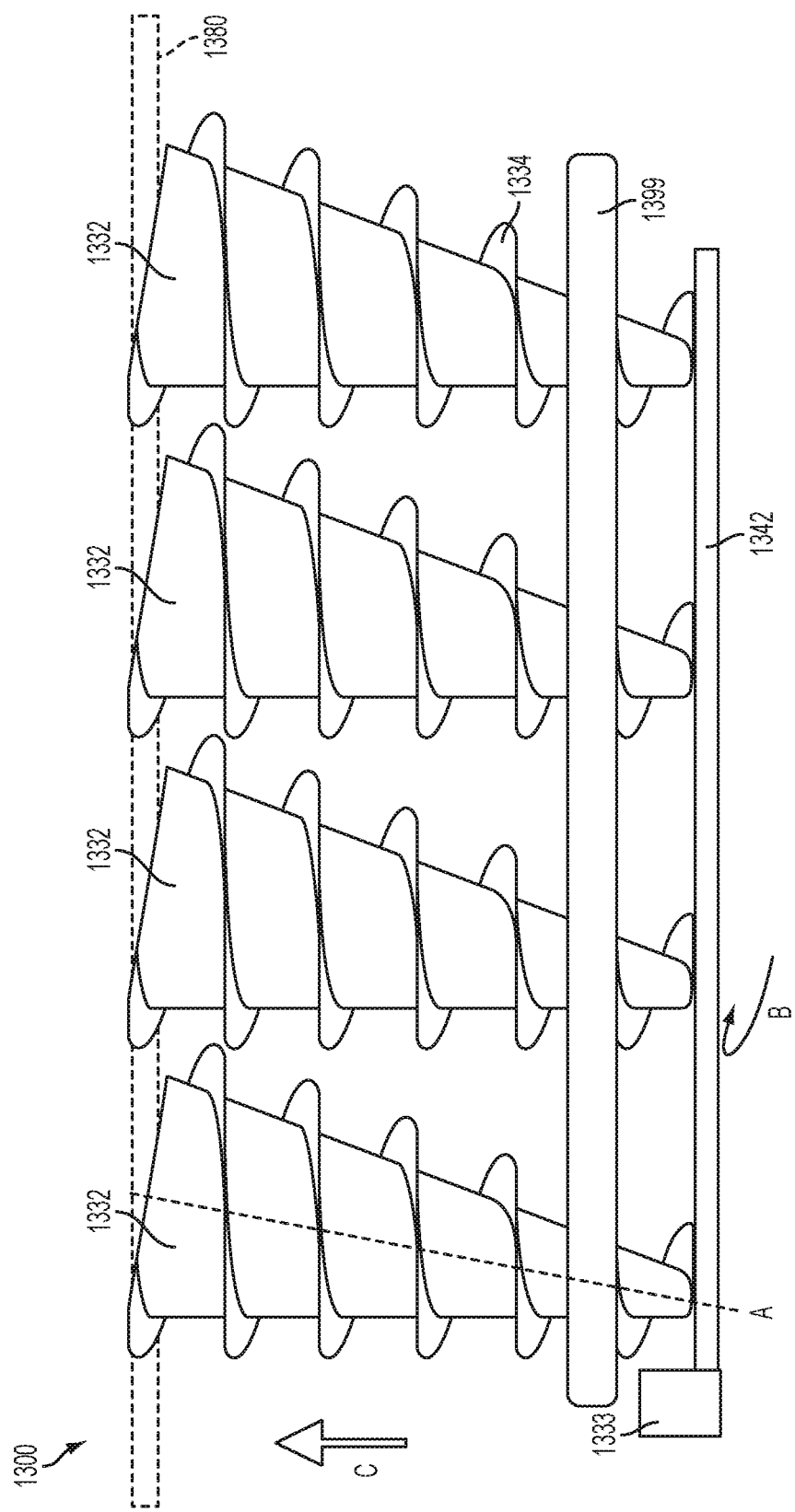
FIG. 20 illustrates an embodiment of a log feeder with one or more tapered feed rolls.

FIG. 20 illustrates an embodiment of a log feeder 1300 with tapered rolls, in accordance with embodiments of the present disclosure. Log feeder 1300 may include two or more tapered feed rolls 1332 rotatably coupled to a support 1342 and to a drive 1333. Drive 1333 may be operable to rotate one or more tapered feed rolls 1332 around a rotational axis A. Optionally, drive 1333 may include a variable speed drive. Drive 1333 may be operated manually, by a human operator, or automatically by a computing device/system with some or all of the functionalities described in further detail above. While the illustrated embodiments includes a separate drive 1333 for each tapered feed roll 1332, other embodiments may include one drive coupled to two or more tapered feed rolls. Optionally, a single drive may be used to drive/rotate all of the tapered feed rolls synchronously.

Log feeder 1300 may include two, three, four, five, six, or more than six tapered feed rolls 1332. Tapered feed rolls 1332 may include a helical flange 1334 that wraps around the feed rolls between the narrower end and the wider end of the feed rolls. Helical flange 1334 may define a plurality of workpiece receiving spaces along the outer face of tapered feed roll 1332. Each workpiece receiving space may be configured to support a workpiece 1399 (e.g., a log or a cant), and tapered feed rolls 1332 may be aligned such that the workpiece 1399 is supported by the helical flanges 1334 of two or more adjacent feed rolls 1332 in cooperation. Optionally, tapered feed rolls 1332 may be inclined relative to vertical, such that a workpiece 1399 is supported on helical flange 1334 and also on the outer surface of tapered feed roll 1332.

In operation, workpiece 1399 may be engaged by the lower portion of helical flange 1334 on adjacent tapered feed rolls 1332. Optionally, workpieces may be piled or stacked in a bin/hopper or support surface that tilts the pile or stack toward the bottom ends of tapered feed rolls 1332. Tapered feed rolls 1332 may be driven to rotate in direction B to vertically displace workpiece 1399 (arrow C) upwardly along the outer face of the tapered feed rolls 1332 toward a workpiece receiving surface 1380. As workpiece 1399 reaches the top of tapered feed rolls 1332, the workpiece may roll onto workpiece receiving surface 1380. In some embodiments, workpiece receiving surface 1380 may be a lineal conveyor configured to transport the workpieces along a path of flow.

In some embodiments, the tapered feed rolls 1332 may be rotatable in the opposite rotary direction to lower workpieces to the ground or floor surface.

In other embodiments, the tapered feed rolls may be oriented with the wider ends at the bottom and the narrower ends at the top. Optionally, the orientation of the tapered feed rolls may alternate from one tapered feed roll to the next, such that one tapered feed roll is oriented narrower-end-up and the next adjacent tapered feed roll is oriented wider-end-up. The spiral flange may be continuous or discontinuous. Optionally, the spiral flange may have a surface treatment or texture that increases or reduces surface friction between the spiral flange and the workpieces. Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

We claim:

1. A system for separating or combining workpieces, the system comprising:
    a first workpiece transport with a transport surface configured to convey the workpieces in a flow direction;
    a first feed roll positioned at one end of the first workpiece transport, the first feed roll having a first axis of rotation oriented generally parallel to the flow direction;
    a second feed roll positioned above the first feed roll, the second feed roll having a second axis of rotation oriented transverse to the first axis of rotation, and the first and second feed rolls defining a first gap therebetween; and
    a third feed roll positioned below the first feed roll, the third feed roll having a third axis of rotation oriented transverse to the first axis of rotation, and the first and third feed rolls defining a second gap therebetween,
    wherein each of the feed rolls has a first end and a generally opposite second end of greater diameter than the first end, the first ends of the feed rolls positioned upstream of the second ends, and
    wherein the first feed roll is rotatable in a first rotary direction and the second and third feed rolls are rotatable in an opposite second rotary direction, such that the feed rolls are collectively operable to drive workpieces through the first gap along a first diagonal path and to drive workpieces through the second gap along a second diagonal path that is transverse to the first diagonal path.

2. The system of claim 1, wherein one or more of the feed rolls is selectively repositionable relative to the workpiece transport, or the workpiece transport is selectively repositionable relative to an underlying support surface.

3. The system of claim 2, further including a first workpiece support surface and a second workpiece support surface disposed proximal to, and on opposite sides of, the second ends of the feed rolls.

4. The system of claim 3, wherein the first workpiece support surface is a bin, a platform, a floor, or a surface of a second workpiece transport operable in a second flow direction.

5. The system of claim 4, wherein the second workpiece transport is an infeed of a processing machine, or a bin or platform that is vertically repositionable, laterally repositionable, vertically and laterally repositionable, or mobile.

6. The system of claim 1, wherein the first workpiece transport is a lineal conveyor or a transverse conveyor.

7. The system of claim 6, wherein at least a portion of the first workpiece transport is vertically repositionable.

8. The system of claim 1, wherein the workpiece transport is configured to transport the workpieces toward the feed rolls, and the first and second diagonal paths correspond to different first and second destinations, respectively, the system further comprising:

a computer operatively coupled with the first workpiece transport or at least one of the feed rolls, wherein the computer includes a non-transient computer readable medium comprising instructions operable, upon execution, to cause the computer to select a desired flow path for a workpiece on the transfer surface based at least on one or more workpiece characteristics, wherein the desired flow path extends through a corresponding one of the gaps between the feed rolls, and generate a command to reposition the first workpiece transport or at least one of the feed rolls such that the workpiece is fed into the corresponding one of the gaps.

9. The system of claim 1, wherein the first workpiece transport is configured to transport the workpieces away from the feed rolls, the system further comprising:

one or more sensors positioned to detect workpieces upstream of the first and second diagonal paths; and a computer operatively coupled with the one or more sensors, wherein the computer includes a non-transient computer readable medium comprising instructions operable, upon execution, to cause the computer to control workpiece flow through the first and second gaps, such that the workpieces are sequentially deposited onto the first workpiece transport.

10. A method for separating workpieces, the method comprising:

providing a first feed roll, a second feed roll, and a third feed roll at one end of a workpiece transport, wherein each of the feed rolls has a first end positioned proximal to the workpiece transport, a second end of greater diameter than the first end, and an axis of rotation, and wherein the second feed roll is positioned above the first feed roll and the third feed roll is positioned below the first feed roll, the axis of rotation of the first feed roll is generally parallel to the flow direction, the second feed roll is spaced apart from the first feed roll by a first gap, and the third feed roll is spaced apart from the second feed roll by a second gap;

rotating the second feed roll and the third feed roll in a first rotary direction and rotating the first feed roll in a generally opposite second rotary direction; and feeding a first one of the workpieces on the workpiece transport between the first ends of the first and second feed rolls and feeding a second one of the workpieces on the workpiece between the first ends of the first and third feed rolls, whereby the first and second ones of the workpieces are driven in different directions transverse to the flow direction.

11. The method of claim 10, further including providing a first workpiece support and a second workpiece support at opposite sides of the feed rolls, the first workpiece support positioned to receive the first one of the workpieces from the first and second feed rolls and the second workpiece support positioned to receive the second one of the workpieces from the first and third feed rolls.

12. The method of claim 11, wherein each of the first and second workpiece supports is a bin, a conveyor, or a transfer.

13. The method of claim 10, further including adjusting a vertical position of the workpiece transport after feeding the first one of the workpieces and before feeding the second one of the workpieces.

14. The method of claim 10, further including adjusting a vertical position of the feed rolls after feeding the first one of the workpieces and before feeding the second one of the workpieces.

15. The method of claim 10, further including adjusting a vertical position of the second workpiece on the workpiece transport after feeding the first one of the workpieces and before feeding the second one of the workpieces.

16. A method for combining workpiece flows, the method comprising:

providing a first feed roll, a second feed roll, and a third feed roll at one end of the workpiece transport, wherein each of the feed rolls has a first end positioned proximal to the workpiece transport, a second end of greater diameter than the first end, and an axis of rotation, and wherein the second feed roll is positioned above the first feed roll and the third feed roll is positioned below the first feed roll, the axis of rotation of the first feed roll is generally parallel to the flow direction, the second feed roll is spaced apart from the first feed roll by a first gap, and the third feed roll is spaced apart from the second feed roll by a second gap;

rotating the second feed roll and the third feed roll in a first rotary direction and rotating the first feed roll in a generally opposite second rotary direction; and feeding a first one of the workpieces between the second ends of the first and second feed rolls and feeding a second one of the workpieces between the second ends of the first and third feed rolls, whereby the first and second ones of the workpieces are driven in different directions onto the transport.

17. The method of claim 16, further including providing a first conveyor and a second conveyor at opposite sides of the feed rolls, wherein feeding the first one of the workpieces includes transporting the first one of the workpieces to the feed rolls on the first conveyor and feeding the second one of the workpieces includes transporting the second one of the workpieces to the feed rolls on the second conveyor.

18. The method of claim 16, further including adjusting a vertical position of the workpiece transport after feeding the first one of the workpieces and before feeding the second one of the workpieces.

19. The method of claim 16, further including adjusting a vertical position of the feed rolls after feeding the first one of the workpieces and before feeding the second one of the workpieces.

20. The method of claim 17, further including operating the feed rolls and the transports to combine additional ones of the workpieces on the conveyors into a single stream of the workpieces on the transport.

* * * * *